(12) United States Patent
Fast et al.

(10) Patent No.: US 7,978,076 B2
(45) Date of Patent: *Jul. 12, 2011

(54) SYSTEM FOR, AND METHOD OF, MONITORING THE MOVEMENT OF MOBILE ITEMS

(75) Inventors: Raymond D. Fast, Surrey (CA); Robert R. Goehring, Vancouver (CA); Kai Loon Ng, Vancouver (CA)

(73) Assignee: Contigo Solutions, Inc., Vancouver (CA)

( * ) Notice: Subject to any disclaimer, the term of this patent is extended or adjusted under 35 U.S.C. 154(b) by 111 days.

This patent is subject to a terminal disclaimer.

(21) Appl. No.: 12/434,563

(22) Filed: May 1, 2009

(65) Prior Publication Data

US 2010/0026495 A1 Feb. 4, 2010

Related U.S. Application Data

(63) Continuation of application No. 12/025,681, filed on Feb. 4, 2008, now Pat. No. 7,528,723, which is a continuation of application No. 11/048,555, filed on Jan. 31, 2005, now Pat. No. 7,327,258.

(60) Provisional application No. 60/542,208, filed on Feb. 4, 2004.

(51) Int. Cl.
*G08B 13/14* (2006.01)
(52) U.S. Cl. ...................... 340/572.1; 701/213
(58) Field of Classification Search .............. 340/572.1, 340/825.36, 825.49, 825.72, 539.11; 701/213, 701/214; 342/357.01, 357.02
See application file for complete search history.

(56) References Cited

U.S. PATENT DOCUMENTS

| | | | |
|---|---|---|---|
| 5,317,309 A | 5/1994 | Vercellotti et al. | |
| 5,519,403 A | 5/1996 | Bickley et al. | |
| 6,661,372 B1 | 12/2003 | Girerd et al. | |
| 6,720,888 B2 | 4/2004 | Eagleson et al. | |
| 6,958,677 B1 | 10/2005 | Carter | |
| 7,139,820 B1 | 11/2006 | O'Toole et al. | |
| 7,152,020 B2 | 12/2006 | Michiwaki et al. | |
| 7,176,797 B2 | 2/2007 | Zai et al. | |
| 7,327,258 B2 | 2/2008 | Fast et al. | |
| 7,528,723 B2 * | 5/2009 | Fast et al. ................ | 340/572.1 |

FOREIGN PATENT DOCUMENTS

WO 0223922 A2 3/2002

\* cited by examiner

*Primary Examiner* — John A Tweel, Jr.
(74) *Attorney, Agent, or Firm* — John K. Fitzgerald; Fulwider Patton LLP

(57) ABSTRACT

A system monitors parameters (e.g., speed, position, threshold boundaries) of mobile items attached to beacons and produces signals indicating these parameters. The system also monitors non-mobile parameters (e.g., battery life, door locks, windows) in the items. Different technologies (e.g., wireless) are provided for communicating between the beacons and a beacon controller interface. Different technologies are provided for locating and indicating item positions. The beacons and the interface provide for new beacons to be added to the system with different characteristics than the existing beacons for monitoring the operation of new beacons without affecting the operation of existing beacons. The system includes resellers, retailers, users and subscribers in a flexible relationship to enhance the ease in the system operation. Beacons can perform more than one function (e.g. tracking, threshold monitoring) simultaneously. Scenarios for the beacons can be created and monitored. Recovery personnel can intervene to resolve crises.

17 Claims, 30 Drawing Sheets

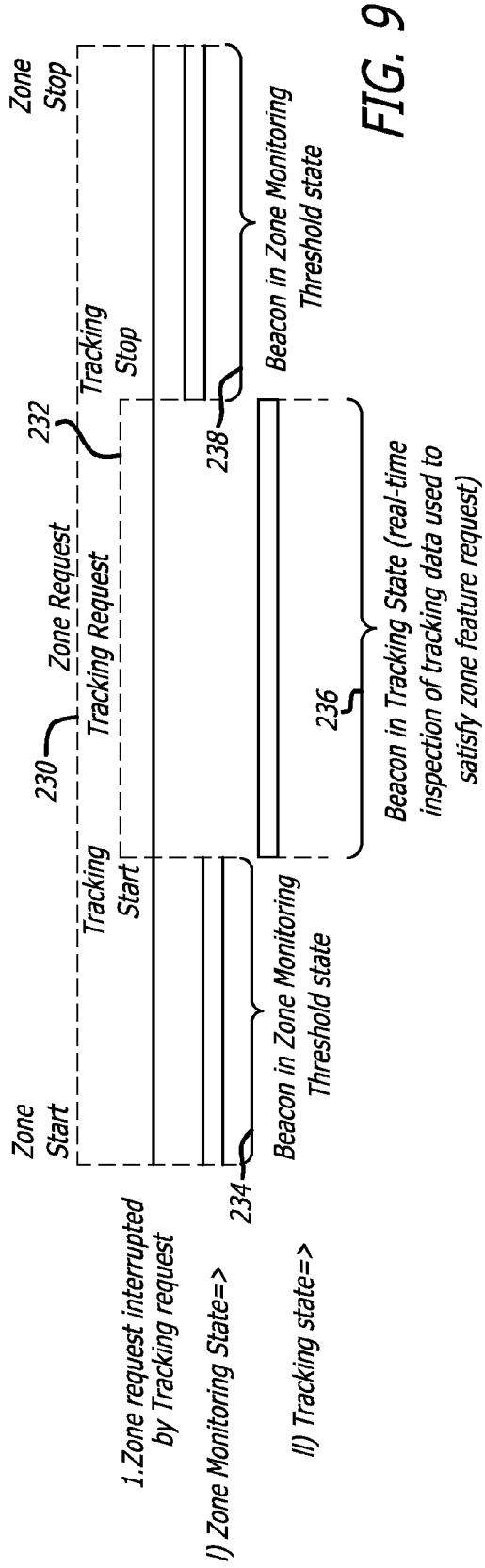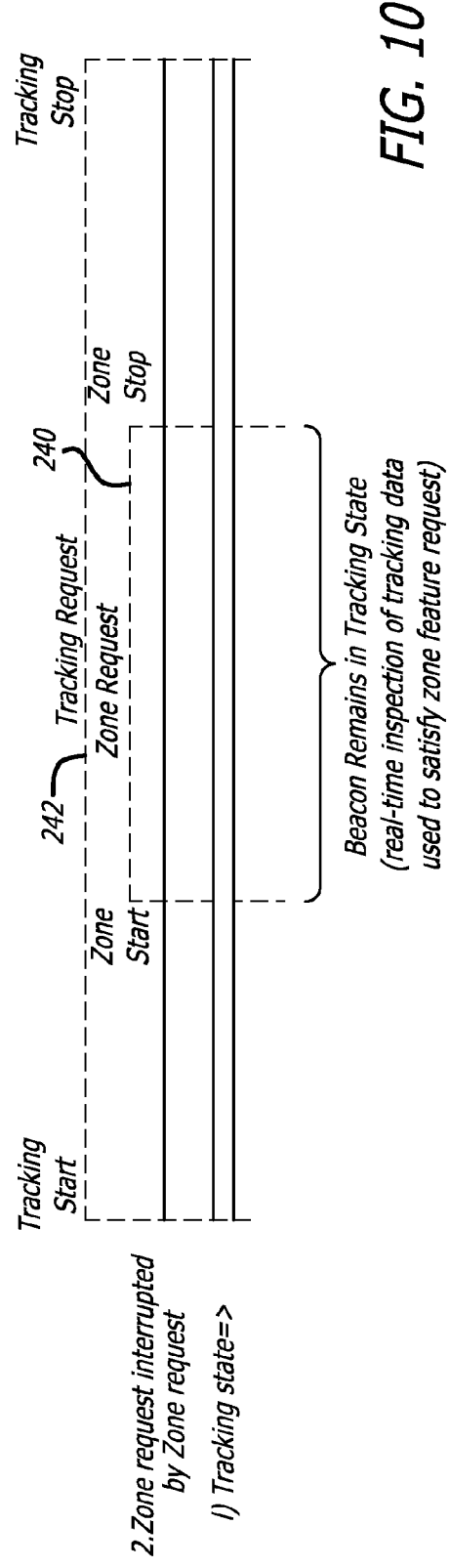

FIG. 18

SYSTEM FOR, AND METHOD OF, MONITORING THE MOVEMENT OF MOBILE ITEMS

CROSS-REFERENCES TO RELATED APPLICATIONS

This application is continuation of U.S. application Ser. No. 12/025,681, filed Feb. 4, 2008, now U.S. Pat. No. 7,528,723, which will issue on May 5, 2009, which is a continuation of U.S. application Ser. No. 11/048,555, filed Jan. 31, 2005, now U.S. Pat. No. 7,327,258, issued Feb. 5, 2008; which claims the benefit of priority to U.S. Provisional Patent Application Ser. No. 60/542,208, filed Feb. 4, 2004. Applicants claim priority to all of the applications in the chain.

FIELD OF THE INVENTION

This invention relates to a system for, and a method of, monitoring beacons attached to mobile items to monitor the position and movement of the mobile items. The invention additionally relates to a system for, and method of, monitoring the beacons with respect to non-mobile aspects (e.g. battery life, door locks, window openings) of the items. The system and methods provide advantages in monitoring such that additional beacons can be added to the system with characteristics different from those of existing beacons in the system and such that the addition of the new beacons will not affect the operation of the existing beacons in the system.

BACKGROUND OF THE INVENTION

Systems have been provided for determining the movements of mobile items. For example, tags have been disposed on articles in department stores to signal when merchandise is being removed from the stores without payment for the items. Tags have also been disposed on articles in railroad cars to indicate the movement of the items in the railroad cars along the tracks. In the systems now in use, the tags have a single design and a single construction. This has limited the utility of the systems.

In recent years, different systems have been provided for communicating on a wireless basis between a pair of spaced positions. Each of the systems employs a different technology of wireless communication. Different systems have also been provided in recent years for locating the positions of mobile items. Each of these systems employs a different location technology. It would be desirable to provide a universal system which would be responsive to all of the different types of wireless communications between a pair of spaced positions and would be responsive to all of the different technologies for locating the positions of mobile items. It would also be desirable to make these systems so flexible in their concept and operation that they could also incorporate new wireless communication technologies and new location technologies in the future without affecting the operation of the existing wireless communication technologies and the existing location technologies in the system.

SUMMARY OF THE INVENTION

A system monitors parameters (e.g., speed, position, threshold boundaries) of mobile items attached to beacons and produces signals indicating these parameters. The system also monitors non-mobile parameters (e.g., battery life, door locks, windows) in the items. Different technologies (e.g., wireless) are provided for communicating between the beacons and a beacon controller interface. Different technologies are provided for locating and indicating item positions. The beacons and the interface provide for new beacons to be added to the system with different characteristics than the existing beacons for monitoring the operation of new beacons without affecting the operation of existing beacons.

The system includes resellers, retailers, users and subscribers in a flexible relationship to enhance the ease in the system operation. Beacons can perform more than one function (e.g. tracking, threshold monitoring) simultaneously. Scenarios for the beacons can be created and monitored. Recovery personnel can intervene to resolve crises.

SUMMARY, BENEFITS AND OBJECTIVES OF THE INVENTION

Overview

There has never before been a system that performs the functions of the GMMS. It is a machine consisting of many components and the system's unique functionality is provided by the combination of the interconnected components and the software that ties them together.

The combination of components is referred to as the Guardian Mobile Monitoring System, or simply the GMMS. The GMMS actually includes the integration of several separate networks such as wireless communications networks, the Internet, the Global Positioning system (GPS), and the Public Switched Telephone Network (PSTN).

The GMMS software can best be understood by describing two different aspects, the architecture and the applications. The architecture is the design of the structure of the software, which allows it to tie together the various components and networks of the GMMS and allow the various functions, or applications, that control those components to be created.

This document first discusses the unique interconnection of components and networks that create the GMMS. It then describes the unique software architecture, and finally it describes some the functionality of the applications provided by the system.

Objectives of the GMMS

The GMMS provides a complete, easy and novel method for enabling existing companies, or new companies, to offer mobile monitoring services, primarily for security purposes. The system can remotely enable many and various companies to offer mobile monitoring services simultaneously. Even though they are all accessing the same GMMS, each company can offer its own service packages, bill for its own account types, display its own brand, and securely maintain its own data. A top tier company enabled by the GMMS can even act as a wholesaler to its retailers or retailers.

The business process created by the system allows customers to buy monitored location-based services from their security company or other mobile monitoring service provider. The services provide security for mobile objects in a manner very similar to the way they are provided for fixed structures, namely that the security company has operators available at all times to assist with security related issues. The primary form of assistance is typically to dispatch police, fire, ambulance, or rescue personnel to the location of the emergency. An additional form of assistance is to notify the owner or manager of the structure about the emergency, enabling them to make arrangements for repairs, etc.

In a traditional monitored security system (for stationary objects) the security company's operators are alerted automatically upon various events that would be considered alarm conditions. For the security system of a stationary structure this would include such things as detecting the opening or breaking of a window or door, detecting motion in a building that is supposed to be unoccupied, detecting fire, gas, water or some other unwanted substance.

For a monitored security system for mobile objects the monitoring station operators are alerted if a panic button is activated, if an object is not where it was specified to be at a given time, if an object is moving at a velocity greater than it was specified to be moving, if triggering of any sensor attached to the mobile monitoring device is detected, or if tampering with the mobile monitoring device itself is detected. In all cases the mobile device, a component of the GMMS called a beacon, provides the operator with its present location.

A key component to enabling the security company to provide the required assistance for these mobile security situations is for the system to provide the location of the mobile object. Another key component is the means to notify the appropriate personnel with the appropriate information, either automatically or manually. The GMMS provides several methods of enabling these for mobile applications.

DEFINITIONS

GMMS The Guardian Mobile Monitoring System—not the company called Guardian Mobile Monitoring Systems, Inc.

Mobile Monitoring A service similar to the monitored security services provided for homes and office buildings but relating instead to objects that are mobile or portable. Mobile monitoring is primarily the act of remotely determining the location and/or status of a beacon or of peripheral devices connected to a beacon. Monitoring services may also include using the GMMS to send commands to beacons to control aspects of the beacons' operations and/or the operation of peripheral devices connected to the beacons. Monitoring also involves having facilities and personnel ready and waiting to respond to alert messages sent by the beacons or items being monitored. Mobile monitoring may also provide benefits in addition to security such as increased productivity, convenience, and peace of mind.

Wholesaler A company that has a business relationship with an operator of a GMMS and is enabled by the system to provide wholesale and retail mobile monitoring services. Wholesalers generally operate a security alarm monitoring station and provide mobile monitoring services but could be other business entities as well.

Retailer A company that is enabled by a GMMS through a wholesaler to offer mobile monitoring services.

Direct Reseller A company that is enabled directly by an operator of a GMMS to sell mobile monitoring services to subscribers. Subscribers of a direct reseller would typically use self-serve mobile monitoring services only.

Subscriber The person or organization that is the consumer or end-user of mobile monitoring services. One subscriber may have numerous subscriptions.

Subscription Each subscription is an account for a single beacon, usually corresponding to a particular subscription service plan.

Monitoring Station A station, such as one operated by a security alarm monitoring company, typically staffed 24 hours per day, every day, by operators who watch for incoming alarm signals and manage security incidents as necessary.

Beacon Any wireless device that can be remotely located using the GMMS

Item Any object, person, or animal that has a beacon attached or carries a beacon User Anyone who has access to the GMMS via any of its portals or user interfaces.

Operators The personnel providing services on behalf of a mobile monitoring provide. Operators typically access the GMMS via the monitoring station portal.

Guardian An individual who is assigned by a subscriber to have temporary responsibility for an item.

Entity Any destination within the GMMS or accessible by the GMMS where a message can be sent.

Wireless Carrier Companies that operate mobile phone systems. Examples are AT&T Wireless, Verizon, Sprint PCS, T-Mobile, Cingular, NexTel, Bell Mobility, and Microcell.

Wireless Technology The standards implemented in wireless communications networks. Examples are:
AMPS (Advanced Mobile Phone System)
TDMA (Time Division Multiple Access)
GSM (Global System for Mobile communications)
CDMA (Code Division Multiple Access)
iDEN (Integrated Services Digital Network)

Location Technology The technology used in a wireless device such as a beacon or tracking terminal to determine its geographic location. Examples are:
GPS (Global Positioning System)
A-GPS (Assisted GPS)
HA-GPS (Hybrid, Assisted GPS)
gpsOne™ is a HA-GPS technology designed by Qualcomm and deployed in several wireless networks such as Sprint PCS and Verizon.

PDE A special server called Position Determining Equipment, used in conjunction with location technologies such as gpsOne™. The PDE communicates with gpsOne™ enabled mobile phone handsets and/or beacons to assist them in determining their geographic position. When a PDE is used as a component of the location technology, the GMMS may communicate with the PDE rather than the Beacon itself to determine the Beacon's location.

PSTN The Public Switched Telephone Network.

Wireline Networks Networks such as the PSTN and the Internet that are generally operated via wired connections as opposed to wireless.

Portal A privately accessible interface to the GMMS for a particular subscriber, user, or user type. Portals are normally accessed using a web browser. The following portal types provide user interfaces to the GMMS:
Master System Administration Portal
Monitoring Station Portal (used by wholesalers)
Retailer Portal (used by retailers and direct resellers)
Commercial Subscriber Portal
Residential Subscriber Portal
Recovery Personnel Portal Event Any parameter that causes a beacon to transmit a message to the GMMS.

Incident Any event that causes an incident to be generated in the incident queue of a monitoring station portal. Incidents show up first in the incident queue, also called an alarm queue, and are then managed by an operator.

Scenario A set of monitoring parameters where events are monitored automatically according to a schedule. If a specified parameter exceeds a specified threshold while a specified schedule indicates it is active, specified notifications are automatically sent by the GMMS according to a specified notification scheme to specified entities.

Benefits of the GMMS

The GMMS is controlled by software that is hosted at centralized servers accessible via data networks such as the Internet. A company offering access to its software in this manner is known as an Application Service Providers (ASP). Because of this structure, the GMMS can be upgraded simultaneously for all its users, without their intervention. Updates may include new wireless network access, availability of new beacon types, new location technologies, new map data, or any new software features and functions.

The GMMS can be used as either a stand-alone system or integrated with other systems in an existing business. As a stand-alone system it is a turn-key platform on which to operate a mobile monitoring service. For companies already in the security or monitoring business, the GMMS also has the ability to integrate with several business systems they may be using and may wish to have integrated. These business systems are typically client-server applications running on servers located on the companies' premises. One such system is the Automation System used by security alarm monitoring stations to automate the process of handling alarms associated with buildings that they monitor. The GMMS can integrate into these systems regardless of which automation system it is or where it is located. Other examples of business systems that may require integration with the GMMS are: customer databases, billing systems, inventory management systems, and customer relationship management systems. The GMMS can also integrate with any of these various systems.

The GMMS provides for access by several categories of users including: system administrators, monitoring station operators, retailers, subscribers, and rescue personnel. All users access the system via the Internet using web browsers running on either fixed or mobile computing devices. Operators' access to the system is mandatory because its functions are utilized every time the service provider is involved in providing any component of the service. It is a feature of the GMMS's design that Subscribers have the option of using the web interface or not. Subscribers are each given access to a dedicated portal that offers many self-serve functions and preference settings, but subscribers may not have Internet access, may not be interested, or may not be capable of using them. They may instead choose to call their service provider and have an operator perform all the tasks for them. Rescue personnel are the private or public safety officers that may be involved in performing a rescue, a recovery, or resolving an incident. These personnel can be given temporary, limited access to certain features of the GMMS for the duration of an incident via a recovery portal.

One of the primary advantages of the GMMS is its ability to utilize various wireless networks and various wireless location technologies. This means that the mobile monitoring service providers can offer a greater variety of beacon types, and have a greater chance of offering a service with good wireless coverage in their customers' region. Since the mobile security services can also be provided to users of locatable handsets (wireless telephones) it means that service providers have a greater range of existing wireless customers to offer services to. Some wireless location technologies are independent of the wireless network, but some are integrated into the wireless network itself. The GMMS provides the flexibility to work with any of these situations. Another fundamental benefit of this structure is the ability to quickly adapt to any new wireless network technologies or location technologies as they are developed in the future.

A fundamental benefit of the GMMS is its ability to enable many mobile monitoring service providers through a single system. Security and privacy of each service provider's data is ensured through what is called the multi-tenant architecture of the system. (More detail of this is provided in the Software Architecture section.) A benefit of aggregation of users is the sharing of resources, resulting in cost savings. This is typical of any Application Service Provider (enabling all users through centralized servers) but the GMMS has additional features. It also aggregates all users' traffic on the wireless networks in the system, facilitating bulk buying, resulting in further cost savings. The GMMS also automates some of the account management functions particular to the needs of mobile monitoring service providers. (More detail on this is provided in the operator's portal section.) This automation reduces the account management burden on the wireless carrier, and the resulting increase in efficiency allows them to provide better pricing.

A major component of the GMMS is the server network. This is the network that interconnects the various servers in the data center, and interconnects the servers with the external networks and devices. The following objectives are met by creating the server network architecture that is disclosed in this document:

Performance
Multiple webservers and application servers are deployed to allow optimum usage of resources, which in turn optimizes the performance of the system.

Availability
All layers in the server network have redundancy built in, ensuring that the system provides maximum availability.

Security
A secure network is ensured through the application of three disciplines—the use of firewalls to lock down all unused ports, the use of SSL between browsers and the servers, and the constant update of software security patches in the server operating systems and applications.

Scalability
Additional servers can be added to the webserver farm or the application server cluster to support higher volumes of users without having any impact on the existing services.

Reliability
Redundancy built into all layers of the network ensures the reliability of the system. In addition, the System Health Monitor provides constant automated checking to ensure the reliability of the system.

Extensibility
The architecture utilized by GMMS has been designed to be extensible, providing the ability to add and extend the features and functions within the system without requiring significant changes to the underlying network architecture.

BRIEF DESCRIPTION OF THE DRAWINGS

FIGS. 9, 10 and 10a are graphs showing the operation of the beacon controller interface in the system;

FIG. 18 is an illustrative map of an area where the recovery interface is operating to recover an item (e.g., child) who may have wandered outside of a prescribed zone;

DETAILED DESCRIPTION OF THE PREFERRED EMBODIMENTS

Structure of the GMMS

Figure 1:
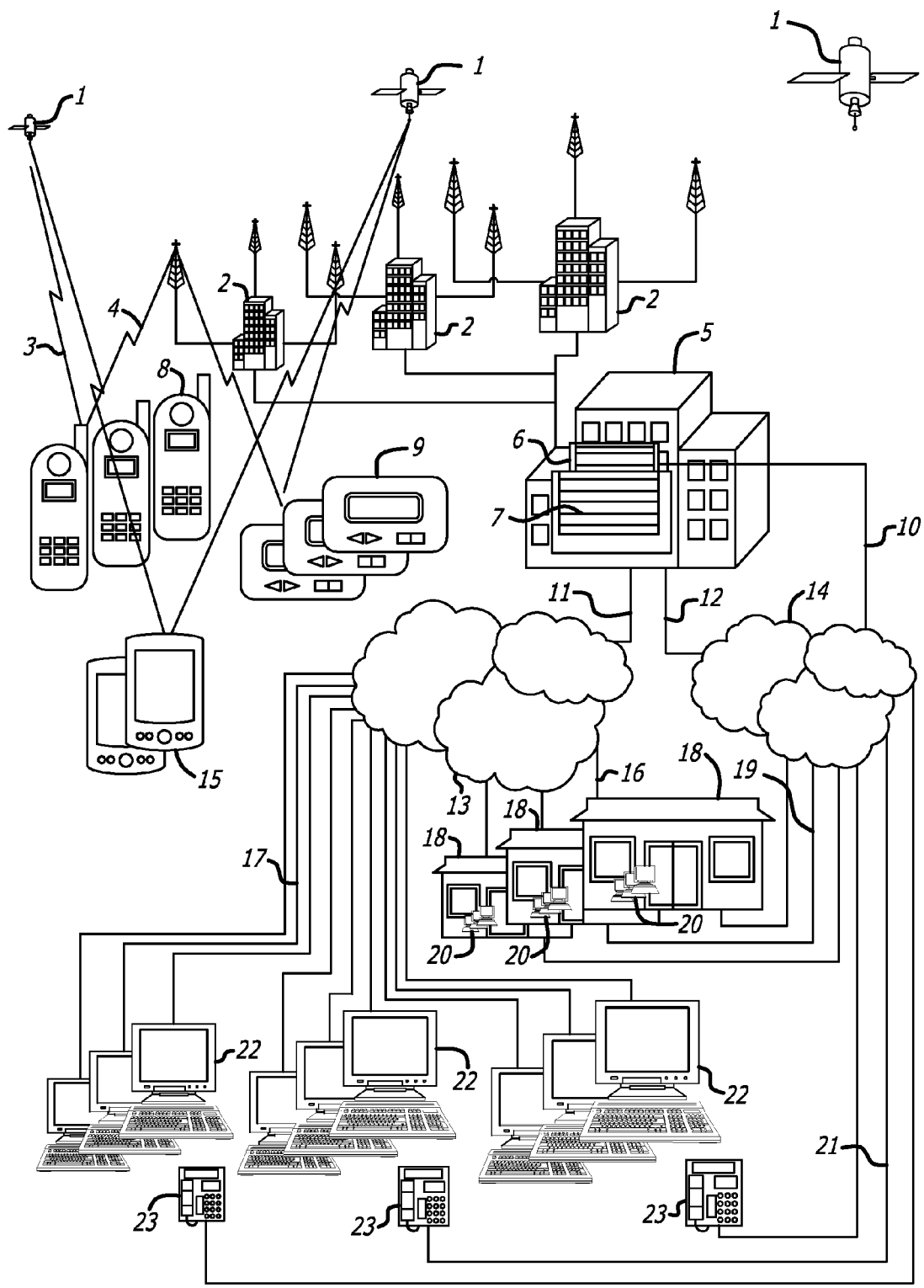
FIG. 1 is a schematic diagram of hardware in a system constituting this invention for monitoring the movement items under the control of beacons coupled to the items.

The GMMS is essentially a large, distributed machine comprising several sub-systems, namely: ASP servers, ASP software applications, beacons, wireless data communications networks, wireless location systems, users' terminals, computer-telephony-integration equipment, a system health monitor, the public switched telephone network, and the Internet.

Deployment

The system is deployed as an Application Service Provider (ASP) meaning that the servers are installed in a secure data center in a central location, or redundant locations, and all applications are accessible electronically from anywhere. Users of the system need only a web browser to access all the applications; however, in some cases a thin client application may be installed on certain users' terminals to enhance the speed and usability of the system.

Full redundancy is created by deploying a set of servers in at least two data centers, widely separated geographically, with automatic failover should one of the data centers experience a complete failure.

It is possible to deploy many separate instances of the GMMS. This would be done in cases where service providers want exclusive use of a set of servers, perhaps housing them on their own premises. These constitute a licensed installation rather than ASP. In most of these cases, the multi-tenant features are disabled because they are unnecessary.

Wireless Location Systems such as GPS (1)

The GMMS uses wireless location as a standard component of its functionality. Because the system is designed for wide area use, and because wireless communications between beacons and servers is an additional requirement, location systems designed for mobile phone networks are generally utilized.

Mobile phone location technologies fall into three broad categories: handset-based, network-based, and hybrid. Handset-based location technologies require that beacons have stand-alone location functionality. A system such as GPS is typical of this category. Network-based location technologies typically use signals generated by the network to calculate location based on triangulation from several communications antenna towers. These technologies, such as TDOA, EOTD and AFLT, do not require any special functionality within the handset—they can theoretically determine the location of any mobile device that is capable of communicating via the network. Hybrid location technologies such as gpsOne (a wireless location technology from Qualcomm) incorporate both network and handset functionality to provide the accuracy of GPS with the signal strength of the terrestrial wireless network.

The GMMS is designed to utilize any of the above location technologies and can readily be adapted to any new location technologies as they are developed.

Wireless Data Communications Networks (2)

The GMMS provides integration with various wireless communications networks, which are used for communications between the servers and all of the beacons and tacking terminals. Communications is typically data only, but may include voice and/or video. There are many systems and technologies used in wireless communications networks, and the GMMS is capable of interfacing with any of them. More information as to how this is accomplished is provided in the software architecture description.

Communications between the GMMS servers and the location networks is typically done through the open webservices standards, which use the HTTP/HTTPS ports. For the GMMS it is necessary to have communications in both directions— both from the servers to the beacons and vice-versa. Messages are passed from the servers to the Beacons for many purposes. These are known as mobile terminated (MT) messages. The following are some examples of messages that will be sent to GMMS beacons:

Transmit your present location, altitude and velocity
    Enter tracking mode
    Disable ignition
    Enable ignition
    Set geofence zone parameters
    Set speed notification parameters
    Unlock door
    Activate audible alarm
    Enable microphone and transmit audio
    Transmit the status of your battery's charge
    Your request for assistance has been received
    Activate vibrating notification The following are examples of messages that will be received from GMMS beacons. These are known as mobile originated (MO) messages:

Panic button activated
    Zone violation detected
    Speed violation detected
    Door opened
    Vehicle engine started Vehicle engine turned off
Physical tampering detected
Electronic Tampering detected
Battery needs recharging
Battery energy is dangerously low
Tremble circuit detects motion
Arm Here (set my present location as my allowed zone till disarmed)

Beacons (9)

Beacon is the term used to generically describe any locatable wireless device within the GMMS network.

A beacon typically contains both a wireless location determining module and a wireless communications module. The location determining module will typically be a GPS receiver, which has the ability to calculate its own geographic position based on signals it receives from satellites. The communications module provides the ability for the GMMS software applications and the beacon to communicate with each other, including the ability for an application to query a beacon for its location.

The location technology associated with some wireless networks may perform the location calculations outside of the beacon. This is done either as a completely network centric location technology or as a hybrid of functionality in the beacon and in the network. In these cases the GMMS applications communicate with the location servers at the wireless networks to determine beacon locations.

Beacons are designed for various purposes and various installations so they have various form factors and interconnection ports. A beacon may be designed to be carried or worn by a person or attached to an object. In that case it would typically be a self-contained unit with integral antennas and battery. Other beacons are designed for use in vehicles. These may have integral or external antennas, and would often have connection ports for linking into various vehicle functions. Another type of beacon is one that is designed for integration into some form of product. This may be just a small electronic module where only the location and communications functions are provided. Electrical power may be provided by the product that the beacon is being incorporated into.

In addition to location, the communications function of the beacon may be used to provide various other communications between the GMMS software applications and the beacon itself, or devices attached to the beacon. Examples of external devices are such things as panic button switches, vehicle power door locks, motion sensors, vehicle ignition disable relays, etc.

The GMMS is designed to integrate with various beacons regardless of which location technology they incorporate, which wireless communications technology they use, or what functions they provide besides location.

Handsets (8)

Many wireless communications networks offer handsets that incorporate, or are compatible with, some form of location technology. This makes the handsets a viable form of beacon for use with the GMMS. Because of this, mobile security service providers can offer their services to any users of compatible handsets.

Whether locatable or not, subscribers to the system may use wireless handsets for receiving notifications from the system or for communicating with operators at the service providers' monitoring stations. Notifications to the handsets can be in the form of text messages, automated voice recordings, or calls from operators.

GPS Signals (3)

The GMMS in not limited to GPS as a location technology, but GPS is the most prevalent wireless locations system in use today. GPS signals are transmitted by the constellation of Globalstar satellites for the purpose of global positioning and navigation. GPS receivers detect these signals and decode their contents to determine their location. A receiver must receive signals from a minimum of three satellites simultaneously to determine its position, and four or more satellite signals will produce a more accurate result. Many GPS receivers are capable of receiving signals from up to twelve satellites simultaneously.

GPS signals are weak and are therefore difficult to detect, especially in areas of signal blockage such as inside buildings. For this reason there have been several enhancements to the GPS system over the years. Some terrestrial wireless networks now provide assist signals which help GPS receivers improve their ability to detect weak satellite signals. These assist signals also make it possible for a location to be determined when less than three satellite signals are available.

In the GMMS, many beacon types utilize GPS as either the sole location technology, or as a component of the location technology. All of these beacons must receive GPS signals.

Tracking terminals in the GMMS may also receive GPS signals to determine their location.

Wireless Communications Signals (4)

Wireless communications signals are the means of communicating between all wireless devices and the servers in the GMMS. The GMMS utilizes various wireless communications technologies and networks, and all beacons and tracking terminals must communicate over one of the incorporated networks. For beacons to be able to communicate with the GMMS servers they must be located within range of the signals of their associated network.

The wireless network may be a satellite system but will typically be the kind of network used for cellular telephony. These networks are being enhanced to offer packet switched data communications in addition to circuit switched voice. In some cases the voice component will be a subset of the packet switched data. Beacons typically need only data communications, however, some beacon models provide a means of voice communications in addition to data. In those cases, data communications will be used between the beacons and the servers, and a voice circuit will be established between the beacon and the user (either the operator or the subscriber) during an incident.

Most beacons incorporate a means of roaming from their home network to a network of the same technology operated by a cooperative carrier. Some beacons even incorporate multi-mode wireless modules which allow them to switch to an alternate network technology if their primary network is not available. This will typically be from a GSM or CDMA digital network to an AMPS analog network.

Subscriber Terminals (22)

Subscribers access the GMMS via any internet connected computing device. Subscriber terminals are used to access the subscribers' personal portals.

The terminals are typically home or office personal computers with Internet browsers. They may also be wireless computing devices such as PDAs or Web Pads.

Mobile Monitoring Service Providers (18)

The service providers are the companies that are enabled by the GMMS to offer mobile, location-based, monitoring services, typically for enhancing security or productivity, or convenience. These companies may be independent of any other service, offering only the services enabled by the GMMS, but are more likely to be companies that are in the security business and are operating a central station for alarm monitoring.

Operator Terminals (20)

Operator terminals are similar to subscriber terminals; in fact they may be identical, with the exception of belonging to the mobile security service provider. They are typically located within the monitoring stations of the service providers and are used to access the operators' portals of the GMMS. In some cases, operator terminals actually run a small local software application called a thin client. This application is designed to enhance, and speed up, the user interface of the GMMS for the operator.

Subscriber Phones (23)

Subscribers' phones are used for two purposes in the GMMS; for contacting the service providers' operators and for receiving automated telephone notifications. The phones may be either traditional wire-line phones or wireless mobile phones.

Tracking Terminals (15)

Tracking terminals are an important component of the GMMS. The primary function of the tracking terminal is the ability to simultaneously display its own location and a specified beacon's location. Tracking terminals are typically used by private security personnel or public officials such as police or rescue workers to assist in the location and recovery of an object linked to a beacon. They access the recovery portals as they are made available by monitoring station operators.

Tracking terminals comprise all the functionality of a beacon, plus a display screen and the ability to wirelessly communicate with the GMMS servers at relatively high speed. The wireless data communications for tracking terminals is generally provided by carriers using GPRS or CDMA technology to link wireless data devices to the Internet.

A tracking terminal may incorporate two separate wireless communications links, one for its beacon component, to provide location data to the GMMS servers, and the other for wireless Internet access, allowing the tracking terminal to operate the GMMS applications.

Tracking terminals access a specific module of the GMMS software that displays both location points simultaneously. This module is also designed to display maps and other controls on the smaller screens of tracking terminals.

Data Center (5)

Deployment of the servers in the Data Center (5) provides security and reliability. Security is provided by virtue of the physical premises being locked and guarded. Reliability is provided by having a controlled environment in terms of temperature and humidity, as well as by the continuous availability of main electrical power.

The Data Center also provides multi-homed, broadband access to the Internet (11) and to traditional telecommunications connections (10).

ASP Software Applications

Additional information is provided in the sections on the individual patents for the applications' functionalities.

Computer-Telephony-Integration (CTI) Equipment (6)

CTI equipment, from companies such as Dialogic, is used for two distinct purposes in the GMMS; the primary purpose is for integration with monitoring stations' automation systems, and the secondary purpose is for automated notifications by phone.

For integration with monitoring stations' automation systems the CTI equipment is used in conjunction with GMMS software to emulate an alarm panel. An alarm panel is the component of a monitored building alarm system that communicates with the monitoring station's automation system using a telephone modem. The GMMS software provides the same signals that an alarm panel would produce to indicate that a specific sensor has triggered an alarm. In the case of a beacon, a standard code indicating a specialized custom sensor is programmed into the system.

CTI equipment allows computer software to control banks of telephone calls, typically used to create interactive voice response (IVR) systems. These systems allow callers to choose from a menu of voice responses by pressing different buttons on their phones. In the GMMS the CTI equipment is used to initiate outbound calls under the control of proprietary GMMS software. The software recognizes when a beacon generates an alarm that is to be handled by an operator at a service provider's monitoring station. The software then initiates a phone call via the CTI equipment to the monitoring stations bank of alarm receivers. When the call is answered, the software instructs the CTI equipment to emulate a call from a building alarm panel. There are a few industry standard protocols used for this type of communications. The GMMS software is designed to utilize any of these protocols, and is preprogrammed for the one in use at each monitoring station it integrates with.

At the monitoring station, an alarm from a beacon enters the alarm queue as a special alarm associated with a specific subscriber. The subscriber may be a subscriber to mobile security services only, or to both mobile and traditional, building-based security services. When the alarm from a beacon enters the alarm queue, it is typically handed off to an operator by a manager. From that point on, the GMMS is used to handle the incident.

The secondary purpose of the CTI equipment is for telephone notifications to subscribers. Subscribers may set up the GMMS software to automatically notify them by phone upon certain conditions such as a beacon reaching a specified location, exceeding a specified speed, low battery, etc. In these cases the CTI equipment is used to initiate a call to the specified phone number and, upon the call being answered, play a prerecorded voice message.

The Internet (13)

The public Internet is the primary network for communicating between users' terminals and the GMMS servers. All of the data communications components of the system are set up to use Internet Protocol. This makes the GMMS accessible from virtually anywhere by subscribers as well as service providers' operators and rescue personnel. Wireless Internet access is also widely available for use by wireless computing devices.

In cases where additional security is necessary for the data communications, virtual private network (VPN) equipment can be used to create a secure, virtual point-to-point link. VPN equipment may be in the form of a hardware-based or software-based component at each end of the link.

Internet Connectivity (11)

Internet connectivity is required for the servers, the service providers' terminals, and the subscribers' terminals.

Connectivity is provided for the servers by the data center that houses them. The data center utilizes very high bandwidth connectivity to ensure that many users can access the system simultaneously without causing degradation in performance. In addition, multiple Internet network providers are utilized in a multi-homed configuration. This allows for load balancing between the providers as well as redundancy in case one of the providers has a malfunction.

For operators' terminals at the mobile security service providers, broadband Internet connectivity must be provided. The bandwidth requirement will be determined by the number of operators who need to simultaneously access the GMMS, and by the expected usage of each operator. Common forms of commercial broadband connectivity such as T1 or ADSL are more than adequate for the majority of cases.

For subscribers, Internet connectivity is required if the self-serve features of the GMMS are to be accessed. The connection may be either narrow band or broadband, and may be either dial-up or "always on".

PSTN (14)

The Public Switched Telephone Network (PSTN) is a necessary component of the GMMS. It is used to provide circuit switched connectivity from the CTI servers to the alarm receivers at mobile security service providers. It is also used to provide circuit switched connectivity from the servers to subscribers' phones for automated voice notifications. The third use of the PSTN is to provide a means of back-up to the Internet connection using a dial-up modem (53). If the primary Internet connection (9) from the service providers should fail, a dial-up system can be used to ensure that services can still be provided. A fourth use of the PSTN in the GMMS is to provide subscribers with voice access to service providers' operators. Some subscribers may not have immediate access to an Internet terminal, or may simply prefer to speak to an operator rather than to perform self-serve functions of the system.

PSTN Connectivity

Subscribers need only access the PSTN via a single, household subscriber line (21). Service providers will require a multi-line connection (19) allowing several simultaneous phone calls. Connectivity between service providers and the PSTN will typically be something like a full or fractional Primary Rate Integrated Systems Digital Network (PRI) connection.

PSTN connectivity at the servers is used for two separate functions; dial-up connectivity (12), as a back-up to the Internet connection, and CTI connectivity (10). Both of these must be multi-line, allowing for multiple simultaneous connections. This connectivity is provided by the data center and may be shared between the two functions, as well as with other users, but is typically a very high bandwidth link allowing many simultaneous circuit switched connections.

ASP Servers (7)

The ASP servers are deployed in a Data Center facility (5) and provide the following functionality:
  Web Server
  Application Server
  Database Server
  Map/Aerial Image Server
  Computer Telephony Integration Server
  Load Balancing Routers
  System Health Monitor Secure GMMS Server Network Since the GMMS is designed for mobile security services, sensitive data is hosted on the platform. For this reason, system security is the most important aspect of the network architecture. The best way to secure the network is by limiting the number of entry points to the servers. This is accomplished by using a carrier-grade firewall and by constantly updating the operating systems and applications that handle those entry points with security software patches.

The GMMS only opens up the HTTP and HTTPs port. These 2 ports facilitate the SSL client connection to the webservers (via Loadbalancers) and the backend webservices connection to the Location network and optional Mapping network.

Client Connection via SSL (11)

Client connections are those made by subscribers using their personal computer (22) and/or wireless handheld computing devices (15). They are also made by mobile security providers' systems (20) to the GMMS servers.

To prevent snooping of private information via the internet, all client connections to the GMMS servers are made through SSL (Secure Socket Layer) connections.

Backup Modem Dialup Connection

In case of Internet connection outage due to a failure of the security provider's broadband provider, the option of dialing into the GMMS servers via a $3^{rd}$-party modem pool (30) is incorporated. This redundant connection clearly provides a slower response than the broadband connection, but it is the best alternative to a complete blackout.

Redundant Load Balancing (24)

Load balancers are incorporated to pipe client connections to the appropriate web servers. These allow a balanced distribution of workload to the various machines within the farm of web servers.

The system is designed for redundancy, with only the primary load balancers being active during normal operation. The secondary load balancers are on hot standby to take over the task if the primary load balancers ever go down.

Webserver Farm (25)

Multiple webservers are deployed to handle times of high volume client connections as well as a means of providing redundancy at this layer. The connections are dispatched to the webservers by the loadbalancers. (This is described in greater detail in the section on software architecture.)

Application Server Cluster (26)

For scalability, the system requires clustering of application servers. In the GMMS this functionality is managed using the J2EE platform. The J2EE Application servers host the EJB (Enterprise Java Beans) that provide the business framework of the GMMS. These EJBs are referenced by the servlets and JSP in the Webservers.

Using the smart clustering capabilities of the J2EE Application servers, connections from Webservers are evenly distributed. The use of multiple application servers also provides the redundancy at this layer.

This is described in greater detail in the section on software architecture.

Redundant Database Server (27)

The database server contains data for all subscribers, customers, locations, beacons etc. It is therefore very important to make sure that these data are available at all times.

The main database server is the active one where application servers read/persist the data to and from. Real-time replication also propagates all data to the backup database therefore ensuring that all data on both servers are consistent at all times and that the backup server is able to take over the role of the active server if needed.

Map/Aerial Image Server (28)

It is a fundamental requirement of the mobile security system that beacons' locations are determined and displayed on computer generated maps. The maps may be graphical representations of the roads and geographic landmarks, or may be geographically encoded aerial images. Users of the system will frequently want to choose one of the two alternatives or switch between them. Computer generated maps require that two software components be operational on the map server; a map rendering engine and a map database. The rendering engine creates the images that are requested and specified by the user, through various other applications, and displays them on the computer screen. To create the images with accurately placed geographic features, a map database is required. The map data can be either a digitized aerial image, accurately encoded with information about the location of each segment, or it can be information regarding the location of all roads, railways, waterways, parks, landmarks, etc.

The mapping function for the GMMS may be realized in two different ways; with a map server (28) or a mapping network (31). The map server is a machine located with the other servers in the data center. This machine operates the map rendering application as well as contains the map and aerial image databases. A mapping network is an alternative system that provides the mapping features for the GMMS via an internet connection to a third-party mapping service where both the map rendering and map data are hosted.

All the same requirements described above for displaying digital maps also apply for aerial images.

System Health Monitor (29)

The system health monitor (29) is a proprietary software application that monitors the health of all services such as the webservers, application servers, databases, CTI, loadbalancers etc. This application enables better management and monitoring of the entire system. It works by continuously emulating various user functions and requests, and then looks for the expected result. If the expected result is not received it reports the anomaly, analyzes the results that are received, and creates error messages that assist operators in diagnosing the problems.

GMMS System Architecture

Figure 22:
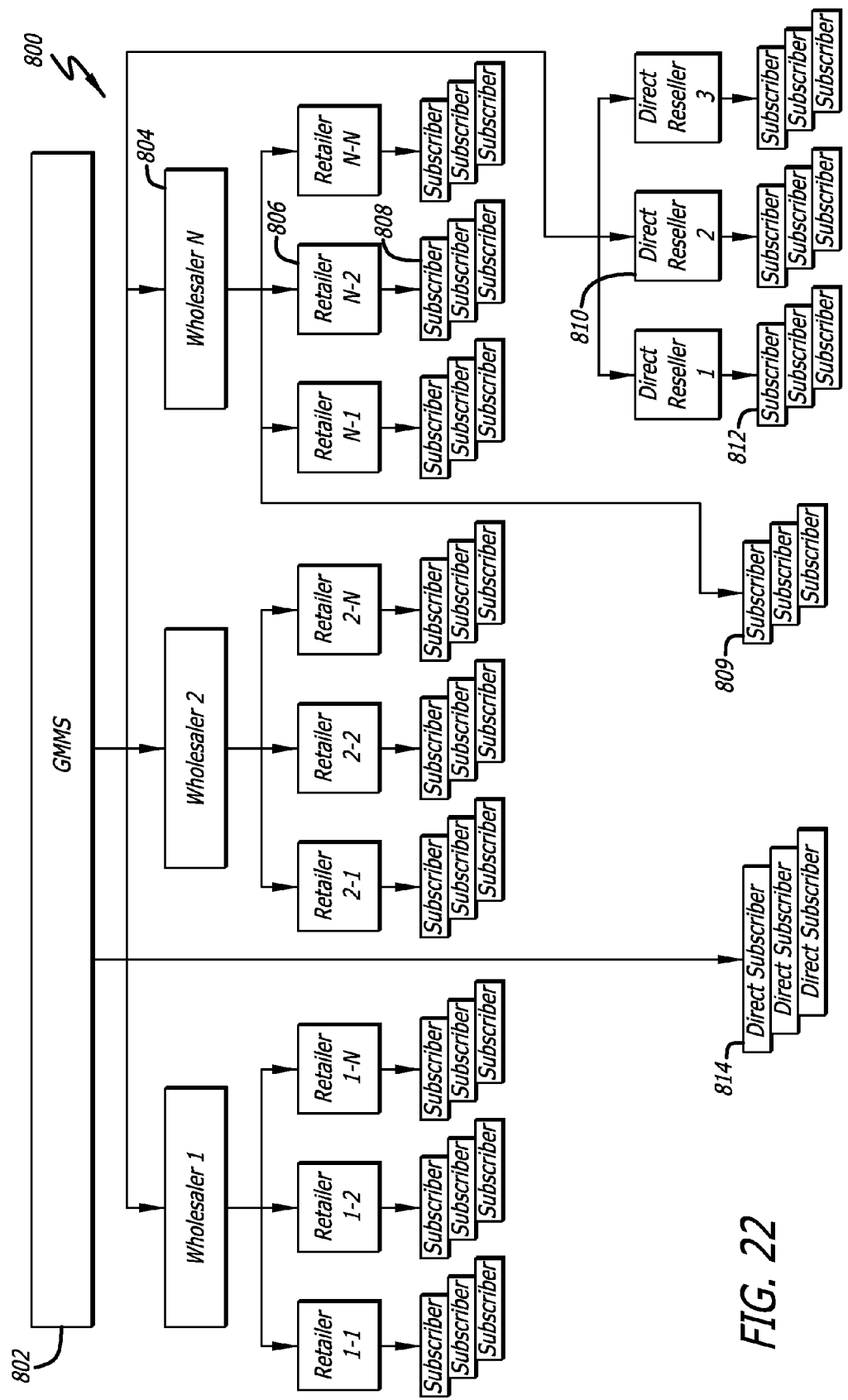
FIG. 22 is a schematic diagram showing the interrelationship between the Guardian Mobile Monitoring System (GMMS), individual wholesalers, individual retailers and individual subscribers in monitoring mobile items in accordance with the flow charts shown in the previous Figures.

FIG. 22 is a block diagram that represents the multi-layer, multi-tenant enabling capability of the Guardian Mobile Monitoring System (GMMS). This functionality is fundamental to the GMMS and must be appreciated in order to understand how the system works. The purpose of the GMMS is to be an "enabling machine". It enables various kinds of companies or organizations to be in the mobile monitoring business. Companies that are enabled by the GMMS are called mobile monitoring service providers. Mobile monitoring service providers may fall into three categories, wholesalers, retailers, and direct resellers. Throughout this document, wholesalers are sometimes referred to as wholesalers, retailers are sometimes referred to as retailers, and direct resellers are sometimes referred to as direct dealers. In addition to enabling these three categories of location-based service providers, the GMMS is capable of providing services directly to subscribers. The term multi-layer is used to describe the wholesalers, retailers, and direct resellers that are enabled by the GMMS. The term multi-tenant is used to describe the coexistence of multiple portals to access the GMMS. Each portal may display a different brand, and all data associated with each enabled company is kept securely separated from every other company, yet all data may be stored in a single database in an instance of the GMMS.

The block diagram, generally indicated at 800, shows the Guardian Mobile Monitoring System at 802. The GMMS enables a first layer of mobile monitoring service providers, called wholesalers, indicated at 804. An unlimited number of wholesalers can be enabled and each one is provided its own portal. The portal is accessible via the Internet and is restricted, using password protection, to users that are authorized by the system administrators. The wholesaler's portal can display the brand of the wholesaler, including its colors, logos, images, and style. Wholesalers provide professionally monitored location-based services directly to subscribers 809, as well as through retailers to subscribers 808. The functionality of the wholesaler portal is described in detail in FIG. 14.

One of the functions of the wholesaler portal is to designate retailers 805. Retailers are provided with access to a subset of the functions of the wholesaler portal but can be given their own branded access. This means that when employees or subscribers of the retailer access the retailer portal they see the retailer's brand. Wholesalers can designate an unlimited number of retailers. The fundamental difference between a wholesaler and a retailer is that a retailer does not typically operate a monitoring station. The retailer relies on the services of the wholesaler to provide mobile monitoring services and management of incidents. Both retailers and wholesalers sell professionally monitored location-based services to subscribers.

There are circumstances where it is not necessary or appropriate to have location-based services that are monitored by a monitoring station. For these circumstances the GMMS provides self-serve functionality. With self-serve functionality, the GMMS provides services directly to subscribers 814. The GMMS also enables direct resellers 810 to offer self-serve mobile monitoring. Depending on the configuration, direct subscribers 814 may or may not see the brand of a wholesaler or retailer when they accessed their subscribers portal. A subscriber of a direct retailer 812 would see the brand of the direct reseller, but would get the same subscriber's portal functionality as any other subscriber.

Figure 21:
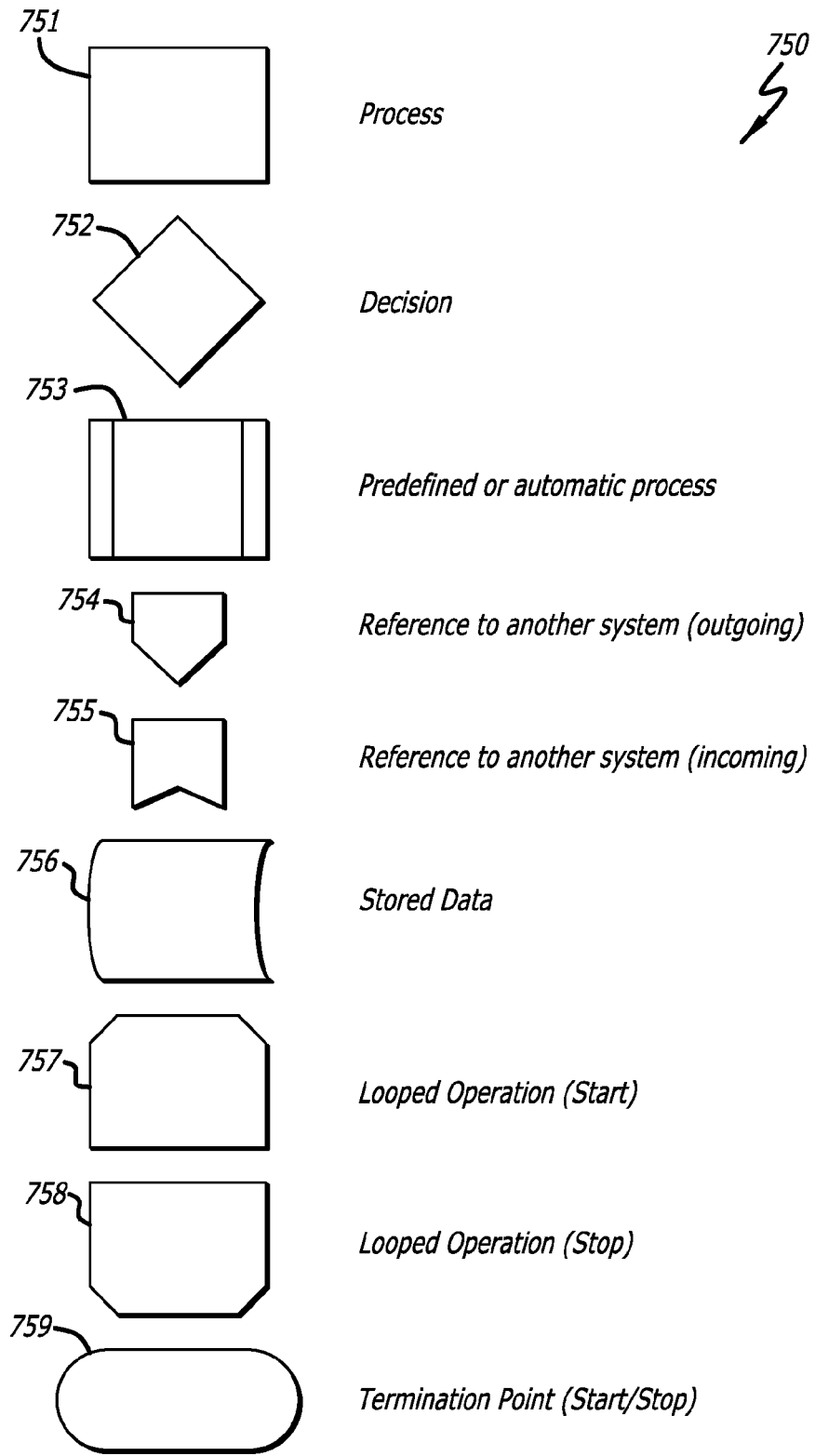
FIG. 21 is a chart indicating a plurality of individual symbols for providing different operations in the system, these individual symbols being provided in the flow charts specified above.

FIG. 21 is a legend depicting the symbols used in the flow charts that are referred to throughout this document. The legend 750 indicates specific logic functions for each of the symbols used in all the Figures. The symbol indicated at 751 represents a process, meaning something that the processor would calculate or an operation it would perform, or an operation or action performed by a User. 752 represents a decision. In some cases the decision is made by a User of the system, and in other cases by the processor according to data that is processed according to a program. 753 represents a predefined or automated process. In some cases this is a process performed by an outside program that is integrated into the GMMS, and in other cases it is an automated process that runs independently in another module of the GMMS. 754 represents a link out of the present module into a module described in another Figure. 755 represents a link into the present module from a module described in another Figure. 756 represents data that is stored in a database for access by a user or by modules of the GMMS. 757 represents the start of a looped operation within a module, and 758 represents the end of a looped operation within a module of the GMMS. 759 represents the termination point, either the start or end of a logic module.

Figure 2:
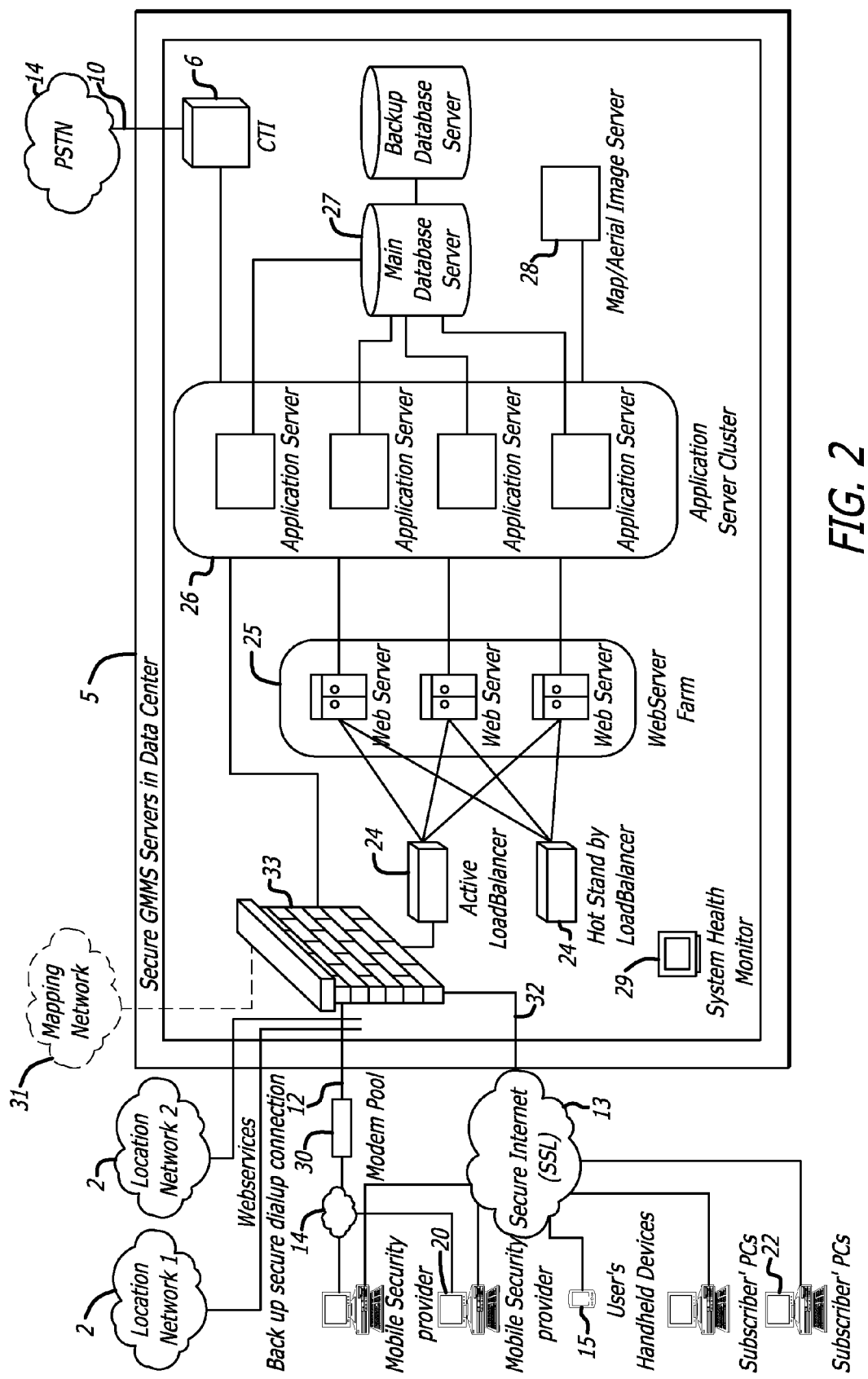
FIG. 2 is another schematic diagram of the hardware shown in FIG. 1.

FIGS. 1 and 2 use corresponding numeral designations to identify corresponding components and sub-assemblies.

FIGS. 1 and 2 schematically indicate the entire Guardian Mobile Monitoring System (GMMS). FIG. 1 indicates the relationship between the GMMS servers 5, the mobile monitoring service providers (wholesalers or retailers) 20, the subscribers' hand-held wireless devices 15, the subscribers' personal computers (PCs) 22 and the beacons 9. The GMMS servers 5 are shown as a large box in FIG. 2. The servers include the firewall 33 which controls the passage of information or data to or from the GMMS servers 5 from or to the mobile monitoring service providers (wholesalers or retailers) 20, the subscribers' hand-held wireless devices 15, the subscribers' personal computers (PCs) 22 and the beacons 9. Information or data can also flow between the mobile monitoring service providers (wholesalers or retailers) 20, the subscribers' hand held devices 15, the subscribers' personal computers (PCs) 20 and the Beacons 9.

The GMMS servers 5 also includes the load balancers 24, the computer telephone integration equipment (CTI) 6 and the system health monitor 29. The load balancers 24 provide for an even distribution of data among the web servers 25. The web servers operate in accordance with software shown in subsequent Figures and described subsequently in this specification. The web servers 25 also display to the user interfaces what the application servers 26 are indicating. The application servers 26 perform the calculations, computations or functions requested by the web servers 25. The database servers 27 read and store the output data from the application servers 26 and store and provide data for subscribers, customers, locations and beacons. The map/aerial image server 28 provides a means to display the locations of the beacons 9. The maps may be graphical representations of the roads and geographic representations of the roads and geographic landmarks or may be geographically encoded aerial images. The system health monitor 29 monitors the health of all servers including the web servers 25, the application servers 26, the database servers 27, the CTI equipment 6, the map/aerial image server 28, the firewall 33 and the load balancers 24.

The computer telephony integration (CTI) equipment 6 is used to provide computer control over banks of incoming and outgoing telephone calls. This equipment is the type typically used to create interactive voice response (IVR) systems. In the GMMS system, incoming calls through the IVR system 6 are used to accept commands from telephones or wireless telephones. Outgoing calls are used to send automated voice notifications, ether prerecorded or computer simulated voice, to telephones or wireless telephones. Outgoing calls are also sent in the form of fax image messages to fax machines or fax modems. Additional outgoing calls are data calls to telephone modems and alarm receivers in mobile monitoring service providers (wholesalers or retailers) 20. These data calls emulate an alarm panel such as the type that would be used in a monitored building alarm system to communicate between the alarm system and the monitoring station.

As will be seen in FIG. 2, the mobile monitoring service providers (wholesalers or retailers) 20, the subscribers' personal computer (PCs) 22 and the users' hand held devices 15 (personal digital assistants—PDAs) 15 communicate with one another through the secure internet (secure socket layer—SSL) 13 which may encrypt data before transmitting the data. The mobile monitoring service providers (wholesalers or retailers) 20, the subscribers' personal computers (PCs) 22 and the users' hand-held wireless devices (such as personal digital assistants—PDAs) 15 also communicate with the GMMS servers 5 through the secure internet 13 which encrypts the data before passing the data to the firewall 33 in the GMMS servers 5.

GMMS Software Architecture

The software architecture for the GMMS system is referred to as the Guardian Agile Mobile Monitoring Architecture (GAMMA). It is described as Agile because it allows flexibility and extensibility on many levels as outlined below. The architecture is unique because it is specifically designed as a platform on which to run the various applications, and interface to the various network components, of the GMMS system. There has never been an ASP software architecture that provides for the integration of wireless networks, location technology, and security alarm monitoring systems.

The GAMMA architecture is comprised of several unique modules specific to the requirements for the interfaces to systems that are external to the GMMS servers. Examples of these are the interfaces to wireless carriers, beacons, monitoring stations, CTI equipment, and mapping servers or services. The requirements of the software architecture are also unique in their ability to allow specific extensions to many of the applications.

Another unique aspect of the architecture is its ability to manage multiple layers of separation and integration between users' data. At the highest level, the architecture allows a single system administration application to access the data associated with all wholesalers, all retailers, and all subscribers. At the next layer, applications can access only the data belonging to a single wholesaler, all its retailers, all its direct subscribers, and all its retailers' subscribers. At a third layer, applications can access data only related to a specific retailer's subscribers, and at a fourth layer, applications can only access the data belonging to a specific subscriber.

The architecture also enables multi-tenant access by allowing for customized branding at each layer. Each subscriber will see only their service provider's brand, or the brand of an assigned retailer of their service provider. The administrator can create and assign brands to any service provider or any retailer. A service provider can create and assign brands to any of its retailers but not to any other service providers' retailers.

A fundamental advantage of the GMMS system over any other systems that incorporate wireless location is that the GMMS system is a multi-user system. This means that anyone authorized to locate a beacon can do so at the same time as any other authorized users. A subscriber, a guardian, an operator, and a police official could all be tracking the same beacon simultaneously. Each of the users could be using their own portal, or any portal they are authorized to use. The GAMMA architecture provides the framework for this multi-user functionality.

An additional architectural feature is the ability to allow many users to program many events to occur automatically and repeatedly based on each user's individually defined, and re-definable, schedule.

Guardian Agile Mobile Monitoring Architecture

The Guardian Agile Mobile Monitoring Architecture (GAMMA) is an application framework that enables the functions and features within the GMMS system. The framework diagram above demonstrates the logical functional groupings and component interactions between various modules within the system.

Presentation Manager (1)

The Presentation Manager is a component plug-in architecture that allows a variety of devices to connect to the system. Within the Presentation Manager, each device type can have a specific user interface that is customized for the form factor and usability constraints of that device type.

Access Manager (2)

The Access Manager functions as an intermediary application used for security and access control to the various modules described below. The Access Manager controls the level of feature access given to the various external user types in the system, and provides a method for easily adding new user types to the system automatically. For example, the Access Manager will control how emergency personnel, such as police or private recovery individuals, can access current location data, and prevent access once an incident is deemed closed by an operator.

Guardian Administration Module (3)

The Guardian Administration Module provides a framework for all of the functionality required by internal Guardian account management and systems operators. Included in this module are the following components:

Admin Manager—provides user rights and permissions functions for all Guardian users.
  Customer Manager—allows Guardian administrators to create and manage Customer accounts and associated data.
  Beacon Manager—acts as a central area for storing and managing all beacon data, including size, weight, battery consumption, color choices, etc.
  Inventory Manager—provides a system for managing beacon inventory across all Guardian customer installations.

Service Package Manager—provides Guardian marketing and account managers with the tools to create default service packages and billing options for customers, including monthly price, included locates, overage prices, and all associated costs.

Monitoring Station Administration Module (4)

The Monitoring Station Administration Module acts as the heart of the system used by monitoring station owners and operators to manage their mobile monitoring services. The module contains the following components:

Operator Manager—gives the monitoring station owner and senior operators the ability to create a variety of operator types and assign rights and permissions to each type, thereby controlling access and functionality within the system.

Beacon Manager—as a subset of the Guardian Beacon Manager, this component allows operators to view beacon specifications for each device the monitoring station has chosen to offer.

Inventory Manager—this component gives the monitoring station the ability to manage their beacon inventory to determine which beacons are On Order, In Stock, or Sold. It also gives Monitoring Station owners the ability to order new inventory automatically.

Account Manager—provides operators with complete account management functions for residential and commercial accounts.

Incident Manager—provides operators with full incident management for handling emergency or non-emergency location inquiries. Includes queue management and distributed incident handling capabilities with automated event reporting and historical drill down.

Report Manager—gives operators robust report creation tools for reporting on accounts, incidents, and operator activity.

Billing Manager—gives senior operators or monitoring station owners the ability to export current or historical billing files to a wide variety of formats.

CRM Interface—provides a flexible export capability to integrate into third party CRM tools used within the monitoring station.

Service Package Manager—gives monitoring station owners the choice to use pre-existing service packages or the ability to create new service packages and assign these packages to new or existing users.

Automation Integration Manager—provides the custom modules necessary for integrating into various automation software suites within a monitoring station. New integration modules can be added seamlessly without requiring any downtime.

Beacon Communications Protocol—used as a central object store for the communications protocols for each beacon type on each network. The protocol includes the commands necessary to control the functions of all proprietary beacons.

Activity Logger—used to log changes within the system for security auditing and tracking of changes made to data.

Recovery Interface—Provides the controls that allow the operator to authorize emergency personnel to have limited access to a subscribers account during an incident.

Subscriber Administration Module (5)

The Subscriber Administration Module gives end users the ability to perform a variety of functions and manage their own data. This module gives the end user the flexibility to use the system with or without the assistance of a monitoring station operator. The module includes the following components:

Location Manager—gives the subscriber the capability of performing a one-time locate or continuous tracking of one or more dependents or assets.

Beacon Manager—provides the subscriber with a view of all of the beacons associated with their account, and enables the subscriber to assign a beacon to an asset or dependent.

Dependent Manager—enables the management of an unlimited number of dependents, including personal data such as name, nickname, age, height, weight, identifying marks, etc. It also includes the ability to upload photographs, assign guardians, and manage schedules and zones for a specific dependent.

Asset Manager—gives the subscriber the ability to manage an unlimited number of assets, including specific data on type of asset, characteristics, serial numbers, photographs, etc. It also provides for assignment of guardians, zones and schedules.

Guardian Manager—allows for the creation of an unlimited number of guardians, including an unlimited number of contact methods for each (home/office phone, cell, email, SMS, etc.). As mentioned above, one or more guardians can be assigned to one or more dependents or assets.

Zone Manager—gives the subscriber the ability to create an unlimited number of allowed or disallowed zones. A zone can be assigned to one or more dependents or assets, as needed, and can be activated or deactivated according to a schedule.

Schedule Manager—provides the subscriber with tools for creating an unlimited number of schedules that can be associated with a zone, and assigned to one or more dependents or assets.

Notification Manager—includes a variety of notification and messaging tools for sending event driven alerts to a subscriber or an assigned guardian.

Profile/Account Manager—gives the subscriber the ability to update personal information and to view account activity, including location requests, changes made to data within their account, and historical billing data.

Monitoring Station Interface (6)

The Monitoring Station Interface (MSI) provides the critical software link between GAMMA and the alarm queue interfaces at the Monitoring Station. This interface allows location alarms to appear within the alarm queue at a monitoring station in order to effectively integrate into existing workflows and procedures. Additionally, the MSI includes both "least cost routing" algorithms (used to establish a connection with the monitoring station in the most economical method), as well as a "smart routing algorithm" that automatically tries a variety of communication methods should the primary method fail. The MSI architecture is designed to support multiple integration methods, including the following:

Wireline Telephony—using CTI hardware, the Wireline Telephony interface provides the necessary call control protocols to set up and establish communication with the hardware resident in a monitoring station, provide the appropriate handshake and data transmission, and terminate the call appropriately.

Wireless Telephony—provides the same functionality as above over a wireless connection.

TCP/IP—provides the same interface functionality to transmit location alarm data but using a secure TCP/IP connection.

Location Network Interface (7)

The Location Network Interface (LNI) is the primary communication method between the Guardian system and location-enabled networks such as SprintPCS. The LNI manages all location request/responses and acts as an abstraction layer between GAMMA and external systems. This allows a new location data provider to be instantly added to the GMMS system with no impact on the availability of the system. Furthermore, the LNI takes the best available location data from a location data provider and transforms it in such a way so as to present to the user only the relevant information.

Mapping Interface (8)

The Mapping Interface provides a data access layer that is abstracted from the core business logic with the other systems described above. This level of abstraction will enable the application to seamlessly integrate with multiple mapping vendors and will protect the core business logic from being too tightly integrated with any one vendor. This will ensure that Guardian can add new mapping engines as necessary and that in the event of a supplier failure a new mapping engine can be added quickly.

GMMS Network

Figures 1, 3:
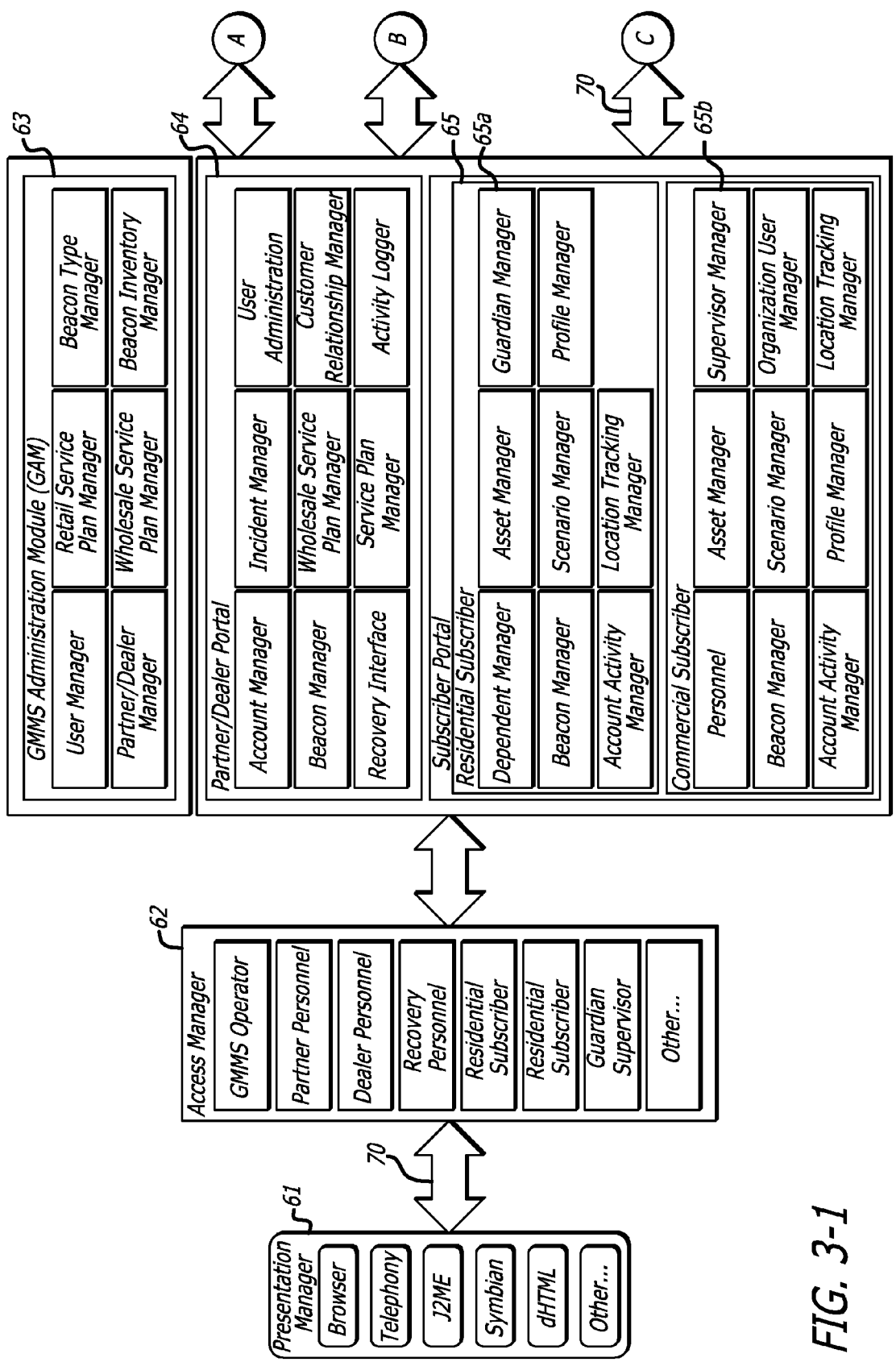
FIG. 3 is a schematic diagram of software architecture in the system.
Figures 2, 3:
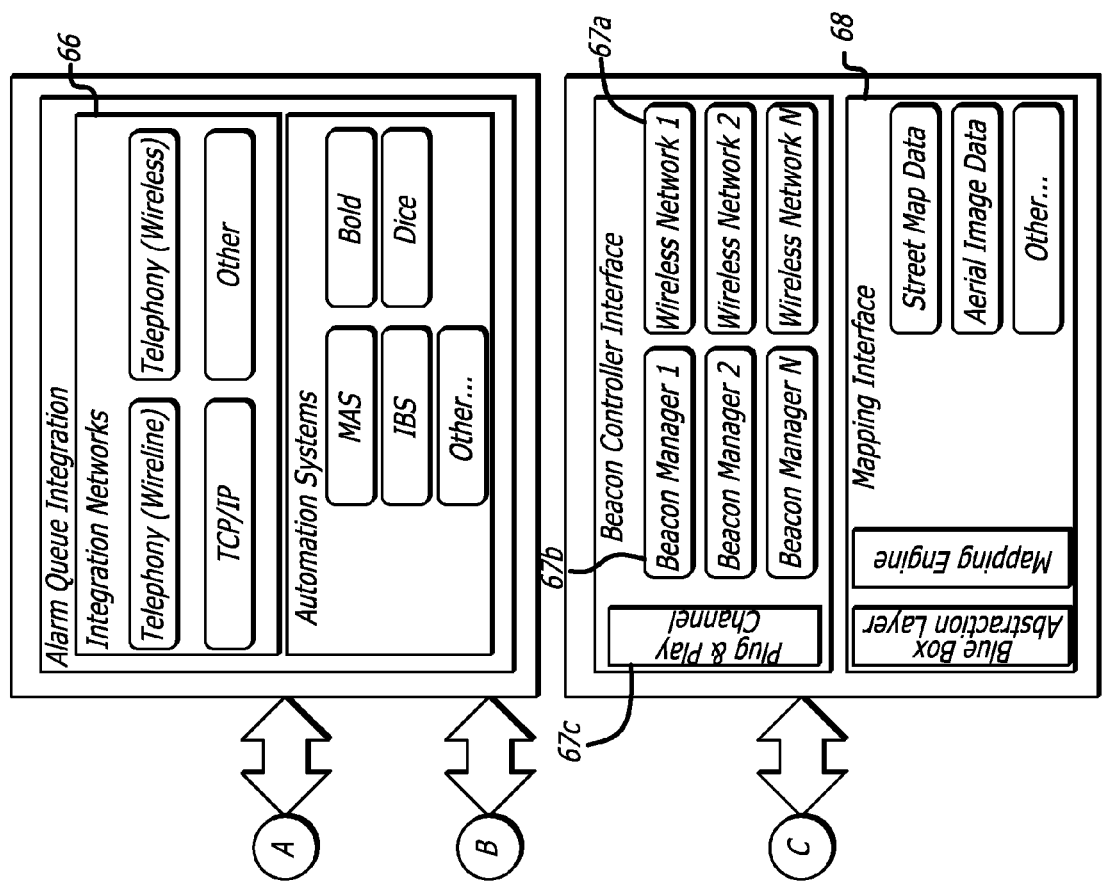

FIGS. 1 and 2 constitute hardware. Actually, they constitute the various networks and devices that, when linked together in the manner shown, form the entire Guardian Mobile Monitoring System. As previously indicated, FIGS. 1 and 2 have the same numerical designations to identify corresponding components and sub-assemblies. FIG. 3 constitutes software architecture which controls the operation of the hardware shown in FIGS. 1 and 2. FIG. 3 includes a presentation manager 61 which provides for appropriate presentation of the User interface for the different types of communications devices listed in the presentation manager. These include browsers, wireless application protocols (WAP), Java 2 Micro Edition devices (J2ME) such as personal digital assistants (PDA) and smart-phones, as well as telephony applications and other interface types.

The software architecture in FIG. 3 also includes an Access Manager 62. The access Manager may provide access to a Guardian Mobile Monitoring System (GMMS) operator, a Monitoring Station (MS) operator, Retailers, Recovery personnel, Commercial and Residential Subscribers, a Guardian and others. The software architecture shown in FIG. 3 also describes modules that allow management of various functions such as a Guardian Administration Module 63 which consists of various management modules. These may include a User Manager, a Wholesaler/Retailer Manager, a Retail Service Plan Manager, a Wholesale Service Plan Manager, a Beacon Type Manager, and a Beacon Inventory Manager. The Guardian Administration Module provides access to the management modules for Users internal to the Guardian Mobile Monitoring Systems, Inc. company.

The software architecture also includes a Monitoring Station Administration Module 64. Nine (9) different management modules are shown. They constitute Account Manager, Beacon Manager, Recovery Interface, Incident Manager, Report Manager, Service Plan Manager, User Administration Manager, Customer Relationship Manager, and Activity Logger. The management modules within the Monitoring Station Module provide access to the various functions required by operators in the monitoring station of a security alarm monitoring company.

The software architecture also includes a Subscriber Administration Module 65. This module provides management modules for subscribers, the persons or organizational entities paying the monthly bills. The module 65 is split into two sub-modules: Residential Subscribers 65a and Commercial Subscribers 65b. The Residential Subscriber module 65a includes the following management modules: location, Beacon, dependent, asset, Guardian, scenario, account activity, and profile. The Commercial Subscriber module 65b includes the following management modules: location, Beacon, personnel, asset, Supervisor, scenario, account activity, Organization User and profile. A Monitoring Station Interface 66 may be also included in the software. The interface 66 allows the GMMS to interface with monitoring station automation systems. The interface may be via a variety of data networks and may include telephony (wireline), telephony (wireless) and TCP/IP.

A Beacon Controller Interface 67 may also be included in the software architecture. The Interface 67 may include wireless networks 1, 2 . . . n, and has the ability to interface with multiple wireless networks of different technologies 67a. The wireless networks may communicate with a Beacon Manager 67b which in turn communicates with the Plug and Play Channel 67c. The Plug and Play Channel communicates with, and receives signals from, modules 63, 64 and 65. The software architecture may additionally include a mapping interface 68. The mapping interface 68 may include a street map provider, an aerial map provider and other providers.

Hollow arrows 70 are included in FIG. 3 to indicate the intercommunication between the different modules and interfaces shown in FIG. 3. The arrows show that the communications may occur in both directions.

Beacon Controller and Location Network Interface

Beacon Controller Overview and Problem Description

In order to provide mobile monitoring services, the Guardian software system interacts with wireless locatable devices, known as beacons. Each beacon contains a GPS receiver used to calculate a position, and a wireless modem used to receive commands from and send results and status messages to the Guardian system.

Beacon Complexity

As is common with commercial and consumer electronics, there are many manufacturers of beacons, and this number continues to grow every day. Each beacon type from each manufacturer supports a variety of features, and while some manufacturers support "common" features, the implementation of each feature within each beacon is typically handled in a different manner. In addition, the protocol used to turn a specific feature on or off is different for each manufacturer's beacon. Many beacons also provide input and output functionality for interacting with other systems, such as in-vehicle diagnostic computers, power door locks and more. The problem is further exacerbated when one considers that each beacon model from each manufacturer may contain different versions of firmware, which may therefore support different features. All of these variables can result in a large number of possible combinations and permutations of device and feature mixes.

Another variable is that each beacon type must operate within the bounds of an existing wireless network, such as the wireless networks deployed for cellular communications. There are many such wireless networks, including, but not limited to, the following:

Cellemetry (a control channel digital message system)
TDMA (Time Division Multiple Access)
GSM (Global System for Mobile Communications)
CDMA (Code Division Multiple Access)
iDEN (Integrated Digital Enhanced Network)
CDPD (Cellular Digital Packet Delivery)

Finally, for each wireless network technology, there is often more than one carrier in each country using each technology. For instance, in the United States there are at least two CDMA carriers (Verizon and Sprint).

Due to this level of complexity, it is easy to see how a software application that integrates these different beacons can become exceedingly complex, and therefore unusable for all but the savviest of users.

Common Beacon Features

Before providing details of how a Beacon Manager can multiplex users' requests into a single Beacon, it must be understood what the common features are for a GPS Beacon.

Multiple Beacons per Subscriber

Each subscriber may also have multiple beacons in their possession. Take the example of a residential subscriber that may have two vehicle beacons, one child beacon, one personal beacon, one pet beacon and a beacon for an elderly parent. Each beacon will have been purchased for a specific purpose and will therefore have a specific form factor and set of features that are best applied to the intended use (people tracking versus vehicle tracking for instance). The subscriber does not want to know about all of the complexities described

| Feature | Description |
| --- | --- |
| a. Single-Point Locate | Request the beacon to report its current or last-known position. |
| b. Multi-Point Tracking | Request the beacon to repeatedly report its current position at specified intervals for a specified duration. |
| c. Threshold monitoring | Request the beacon to report an alert if it exceeds or falls below a predefined threshold. Examples for a vehicle beacon include: alert the system when going out of a predefined geofence or exceeding a predefined speed. |
| d. Auxiliary control | Request the beacon to perform some function on the Auxiliary the beacon is installed on. Example for vehicle beacon: Lock/unlock doors, arm vehicle alarm, disable/enable ignition. |
| e. Auxiliary report | Request the status of the Auxiliary the beacon is installed on. Example for vehicle beacon: battery life, tire pressure, engine oil level etc. |
| f. Panic button | A button attached to a beacon can be pressed by the user in case of emergency to notify the system. |
| g. Buffering | A state when the beacon is not performing any requested processes. It is constantly receiving and buffering the latest GPS location data into its memory, approximately once per second. |

Within the construct of the Guardian system, we can state our problem as the following:

Many beacon types each with different feature sets and different protocols (often only providing access to one feature at a time), communicating over different wireless networks via different carriers creates a level of complexity that must be abstracted away from the user.

or ($n$ beacon types)*($n$ features)*($n$ wireless networks)
*($n$ wireless carriers)=possible combinations Multi-Threaded, Multi-User System The problems stated above are even more complicated when one considers that most beacons use small, low power embedded processors that are typically only capable of performing one task at a time. This is satisfactory in a situation where only one user is ever allowed to operate a single feature for a single beacon at any one time through a system, because the system can force the user to request a feature and wait for a response prior to permitting the user to request another feature.

The Guardian system is unique in that it is a multi-threaded, multi-user system. This means that one user can request multiple features from a beacon at any one time, and multiple users can interact with a single beacon simultaneously. For example a subscriber may have initiated a speed monitor for a vehicle, and while that speed monitor is "on", the subscriber also requests a tracking session from the beacon. In another example, a security operator, a subscriber and a recovery person could all be attempting to track a beacon at the same time. Rather than locking out all other users except for the initial user who requested the feature, the Guardian system enables all of the users to interact with the beacon using intelligence built into the system.

above, or about the intricacies of the wireless networks on which the beacons communicate. Rather, the subscriber just wants the system, including the beacons, to work as described. Furthermore, the subscriber should be reasonably shielded from the variations in the feature set of different beacons to further reduce the complexity of the system. A common user interface is required regardless of the beacon's features, functions, location technology, or wireless communications network.

Problem Solution—The Beacon Controller Interface.

In order to solve the problems indicated above, Guardian has designed what is known as the Beacon Controller Interface (BCI). The BCI is designed to abstract the complexities of individual beacons and associated wireless networks away from a generic set of features that are exposed to a subscriber via the user interface. The BCI also overcomes the limitations inherent to beacons and allows multiple users to control a single beacon. Simultaneous tracking, geofence monitoring, speed monitoring etc. can be achieved via the unique GMMS system architecture. Additionally, the BCI works to eliminate the need to send redundant and/or unnecessary messages, thereby decreasing system and wireless access cost.

Figure 4:
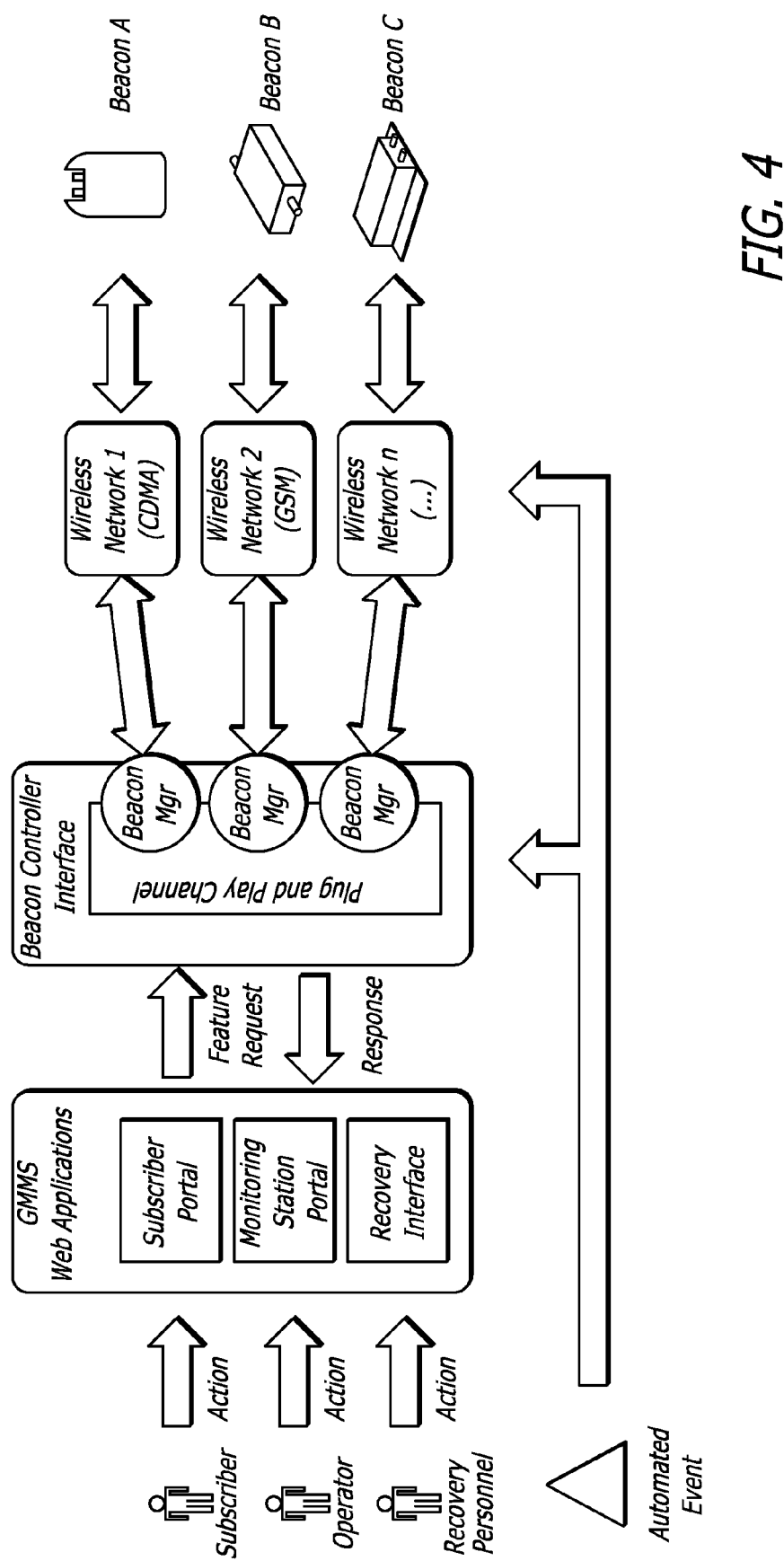
FIG. 4 is a flow chart on an overview basis of a beacon controller interface included in the system.

FIG. 4 shows the high-level process flow for how requests are brokered through the system. It will be expanded in detail subsequently. At a high level, the BCI contains two modules—the Plug and Play Channel (PPC), and one or more Beacon Managers (BM).

Plug and Play Channel (PPC)

The PPC essentially acts as the master traffic manager module that brokers all feature requests from the user application, dispatches each request to the appropriate Beacon Manager (BM), and returns the appropriate response to the web application as necessary.

Beacon Manager

A software entity called a Beacon Manager is assigned to each Beacon in the GMMS system. Each Beacon Manager is responsible for managing the actual state of its beacon's operation, and all users' requests to that beacon. By keeping track of each user's request and the current state of the Beacon, the Beacon Manager can intelligently serve all users' requests.

Example 1

Subscriber Requests Single Point Locate

A subscriber wants to locate their lost dog by going to the Subscriber's Portal and logging into the web application. The subscriber would then choose to locate their dog. The web application would then send a generic "single point locate" request to the PPC, which would match the requesting subscriber's account and associated beacon to the correct beacon manager, and then the BM would send out the appropriate command formatted for the device, via the appropriate wireless network. Once the single point locate was returned from the device through the wireless network, the reverse flow would occur whereby the BM would receive the data, interpret the data, format the data, send it to the PPC, which would then dispatch the response to the web application for processing and display.

Example 2

Zone Violation

A subscriber has had their car stolen during the middle of the night while a zone was set around the perimeter of the vehicle. Once the vehicle crossed the zone boundary, the beacon would automatically report the violation over the wireless network to the BM, which would send an alert message to the PPC for delivery. The PPC would then dispatch that message to the Web Application which would act on the alert accordingly. Typically a monitoring station operator would then view the incident alert, accept the incident, and the system would request a tracking session from the PPC. The PPC would then receive the generic "tracking" request from the web application, match the requesting subscriber's account and associated beacon to the correct beacon manager, and then the BM would send out the appropriate command formatted for the device, via the appropriate wireless network. Once the tracking locates were returned from the device through the wireless network, the reverse flow would occur. This would continue until an incident was resolved.

Example 3

Multi-User Locate Request

As above, but the subscriber also logs into the system to track their stolen vehicle. When a subscriber logs in to locate their vehicle the system will typically send a "tracking" request to the PPC, which will then send the command to the appropriate beacon manager; however in this situation, intelligence in the beacon manager checks the status of the beacon and determines that it is already in "tracking" mode, and instead of sending a second, redundant command, the beacon manager merely provides the harvested locate points to both the monitoring station application as well as the subscriber application.

Example 4

Simultaneous Tracking Request and Zone Violation

A user has initiated a tracking request to find a lost dog while a zone is "on". When a subscriber logs in to track their lost dog, the system will send a "tracking" request to the BCI, which will then send the command to the appropriate beacon manager; however in this situation, intelligence in the beacon manager checks the status of the beacon and determines that the beacon is currently in a "zone on" state. Because this specific beacon can only perform one task at a time, the BM sends the beacon a command taking it out of "zone on" mode, and into "tracking" mode. While the locate points come into the system, the BM inspects each point to manually determine if the beacon is still within the prescribed zone or not. When the subscriber ends the tracking session, the "end tracking" request is received by the BCI which dispatches the request to the BM. At that time, the BM has the intelligence to send a command to the device to turn tracking off, but turn the Zone command back on. This intelligence provides the Guardian system with the ability to process multiple beacon operations even though the beacon itself does not have that capability.

System Flow Charts

This section of the document describes the step-by-step logic flows contained in the system software.

Beacon Controller Interface

Figure 5:
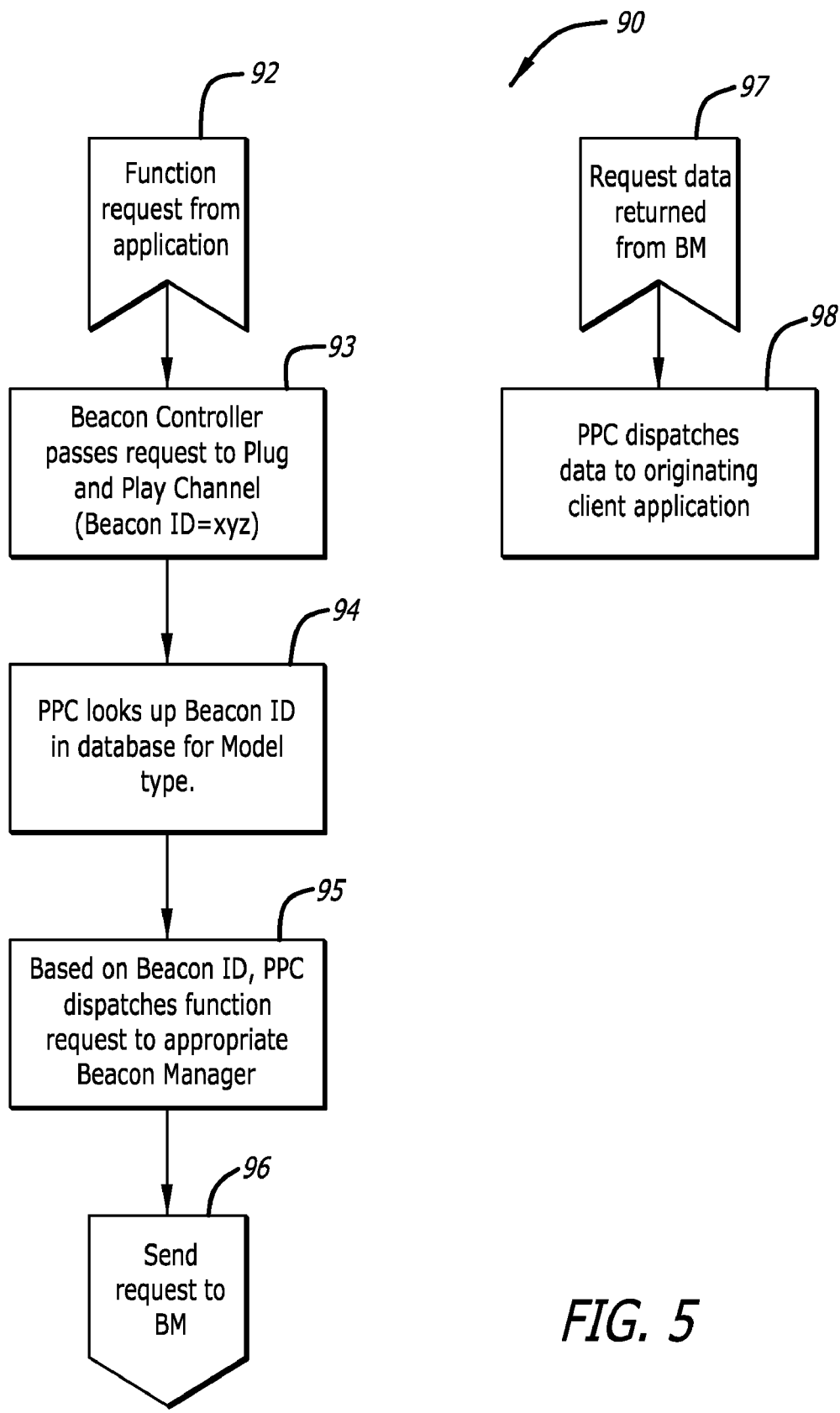
FIG. 5-8 are flow charts showing the operation of the beacon controller interface in additional detail.

The BCI receives all beacon requests from the system, and uses the Beacon ID to determine the model of beacon, and therefore which Beacon Manager to dispatch the request. All Beacon Managers receive requests and send replies via the Plug and Play channel in the BCI. The Beacon Control Interface flow chart is shown in FIG. 5. It will be explained in detail subsequently.

Beacon Manager Request-Reply Feature

Figure 6:
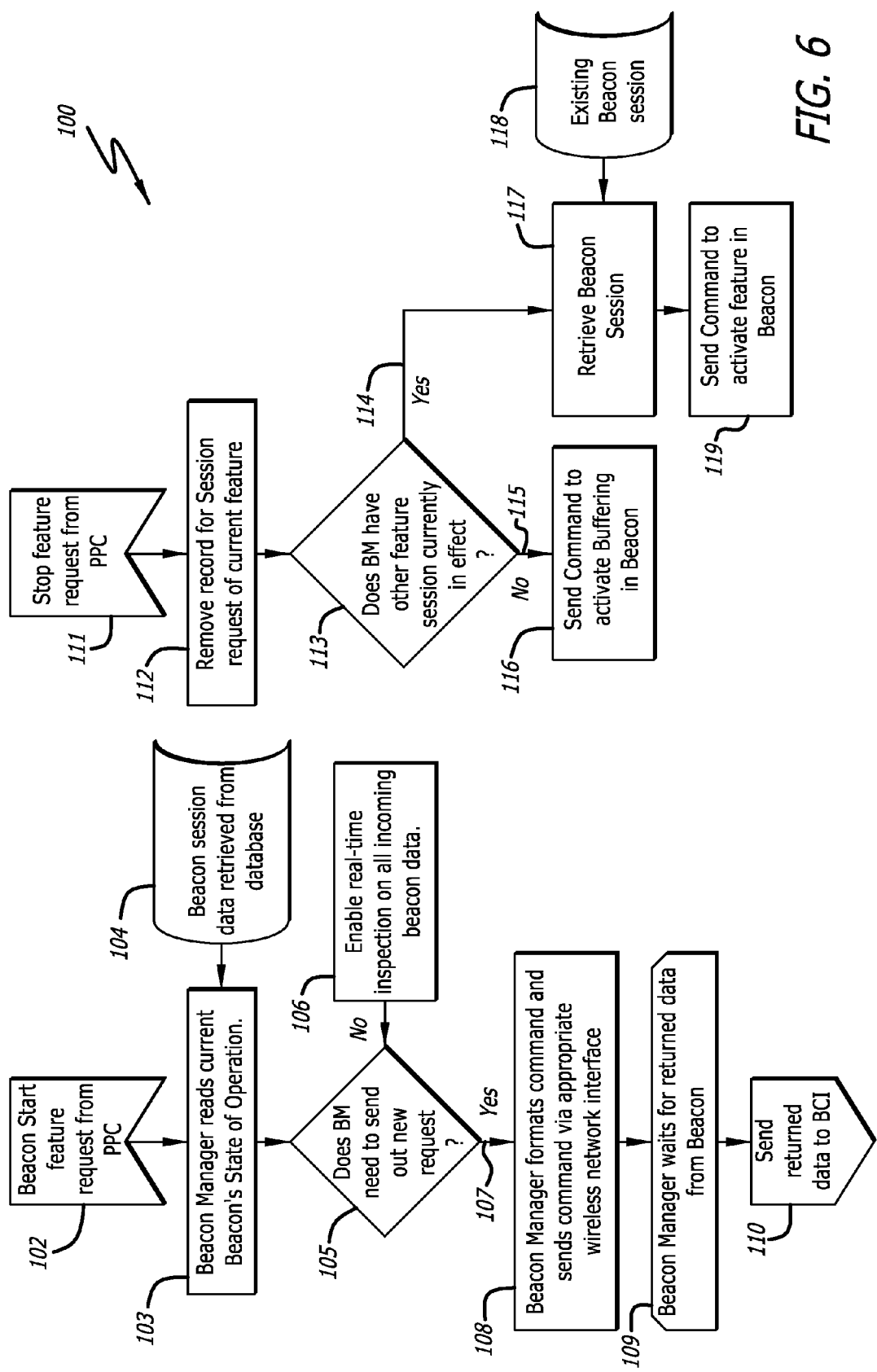

This diagram provides a high level, abstracted view of a generic feature request-reply process that is handled in the Beacon Manager. When the Beacon Manager receives a request from the BCI via the PPC, the BM checks the current state of the beacon, sends out the current command (if necessary) and upon completion of the current command function, returns the beacon to the previous state if that state is still in effect. The Beacon Manager Decision Flowchart is shown in FIG. 6. It relates to the request-reply feature. It will be explained in detail subsequently.

Beacon Manager Tracking Feature

The tracking feature provides the ability for one or more users to track a beacon. With this feature the BM accepts the request from the PPC, and initially checks to determine if the beacon is already in a tracking state (ie. This would be a pre-existing request from a different user). If the beacon is in a tracking state, the BM checks to determine if the new tracking request has a duration that is longer than the session that is currently in effect, and if so, sends the beacon an updated command to extend the tracking duration.

It is also important to note that when a tracking session expires or is stopped by a user, the BM checks to determine if the beacon was in a pre-existing state (such as, but not limited to a threshold monitor). If so, the BM returns the beacon to the previous state, thereby ensuring that the user will continue to receive the expected messages. In addition, the system continues to use the data harvested from the beacon, and compares this data against the parameters of pre-existing states to take the appropriate action even when the previous state may be suspended at the beacon level. In this way, the system overcomes the single-function limitation of the beacon.

Beacon Threshold Monitoring Feature

Figure 7:
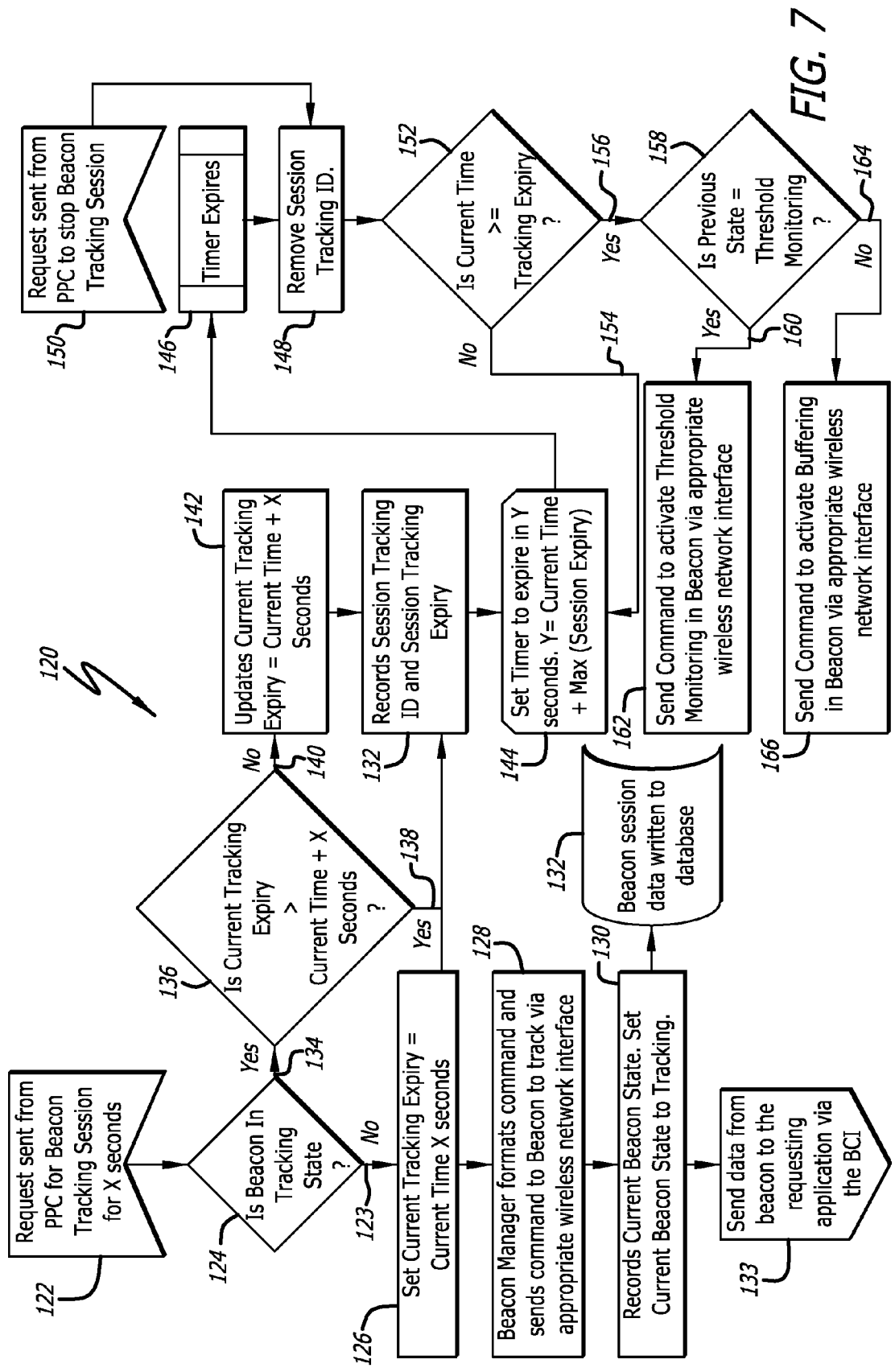

The threshold monitoring feature includes, but is not limited to, such features as zone monitoring and speed monitoring. When the BM receives the request to go into a threshold monitoring state, the BM checks to determine if the beacon is currently in a tracking state. If so the system simply uses the data harvested from the beacon while in a tracking session to compare against the parameters of the threshold settings. If the beacon is not in a tracking state, the BM sends a threshold request to the beacon. The Beacon Manager Decision Flow Chart is shown in FIG. 7. It relates to the tracking feature. It will be explained in detail subsequently.

Beacon Timeline Examples

Figure 8:
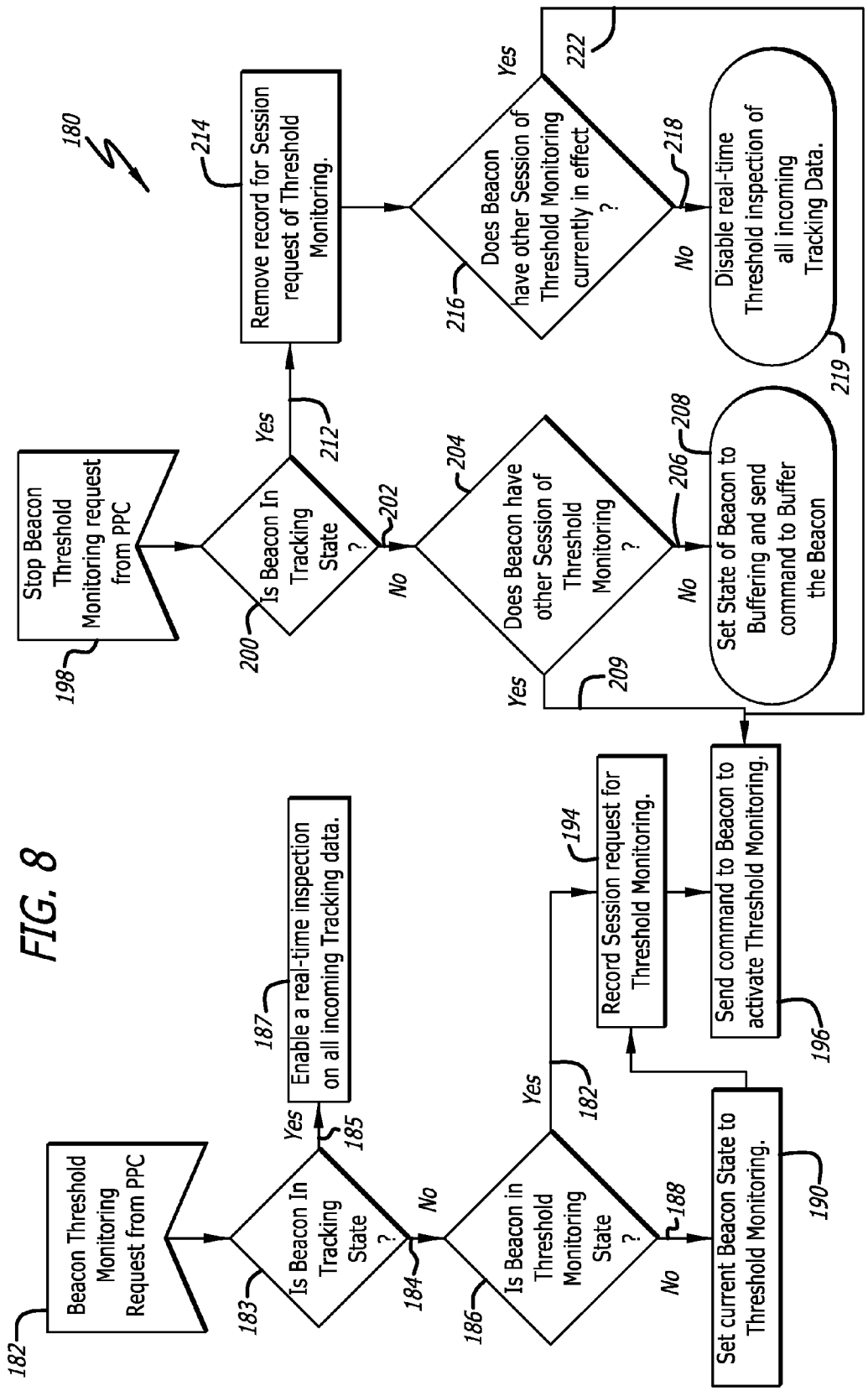

The diagram shown in FIG. 8 provides a few examples of the state transitions required to manage multiple feature requests in parallel. It relates to the threshold monitoring feature. It will be expanded in detail subsequently.

Figure 10A:
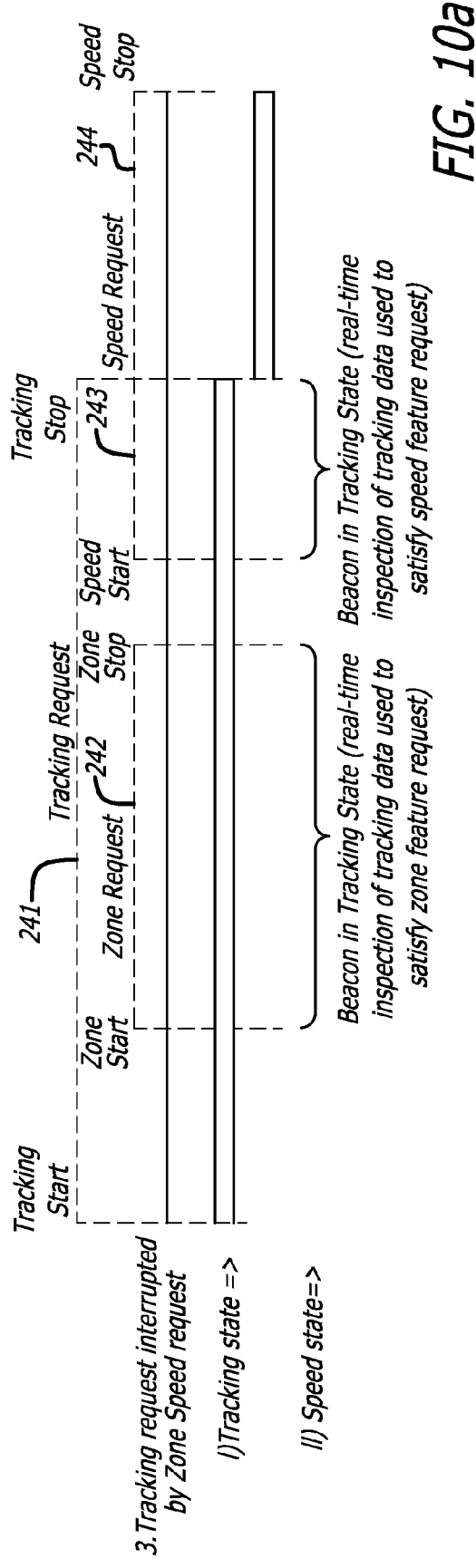
Figures 1, 11:
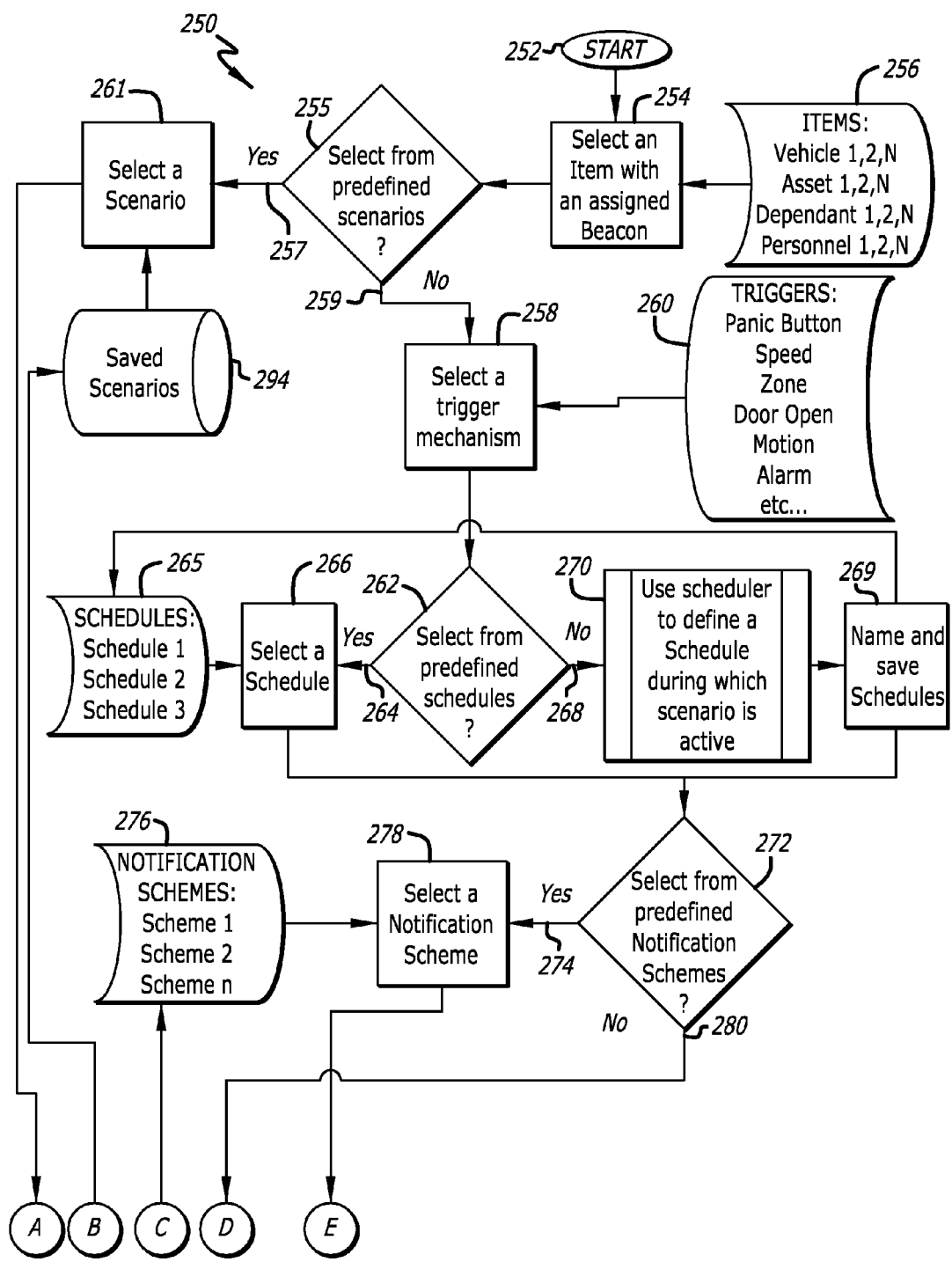
FIGS. 11 and 12 are flow charts showing the operation of a scenario manager in the system.
Figures 2, 11:
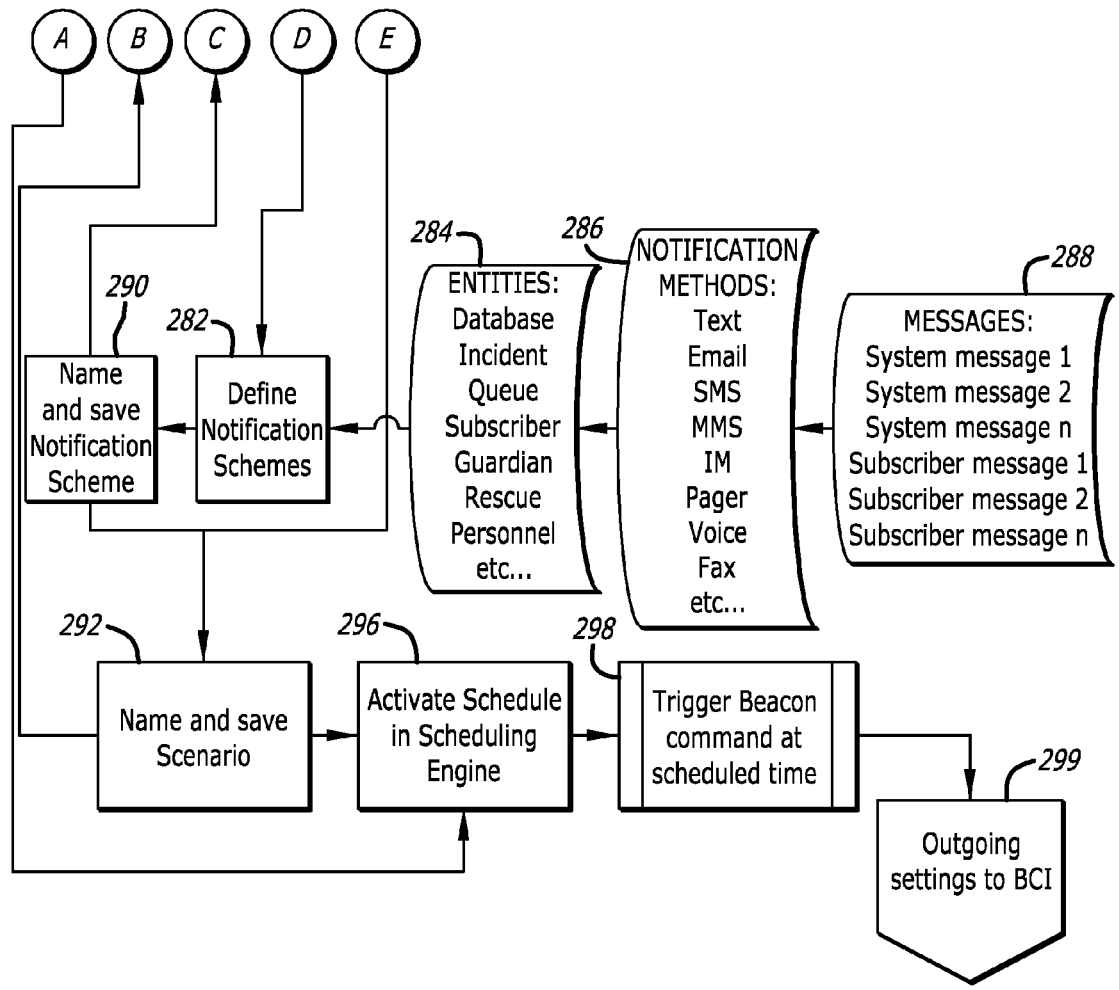

FIGS. 9, 10 and 11 constitute examples of the Beacon Manager Multi-Threaded Feature. They will be explained in detail subsequently.

Description of Operation of System Shown in FIG. 4

FIG. 4 is an overview of the beacon controller interface shown on a general basis in FIG. 5 and in additional detail in FIGS. 6-9. In FIG. 4, a subscriber, a monitoring station (operator) and recovery personnel (e.g., a police officer or private agent) are shown at the left. The subscriber, the operator and the other users communicate requests for action to web applications in the GMMS. The GMMS includes a subscriber portal, a monitoring station portal and a recovery interface. Each portal or interface represents a method of input and output for operating software functionality grouped in a way to best match the needs of the user type that is accessing the GMMS.

The requests for action from users are diverse. Examples are provided in Examples 1-4. These requests are processed in software designated as the beacon controller interface. The beacon controller interface determines the different types of beacons involved in the different requests and provides each request to the individual one of the beacon managers controlling the operation of that individual type of beacon. The requests are then transmitted through different types of wireless networks 1, 2 . . . n (e.g. CDMA, GSM) to the individual beacons which are respectively designed as beacons A, B and C.

The beacons A, B and C respectively respond to the wireless requests provided to the beacons and provide these responses through the wireless networks 1, 2 . . . n to their associated beacon managers. These responses are transmitted to the portals in the web applications in the GMMS. The responses are then transmitted to the interfaces for each individual user type, including, but not limited to each of the subscriber, the operator, and recovery personnel. On the basis of these responses, users, such as the subscriber, the operator and the recovery personnel, provide further requests which pass through the GMMS web applications, the beacon controller interface and the wireless networks to the beacons.

Beacon Controller and Location Network Interface

FIG. 5 illustrates on a generic basis at 90 how the beacon controller interface in FIG. 4 determines the beacon manager that should control each request provided to the beacon controller interface. As illustrated at 92 in FIG. 5, the system in FIG. 4 requests action on a beacon illustratively identified as xyz. The beacon controller passes the request to the Plug and Play Channel (PPC) 93. The PPC illustratively looks up the identification of beacon xyz in a database for the different types of beacon models (see 94). On the basis of this identification, the PPC then operates as at 95 to select the beacon manager which will act upon the request to operate beacon xyz and makes this request as at 96 to the beacon manager responsible for operating Beacon xyz. The beacon manager uses the appropriate command set, communications protocol, and timing criteria to make the feature request of the Beacon. Additional detail is provided in FIGS. 6 to 10. When the requested beacon feature returns data via the beacon manager 97, the BCI dispatches that data to the client application that made the request 98.

FIG. 6 illustrates on a generic basis what happens when a beacon is responding to a request from its beacon manager to perform a function, and then receives a second request from the beacon manager to perform an additional function. The flow chart for the beacon manager request-reply feature is generally indicated at 100 in FIG. 6. As a first step 102 the request to use a feature of the beacon is received from the Plug and Play Channel (PPC). The beacon manager determines the current state of the beacon's operation 103 by consulting the beacon session data in the database 104. A determination is then made 105 as to whether the beacon manager needs to send out a new request to the Beacon. This decision will be based on the rules defined in the beacon manager for the functionality of that beacon type. If no new feature has to be requested of the beacon it means that the current beacon state is providing adequate information to meet the new request. In that case the beacon manager begins to perform real-time inspection of the incoming data from the beacon 104. Based on the data contained in the messages from the beacon, the beacon manager satisfies the requirements of the new feature request.

If the beacon manager does have to send a new feature request to the beacon 107, it formats (108) the appropriate command and sends it via the wireless network associated with the Beacon 107. The beacon manager then waits (109) for returned data from the beacon and sends (110) any returned data it receives to the beacon controller interface (BCI) 110.

When a new command to stop using a beacon feature is received from the PPC (111), the beacon manager removes the record of the session request for the current feature 112. It then determines 113 whether the beacon currently has another feature session in effect. If it does not 115, a command is sent to the beacon 116 to activate the buffering feature. The buffering feature prevents the beacon from sending out any messages until the next time it is commanded to do so and instructs the beacon to continuously store position fixes in the buffer memory of the beacon. If another beacon feature session is currently running 114, the beacon manager retrieves the current session status 117 from the session database 118. It then determines what state the beacon should be in to meet the requirements of the current session and sends the appropriate command to activate that feature in the Beacon 119. The command is sent through the wireless network associated with that beacon, as described previously (see 108,109,110).

As a first step indicated at 102, the beacon manager only makes a request to determine if the beacon moves outside of a particular zone during a time session defined by a beginning time and an ending time. The beacon manager may make this request in response to a request from a monitoring station, subscriber or other user. During this time, the beacon may be generally operating in a zone request state and the beacon manager records this state of operation (see 104). The beacon manager may then receive a request from a second monitoring station operator, subscriber or other user to have the beacon operate in response to a tracking request. This is indicated at 106. The beacon manager makes this request to the beacon and receives an acknowledgement from the beacon of this request (see 108). In a tracking request the beacon indicates its movements to the beacon manager. It will be appreciated that, even though the beacon is responding to the tracking request from the second user, the GMMS will still be able to fulfill the request from the first user. When the beacon has completed the tracking operation, the beacon is returned to the state of monitoring the zone request if the zone request from the first user is still in effect. This is indicated at 110 in FIG. 6.

FIG. 7 is a flow chart depicting the specific example of how the beacon manager manages the beacon's tracking feature, generally indicated at 120, illustrating how a beacon manager provides a priority to a request for tracking over a zone request and other types of feature requests. As a first request 122, a request is made for beacon tracking for a "session", a time period having a duration of x seconds. A determination is then made as at 124 of whether the beacon is already in a tracking state at the time that the request is made. If the answer is no, the tracking time is set to 'x' seconds as at 126. The beacon manager then formats and sends a command (see 128) for the beacon to start tracking. At this point 130 the state of the beacon, in the session database 132, is set to tracking state. The time period, or session, of 'x' seconds and the expiration of the time period 'x' are recorded as at 132. The returned tracking data from the beacon is sent to the application that requested tracking. This data is sent 133 from the beacon manager to the application via the BCI.

If the beacon is already in a tracking state at the time that the tracking request is made, an indication to this effect is provided at 134. A determination 136 is then made as to whether the tracking request already in effect has a greater session or time period than the session or request made at 122 for 'x' seconds. If the answer is yes (see 138), the time for the tracking state already in effect is recorded at 132.

If the tracking request made at 122 has a time period or session less than the time period or session of the tracking state already in effect, an indication to this effect is provided at 140. The beacon manager then updates the time period or session in accordance with the time period or session of 'x' seconds (see 142). This time period is recorded in the beacon manager as at 132 and the timer is reset (144) to record the additional time period to complete the time period or session of 'x' seconds. At the end of the time period set in the beacon manager, an indication 146 is provided that the time has expired. This causes the tracking to be stopped (see 148).

It may be that the time period or session for the tracking is stopped by the user before the end of the time period or session set for the tracking. This is indicated at 150 in FIG. 7. This causes the tracking to be stopped (see 148). A determination is then made as at 152 by the beacon manager as to whether the current time is greater than, or equal to, the time at which the tracking is stopped. For example, the current time may be 2:00 P.M. and the time of expiry may be 1:50 P.M. If the answer is no (154), the timer is reset at 144. If the answer is yes (156), a determination is made as to whether the previous state in the beacon manager has been set as a threshold monitoring state (158). If the answer is yes (160), the beacon manager sends a command 162 to the beacon to activate threshold monitoring in the beacon. If the answer is no (164), the beacon manager sends a command 166 to the beacon to activate buffering in the beacon. When the beacon is buffering its location data it does not perform any operation that requires sending wireless messages, and instead is put into a mode where it continues to record position fixes internally, and the wireless modem is merely listening for an incoming command request.

FIG. 8 is a flow chart, generally indicated at 180, showing how the threshold monitoring features of a Beacon are controlled. As previously indicated, in the tracking mode the Beacon indicates at each position interval where it is located. From each locate message, the Beacon Manager can determine what the speed of the Beacon is. In the threshold monitoring state, the Beacon indicates whether a particular threshold has been exceeded, illustratively if it is exceeding a particular speed or moved outside of a particular zone or area. Either a tracking feature or a threshold monitoring feature can be operated by the Beacon internally, but not simultaneously. To make the GMMS suitable for multiple Users, through multiple user interfaces, each of which can request its own feature, the Beacon Manager has been designed to provide multiple features simultaneously even if the Beacon itself can only operate in one mode at a time. In this way, the Beacon Manager is providing, illustratively, threshold monitoring while the Beacon itself is in the tracking mode.

As a first step 182, the Plug and Play Channel (PPC) may forward a request from a user to the Beacon Manager to have a beacon perform a threshold monitoring. A determination is made as at 183 if the Beacon is in a tracking state at the time that the threshold monitoring is requested. If the answer is no (see 184), a determination is made at 186 if the Beacon is already in a threshold monitoring state. If the answer is no (188), the Beacon Manager sets the Beacon to a current state of threshold monitoring 190. The Beacon Manager also sets the time or session duration 190 for the threshold Monitoring.

If the Beacon has been previously set to a state of threshold monitoring at the time that the request for threshold monitoring is made at 182, this is indicated at 192. The time for the threshold monitoring is adjusted at 194 if the time request for the Beacon monitoring at 182 exceeds the time in which the Beacon is already operating in the threshold monitoring state (see 186). A command 196 is then sent to the Beacon to activate threshold monitoring in the Beacon for the adjusted period of time.

If the determination made at 183 is that the Beacon is already in the tracking state, 185, the Beacon Manager begins real-time inspection 187 of all incoming data from the Beacon. Inspecting this data and comparing it to the threshold allows the Beacon Manager to provide threshold monitoring while the Beacon is in tracking mode.

The PPC may make a request to the Beacon Manager to stop threshold monitoring. This is indicated at 198. A determination is then made (200) as to whether the Beacon is in a tracking mode at the time that the Beacon is requested to stop threshold monitoring. If the answer is no as at 202, a determination is made as at 204 as to whether the Beacon is performing threshold monitoring for another one of the Monitoring Station Operators, Subscribers or other Users. If the answer is no (see 206), the Beacon Manager sets the state of the Beacon to buffering, in the State Manager, and sends a command to the Beacon to enter buffering mode. This is indicated at 208. If the determination at 204 is that the Beacon is providing another session (209) of threshold monitoring, the Beacon Manager sends a command to the Beacon to enter that threshold monitoring mode (see 196).

The Beacon may be in a tracking state at the time the request is made as at 198 to stop the threshold monitoring. This indication of the tracking state is provided at 212. The Beacon Manager then removes (see 214) the record for the session request of threshold monitoring. A determination is then made as at 216 as to whether or not the Beacon has another session for threshold monitoring currently in effect. If the answer is no (see 218), the Beacon Manager disables any real-time threshold inspection of all incoming tracking data 219. If the answer is yes (see 222), the Beacon Manager sends a command to the Beacon to enter that threshold monitoring mode (see 196).

FIGS. 9, 10, and 10*a* provide visual indications as examples of the effect of priority of tracking over the effect of threshold monitoring. In FIG. 9, the period of providing threshold monitoring is indicated at 230 and the period of tracking is indicated at 232. The Beacon initially provides threshold monitoring for a period 234, then provides tracking for a period 236 and thereafter provides threshold monitoring for a period 238. In FIG. 10, the period of providing threshold monitoring is indicated at 240 and the period of providing tracking is indicated at 242. The Beacon then provides tracking throughout the entire period 242, and is still able to satisfy the threshold monitoring request by inspecting the tracking points as they are recorded in the system. In FIG. 10*a*, the period of tracking is indicated at 241. A zone monitoring request by another User 242 begins and ends before the tracking request is ended. A speed monitoring request 243 is initiated before the tracking session is ended. During this entire period the tracking request takes priority in the Beacon and the Beacon Manager processes the other requests. Before the speed monitoring session is ended, the tracking request is ended. At this point the BM changes the mode of the Beacon to speed monitoring 244, where it remains until the speed monitoring request is ended.

Scenario Manager

The Scenario Manager is unique to the GMMS System. It is a module within the GMMS software application, and the user interface for the module is included in the subscriber's portal. The Scenario Manager consists of two components, a Scenario Builder and a Scenario Monitor.

There are three phases to the use of the Scenario Manager module of the GMMS system. The first phase is where the user inputs data to create each of the building blocks. The second stage is where the user selects one or more building blocks from each category to build a scenario. The third stage is where the GMMS system monitors a beacon for compliance with the scenario, and reports any incidents that are outside the parameters of the scenario.

The process begins by using a "Wizard" to guide the user (either the subscriber or a monitoring station operator) through the steps of creating the various building blocks necessary to operate the account and to create functional scenarios. The building blocks can be edited, or new ones created, at any time through the subscriber's portal. Once a set of building blocks is created, the Scenario Builder is used to select from the various building blocks to very quickly and easily produce complex functional scenarios.

Once a scenario is built, the Scenario Monitor is invoked. It instructs the GMMS system to monitor a number of parameters and determine if they are within the acceptable range of the scenario. If they are outside of acceptable range, additional building blocks are used to define who should be notified, and what notification methods are to be used.

Multiple scenarios can be active simultaneously for a given Beacon, and each can be active according to its own schedule. Some scenarios, such as panic button monitoring, will typically be active all the time while others, such as zone, speed, or door open monitoring, may be activated according to complex schedules.

The ultimate function of the Scenario Manager is to allow users to command the GMMS system to automatically monitor mobile events. An example would be "If the specified vehicle is outside of the specified zone, at the specified time, send the specified message, to the specified people/places, using the specified communications methods."

Creating Building Blocks

Most of the building blocks for the scenario manager are created during the set-up of a new user's account. The user interface for creating the building blocks is included within the subscriber portal.

The following building blocks are entered through the various links in the subscriber portal. Each building block is stored in the database, accessible to the user, and reusable in as many scenarios as desired where permitted by the logical constraints of the system.

Items

An Item is anything that has a beacon assigned to it. When a beacon is assigned to an item, the beacon is installed in, attached to, or carried by, the Item. The following Item types are defined in the GMMS system:

Vehicle
 Any vehicle such as: Car, Truck, boat, RV, Motorcycle, Delivery Van, etc.
Asset
 Anything of value that can have a beacon attached to it—typically a mobile or portable item, even an animal
Dependant
 A family member or person the subscriber is responsible for
Personnel
 An employee or member of an organization
Event
 An event is anything that can be monitored by a beacon to determine if it is in its nominal state or an irregular state. Examples of events that can be monitored by the GMMS system are:
 Panic button
  A button built in to, or connected to, a beacon for the purposes of the user sending a notification that assistance is required.
 Speed
  A speed parameter may be set such that if that speed is exceeded a notification is triggered. It is possible to trigger upon dropping below a specified speed as well.
 Zone
 Zones can be defined as any geographic shape or combinations of shapes on a map. Each zone can be specified as allowed or disallowed.
 Door opening
 Detects when a specific door on a vehicle is opened
 Motion detector
 Various kinds of motion detectors monitor things like whether there is motion in the vicinity, such as inside a vehicle, or whether the Item itself is moving.
 Alarm system
 An alarm system such as a vehicle alarm may detect anything from doors opening, window glass breaking, vehicle being bumped, engine starting, etc. Any alarm system connected to the beacon inputs allows it to trigger the GMMS system.
 Battery status
 A beacon may have primary power provided by a vehicle battery or an internal battery. It may also have a backup battery. Any of these batteries may have their charge status monitored
 (It is important to note that additional forms of events may be added any time because beacons have inputs and outputs. An input allows virtually anything that can produce an electronic signal to be monitored as an event.)

Schedules

Event parameters may be enabled and disabled according to a schedule. A calendar interface allows the user to create a schedule by selecting times and days during which event parameters are active. Schedules can be set up such that active times are defined on a one-time basis or repeated hourly, daily, weekly, monthly, or periodically. Certain schedules can also be set to be active all the time, for events such as panic buttons.

When schedules are created they are named and saved within the system for use in any number of scenarios.

Entities

An entity is a person or place to which notifications are sent. The following is the list of entities available within the guardian system:

Database

Messages are sent to the database in all cases, but sometimes this is the only place a notification needs to be sent, just to be stored for future reference.

Incident Queue

In a true emergency, notifications are sent to the incident queue. This means an incident is opened and must be handled by an operator at the monitoring station.

Subscriber

The subscriber may want notifications sent to themselves in many instances. The subscriber may use multiple message types and may want different messages sent to various message repositories.

Guardian

The subscriber may assign various guardians to an Item and have the guardians active according to a schedule. When a guardian is active they may receive all the messages normally sent to the subscriber. Alternatively, guardians may be assigned to receive particular messages at any time.

Rescue personnel

During an incident it may be advantageous to send certain messages directly to rescue personnel.

Notification Methods and Schemes

The user has access to a variety of notification methods, as described below. The user can also associate one or more notification methods together into a notification scheme. Notification schemes are named and saved for use in any number of scenarios.

Text

Database

Alarm queue

Email

Any number of email addresses can be entered for the subscriber and each guardian

SMS

Any number of short message service (SMS) addresses can be entered for the subscriber and each guardian

MMS

Any number of MMS addresses can be entered for the subscriber and each guardian

IM

Any number of IM addresses can be entered for the subscriber and each guardian

Voice

Automated voice messages are sent using the GMMS system's CTI interface. Any number of phone numbers can be entered for the subscriber and each guardian Facsimile Automated fax messages are sent using the GMMS system's CTI interface. Any number of fax numbers can be entered for the subscriber and each guardian Notification Messages System message Various messages are defined in the GMMS system. These messages may have specific codes and syntax designed to interface with other components of the system. System messages are sent to the alarm queue and the database. Additional messages may be sent to other modules in the system as well as to users.

Subscriber's message

The subscriber or operator can enter as many customized messages as desired.

Scenario Manager

FIG. 11 is a flow chart, generally indicated at 250, of a Scenario Builder included in a Scenario Manger. The start of the flow chart 250 is indicated at 252. As a first step 254, an item with an assigned Beacon is selected from a list of available items 256. As previously indicated, an item is any mobile thing or being with a Beacon attached to the thing or being. For example, an item may be a vehicle, a mobile or portable asset, a dependent or personnel.

Once an item is selected, the User determines 255 whether to select from predefined scenarios 257 or not 259. If a predefined scenario is to be selected, this is done at 261 by selecting from the list of saved scenarios 294. When a scenario is selected, the associated schedule is activated 296 in the scheduling engine of the GMMS system.

If a predefined scenario is not selected 259 a new scenario is created. The first step is to select a trigger mechanism as indicated at 258. As previously indicated, a trigger mechanism may be anything that can be monitored to determine if it is in its nominal state or in a state other than the nominal state. Examples of triggers as shown at 260 in FIG. 11 are a panic button, speed limits, a zone, an open door, motion detected, or any external alarm detected. A determination is then made by the User if a predefined schedule is to be selected (see 262). If the answer is yes (264), a predefined schedule is selected (see 266) from a list 265. If it is determined that a predefined schedule is not to be selected (268), a schedule may be defined or constructed 270 for use during the time that the scenario is active. This newly defined schedule may be saved 269 and added to the list of available schedules 265 for selection in future scenarios.

A determination 272 is then made by the User as to whether a selection is to be made from a predetermined notification scheme. If the answer is yes (274), one of a number of predefined notification schemes 276 (e.g. notification schemes 1, 2, n, etc.) is selected as at 278. If the selection is not made from one of the predefined notification schemes (see 280), a new notification scheme must be defined. This is indicated at 282.

To create a notification scheme, suitable entities are selected from a list of available entities to be notified, indicated at 284. Suitable entities may include the database, the incident queue, a subscriber, a guardian, and/or rescue personnel. For each entity there may be a choice of notification methods. If so, a notification method 286 is then selected for each entity. Notification methods are selected from among a group 286 such as text, email, voice, facsimile, short message service (SMS), multimedia message service (MMS), instant messaging (IM), paging, a voice message or a facsimile message. For each notification method 286 a message must be selected. Messages are selected from a list of available messages 288 or are manually entered or created from a file. Manually entered messages will be typed text messages, whereas messages from a file may include voice files or image files. These message types can be created and stored as computer files using common voice and/or image recording techniques.

This newly defined notification scheme may be saved (290) and added to the list of available notification schemes 276 for selection in future scenarios.

The combination of trigger mechanism, schedule, and notification scheme defines a scenario for the chosen item. When each has been selected or created, the scenario is named in 292 and saved in database 294. The associated schedule (selected in 266) is then activated 296 in the scheduling engine 298 of the GMMS system.

When the schedule is running, the schedule engine 298 determines the times to send commands to the Beacon. Commands are sent 299 to the Beacon via the Beacon Controller Interface (BCI) which is described in FIG. 5 of this document.

Figure 12:
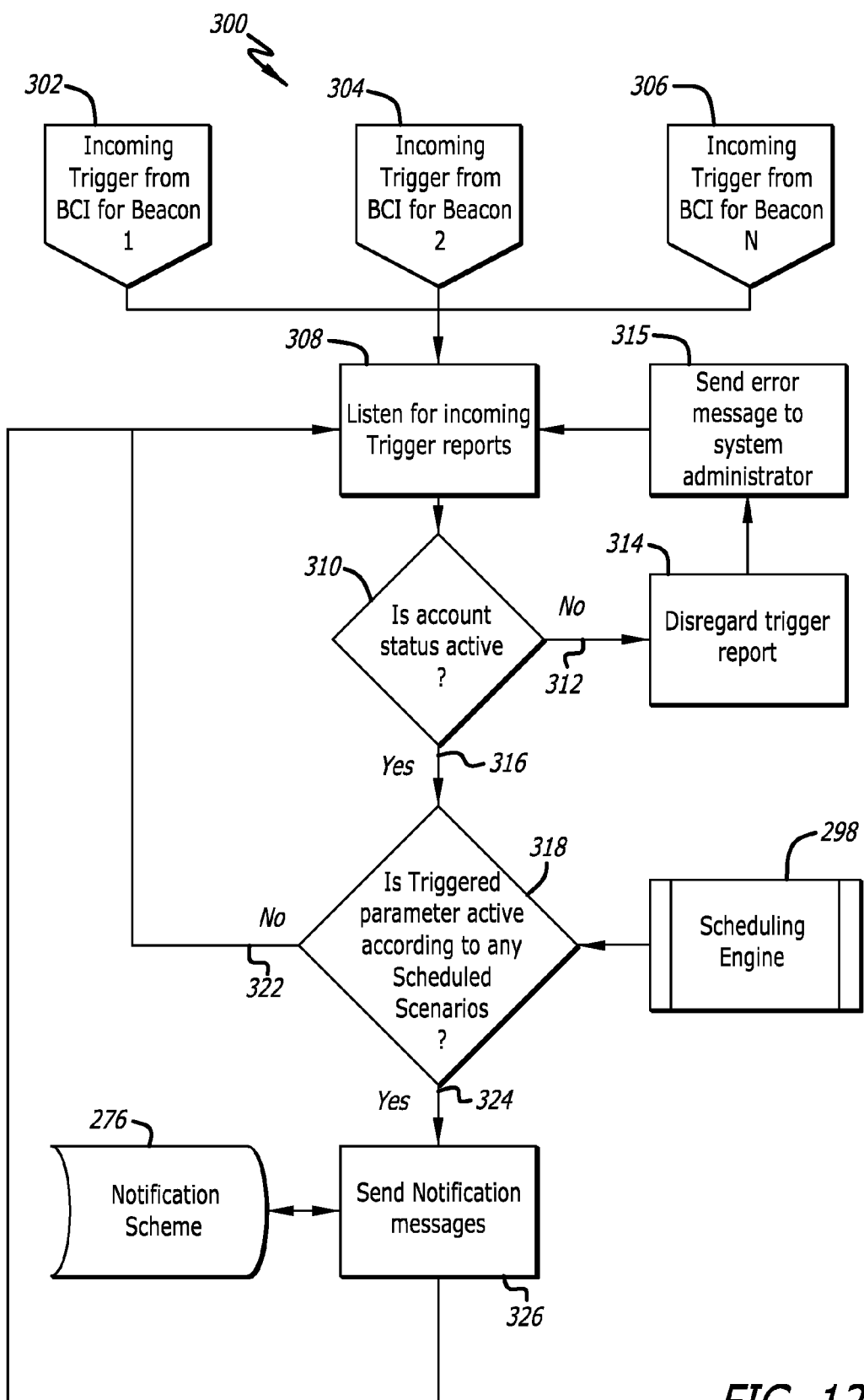

FIG. 12 is a flow chart, generally indicated at 300, of the scenario monitor included in a Scenario Manager. As a first step indicated at 308, the scenario monitor listens for incoming trigger reports from all Beacons, indicated at 302, 304, and 306. The trigger reports may relate to any item specified at 256 in FIG. 11. The trigger reports specify the parameters of the trigger in the Beacon associated with the Item 256.

As soon as a trigger report is received from a Beacon, a determination is made 310 as to whether the status of the account associated with that Beacon is active. If the answer is no (312), the trigger report is discarded 314 and an error message is sent to the system administrator 315. The scenario monitor then returns to listening for incoming trigger reports 308. If the answer is yes (316), a determination is made 318 as to whether the incoming trigger parameter is active according to the schedule of any active scenarios for the associated Beacon running in the scheduling engine 298 (see also 298 in FIG. 11). If the trigger is not associated with an active scenario 322, the scenario monitor returns to listening for incoming trigger reports 308. If the scenario is active 324, the trigger is processed according to the active scenario.

Processing the scenario involves executing the notification scheme associated with the trigger from the associated Beacon. The notification scheme 276 (see also 276 in FIG. 11) specifies what messages are sent to what entities using what notification methods. When the required notification messages are sent 326 the scenario monitor returns to listening for incoming trigger reports 308.

Incident and Recovery Interface

In many emergency mobile monitoring scenarios, it will be critical to dispatch one or more recovery personnel to ensure the safe recovery of a stolen or lost vehicle, asset, person or pet. Recovery personnel involved in such an incident could include, but are not limited to: police, ambulance, fire, private patrol, and school personnel.

In order to assist in the recovery process, the Guardian system has a unique software module known as the Recovery Interface. The Recovery Interface gives third-party recovery personnel temporary, authenticated access to the details of an incident for the duration of an incident. Access is available from any web-connected device, including portable internet terminals. As a multi-threaded, multi-user application, the Guardian system enables multiple users to access the same incident data at the same time.

Operator Manages Incident

In order to enable the recovery interface, an operator must be managing an incident. Once an incident is in progress, the system automatically generates a unique Incident ID and a password for the recovery interface, and displays the recovery login website address. The operator has access to this information in the main incident window.

Figure 18:
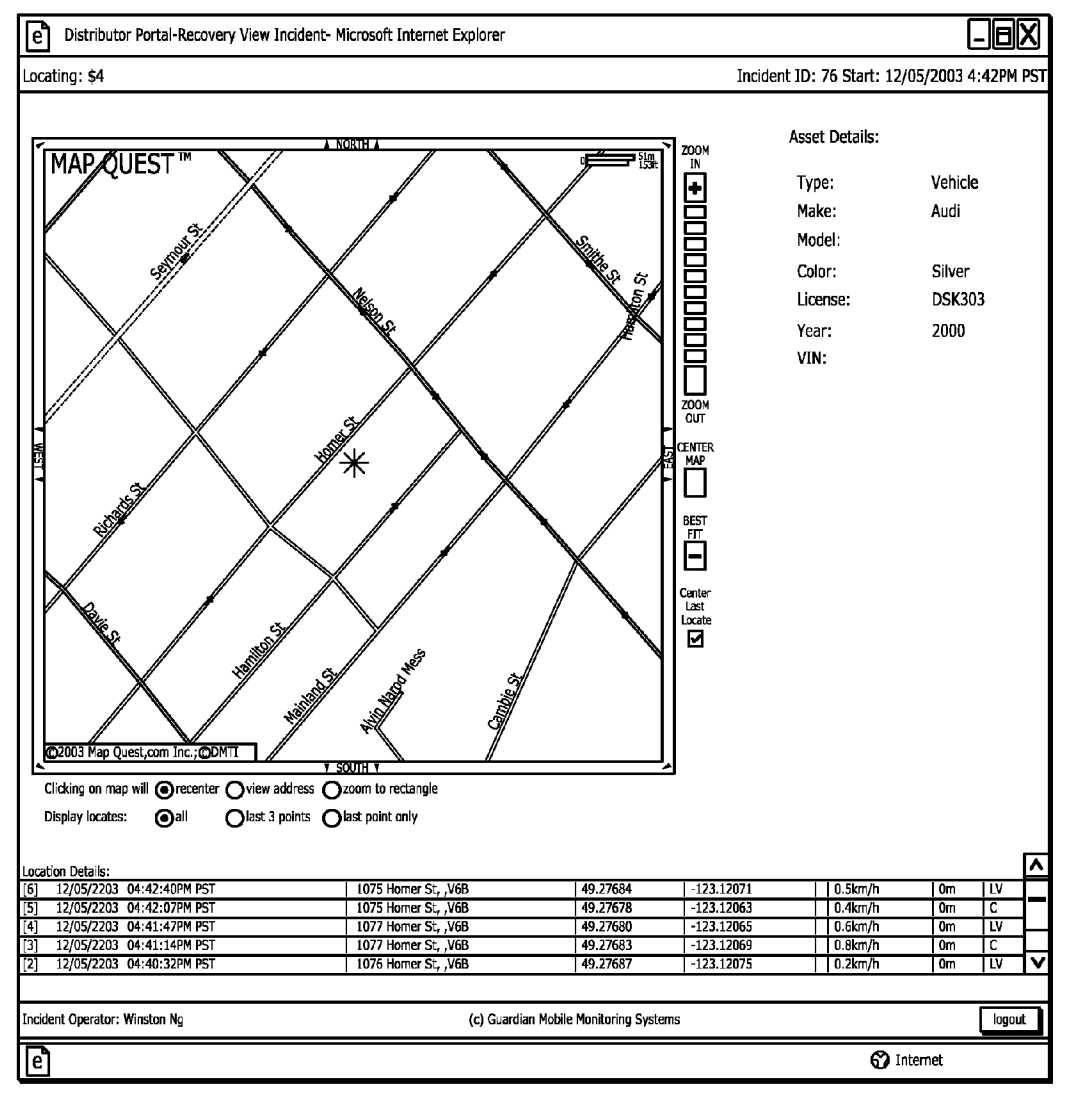

An operator can provide the recovery person with the appropriate login information in a variety of ways, including via the phone, or via the built-in email function directly within the incident window. This is shown in FIG. 18.

Logging into the Recovery Interface

Once the recovery person has received the login information from the security operator, he can access a login screen, and must enter his name, the correct Incident ID and password. The system authenticates this information against the database to ensure that only authorized individuals can view the incident data.

As stated above, the system is designed to accommodate multiple recovery personnel accessing the system all at once.

Viewing Incident Data

Once authenticated, the recovery user can view data associated with the current incident. This includes data associated with the vehicle, asset, person or pet being recovered, the current address, and a plot of the location on a map. The recovery user can control the map by panning or zooming to best meet the requirements of the recovery situation; however the user cannot edit or access data elements such as preferences, account info or anything else within the subscribers account.

In addition, the recovery user can view the map such that it also displays the location of the recovery user if they have a beacon with them. This is unique to the Guardian system and provides recovery personnel with the ability to view their position relative to the position of the missing item.

Terminating a Recovery Session

A recovery user can decide to terminate or log out of their recovery session by simply selecting to end the session manually. Additionally, the system is constantly checking the state of an incident and will automatically terminate a recovery user's session if the security operator has resolved the incident. If the system detects that an incident has been resolved, and there are still recovery interfaces running, the system will warn the recovery user(s) prior to terminating the session. Once a session is terminated, the recovery user will no longer be able to log into the session with the existing Incident ID and password pair. For auditing purposes, a security operator can review when recovery users logged in and out of the system.

Figure 13:
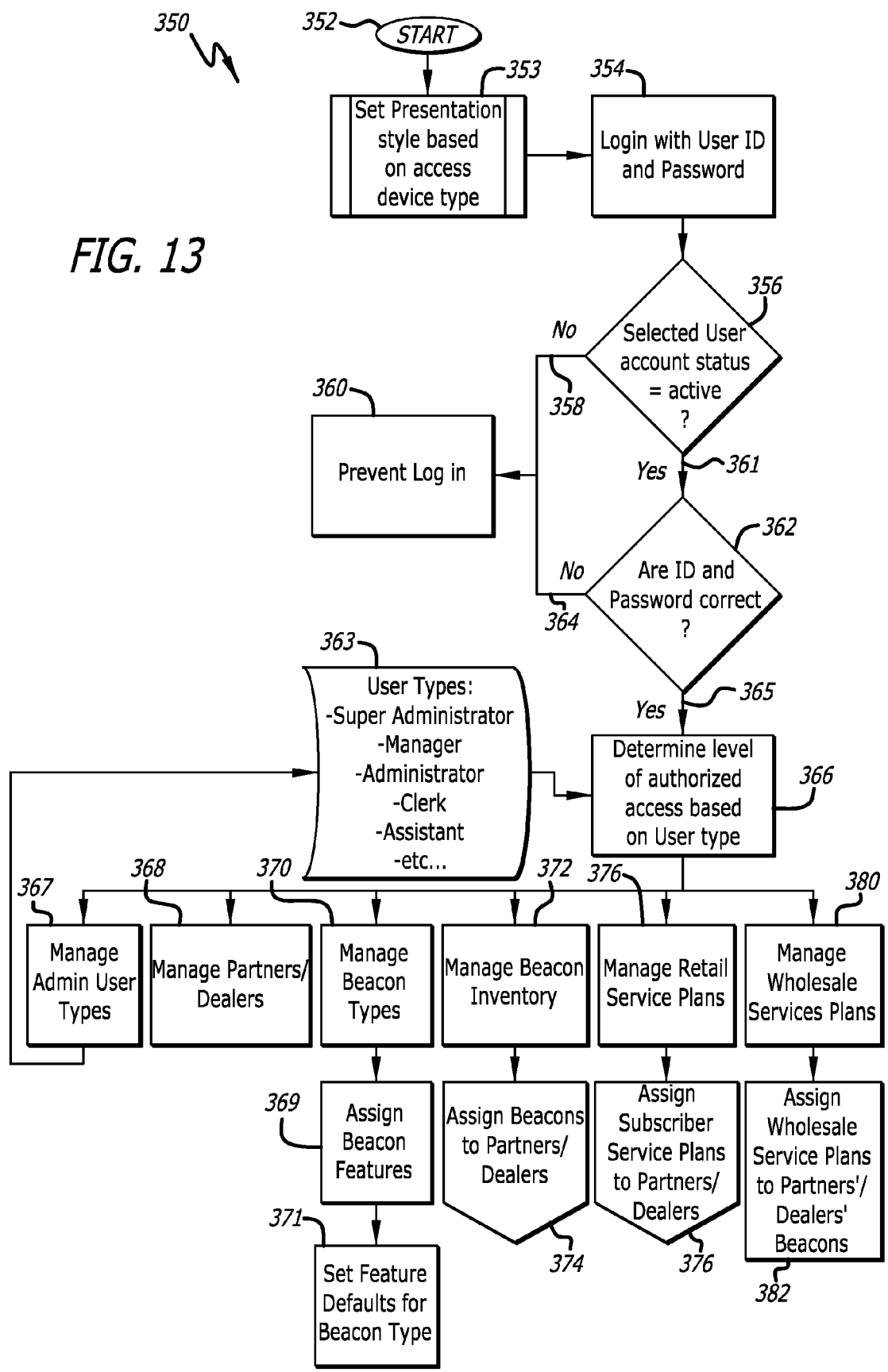
FIG. 13 is a logic flow chart showing the operation of a guardian administration module in the system.

FIGS. 13-16 are system logic flow charts in the Guardian Mobile Monitoring System (GMMS). The flow chart in FIG. 13 represents the Guardian Administration Portal and is generally indicated at 350. The flow chart is initiated from a start position 352. As a first step 353 the system detects the type of device being used to access it and sets the appropriate presentation style. At the next step 354, a login is provided with a User identification (ID) and a User password. A determination is then made as at 356 as to whether the account status of the User is active. If the answer is no (358), the login is prevented (360). If the answer is yes (361), a determination is made as at 362 as to whether the User identification and password are correct. If the answer is no (364), login as at 360 is prevented. If the answer is yes (365), a determination is made 366 as to the level of access the User is authorized for. This is done by consulting the User types 363 as specified by the Super Administrator using the administration manager 367. Each User type other than the Super Administrator has specific restrictions on access to the various functions within the Guardian Administration Module.

Once a User is authorized they have access to some or all of the following functions. The Super Administrator may manage Administrator User types 367. One (368) of the functions that other Users may access is to manage the wholesalers. Managing the wholesalers may include the acts of adding, creating, updating and enabling or disabling wholesalers. Another (370) of the acts is to manage Beacon types. This may include the act of adding new types of Beacons. For each Beacon type, the User can assign Beacon features 369 and set feature defaults of Beacon types 371. A further one (372) of the functions is to manage the Beacon inventory. As previously indicated, the Beacon inventory may include different types of Beacons. As a part of managing the Beacon inventory, Beacons may be assigned to Wholesalers when Beacons are added to the inventory (see 374.)

Still another one (376) of the functions is to manage retail subscriber service plans. As a part of this function, different subscriber service plans may be assigned to specific wholesalers (see 378.) A still further one (380) of the functions is to manage wholesale service plans. In a wholesale service plan, Guardian Mobile Monitoring Systems sells a plan at wholesale to a retailer. The retailer then marks the price of the plan upwardly and sells the plan to subscriber according to a retail service plan as assigned to the retailer in 378. The operation of the wholesale service plan is assigned (382) to a wholesaler who manages the assignment of particular Beacons to be used in the various service plans.

Figures 1, 14:
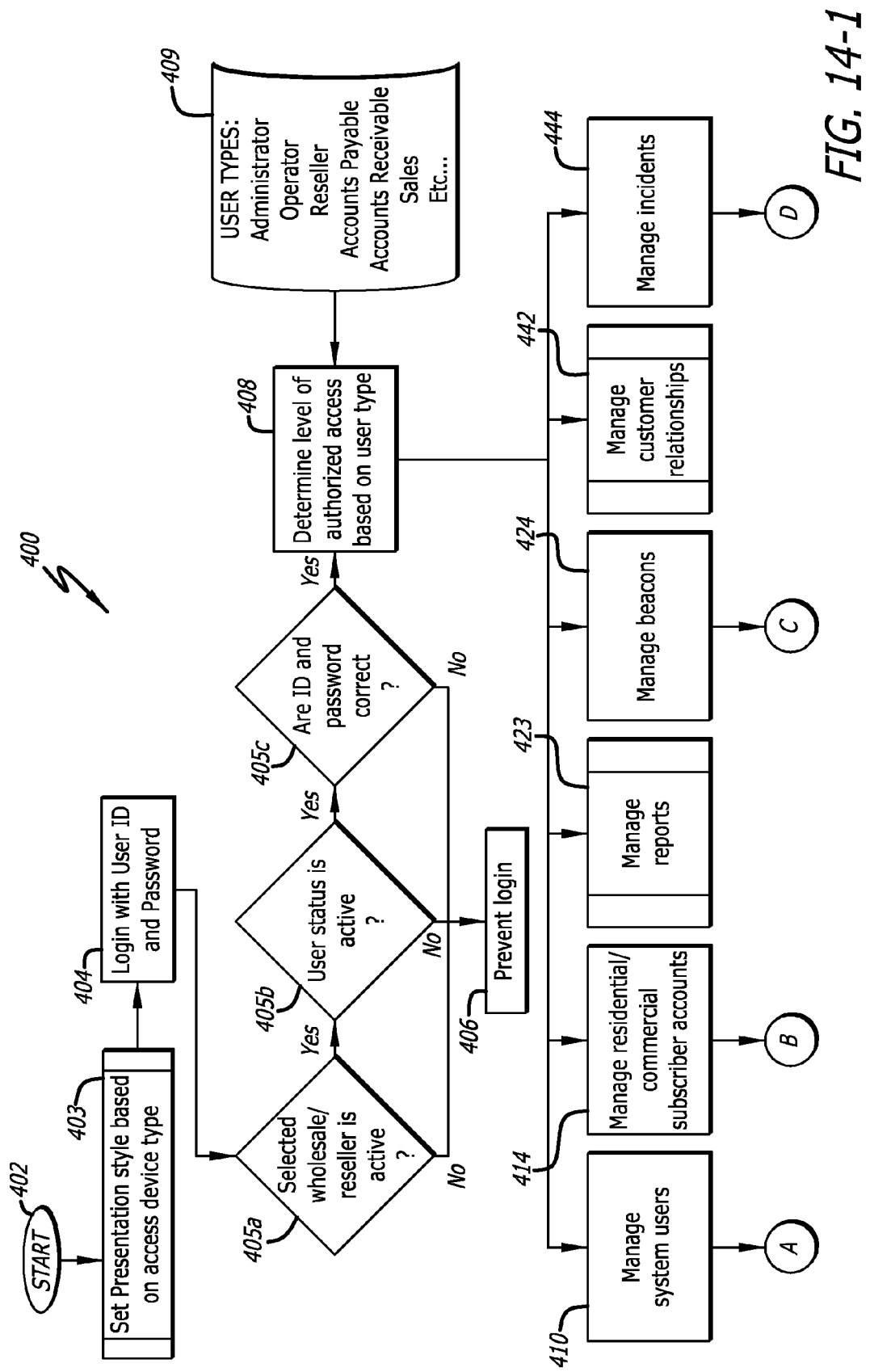
FIG. 14 is a logic flow chart showing the operation of a wholesaler, retailer portal in the system.
Figures 2, 14:
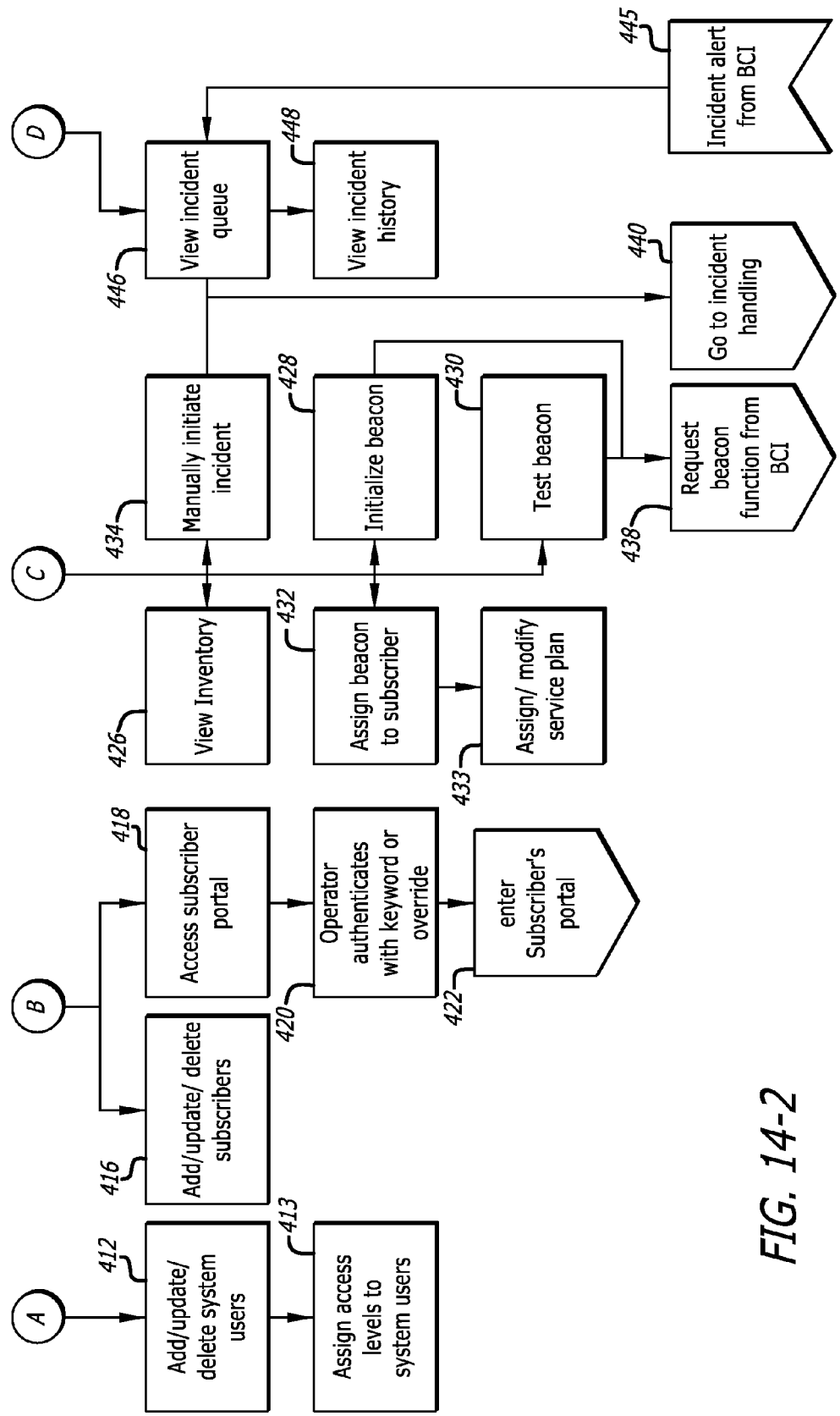

The flow chart in FIG. 14 represents the operation of the Wholesaler and Retailer portal, and is generally indicated at 400. The start of the flow chart 400 is indicated at 402. As a first step 403 the system detects the type of device being used to access it and sets the appropriate presentation style. A login with a User identification and a User password is provided as at 404. Determinations are then made as to whether (a) the status of the selected monitoring station is active (405a) and (b), the status of the User is active 405b, and (c) the User's identification and password are correct 405c. If the answer to at least one of the above determinations is no, login is prevented as at 406. If the answer to all of the above determinations is yes, a determination is made as at 408 of the level of the access based on User type. As indicated at 409, different levels of access may illustratively include an administrator, an operator, accounts receivable and accounts payable. The administrator may be considered to be highest level of access and the operator may be considered to be a high level of access. Each level may restrict access to some of the functions of the portal.

Different functions are then capable of being provided. For example, the operation manager manages system Users (see 410). For example, the operation manager may add, update and delete system Users. This is indicated at 412. As another example, the account manager may manage (414) different residential and commercial subscriber accounts. For example, the account manager may add, update and delete subscribers (416) and may access subscriber portals (418).

Generally, a subscriber does not wish the operation manager to look into or in the subscriber's account or to become involved in the operation of the subscriber's account. However, there are two (2) exceptions. One exception is that the subscriber wants the operating manager to become involved during an emergency. One example of an emergency is when the subscriber or the User presses a panic button. Another example is when the subscriber asks the operation manager to help enter data into their account or create a scenario.

Figures 1, 15:
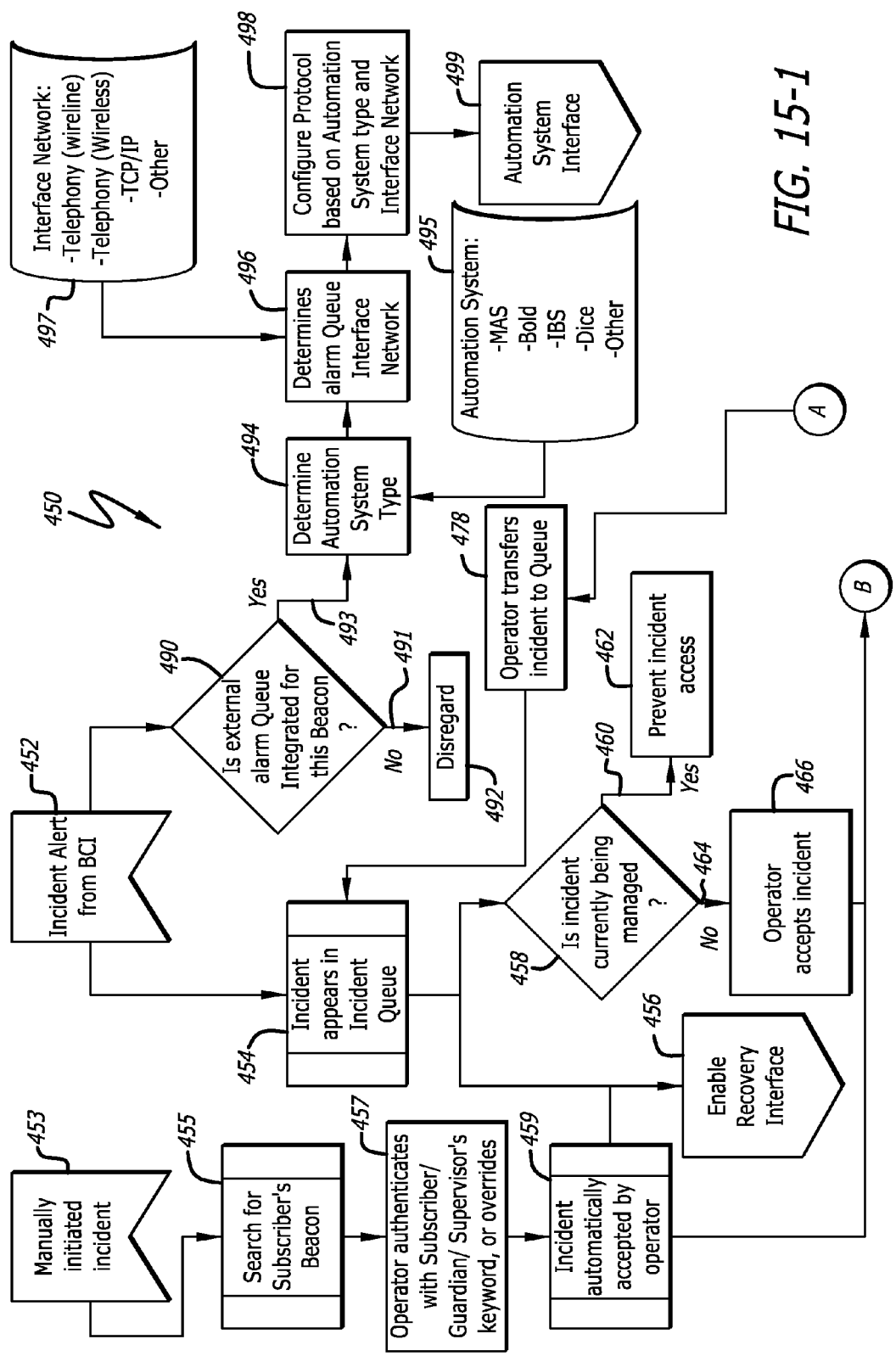
FIG. 15 is a logic flow chart showing the operation of an incident handling in the system.
Figures 2, 15:
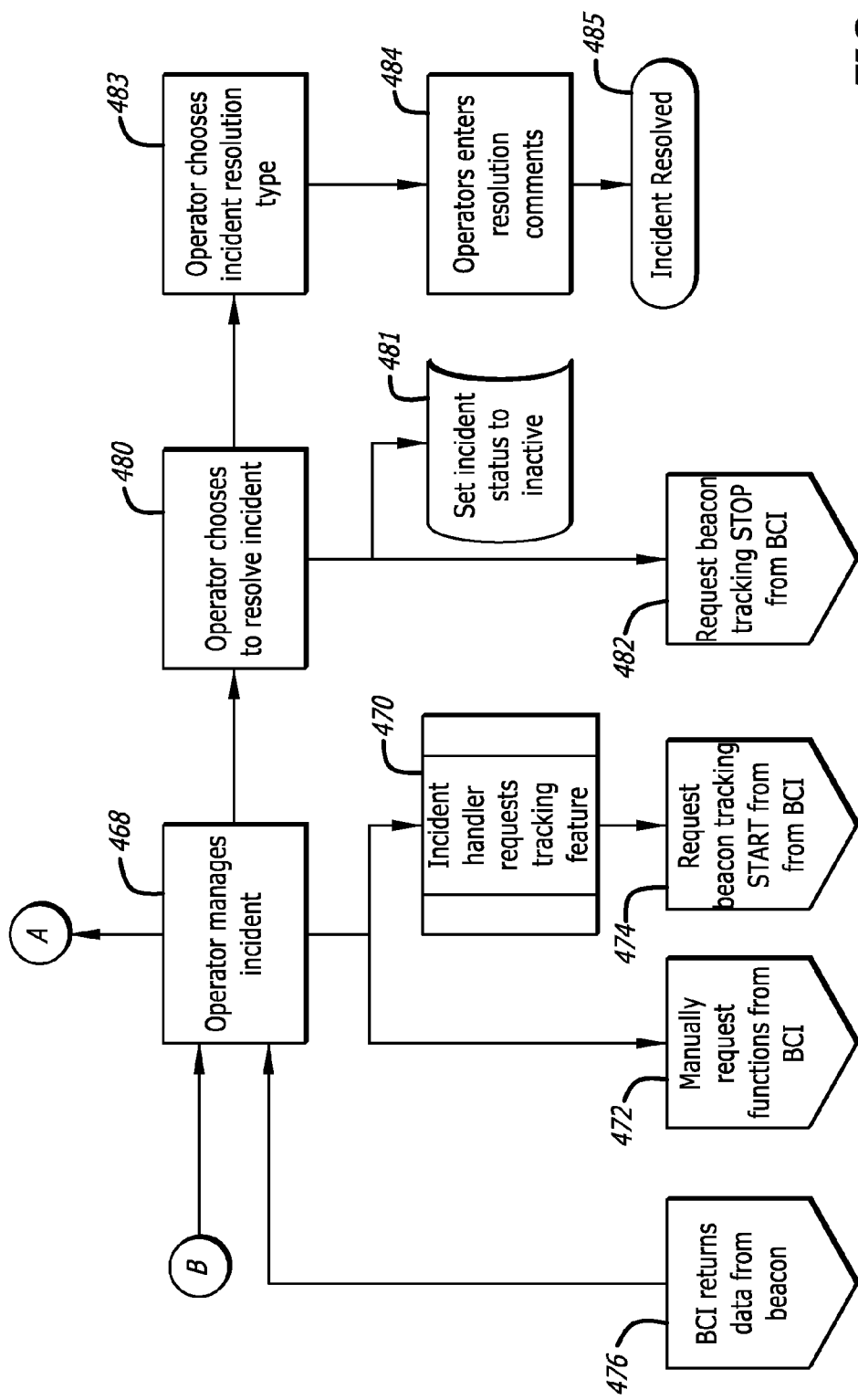

When a subscriber presses a panic button, the system automatically accepts the panic incident, and the operation manager automatically bypasses the need for the subscriber's passcode to manage the incident (see FIG. 15). Note that the passcode is separate from the subscriber's login password (504 in FIG. 16). Except for this, the operating manager has to obtain the subscriber's passcode from the subscriber. But the operating manager can override the password when there is an emergency and the subscriber isn't available to be contacted. An example of this is when a Beacon is attached to a young child and the child is lost while in the care of a guardian which is not the subscriber, such as a baby sitter. If the subscriber is not available when this occurs, and the babysitter has not been given the passcode, the operating manager may override the passcode and provide positive actions to protect the child.

A block 420 in FIG. 14 specifies that the subscriber may provide the operator with the subscriber or guardian's passcode and that, in special circumstances, the operator may override the subscriber's passcode. Under such circumstances, the operator may access the subscriber's portal. This is indicated at 422 in FIG. 14 and in FIG. 16.

Operator's Access to Subscriber's Portal

A monitoring station operator would access a subscriber's portal under various circumstances but generally it is required when either the subscriber or a guardian calls requesting operator assistance. The purpose of allowing access to a subscriber's portal by an operator is to provide customer service. The purpose of restricting access is to maintain the security and privacy of the subscriber. In the GMMS, operator access to subscriber's portal is generally allowed through use of a passcode. If the caller does not have the passcode, it may still be important for the operator to access the subscriber's portal in case of emergency. In this case, the operator would override the passcode access and indicate a reason for the override. In either case, the login by the operator will be recorded in the subscriber's portal for future review. Included in the record will be the identity of the operator, the time of the login, and the reason for overriding, if applicable. By policy, an operator would not divulge the location or status of any item to the caller if they do not present the correct passcode. Instead, the operator would handle the incident using public or private security forces if necessary.

Figure 24:
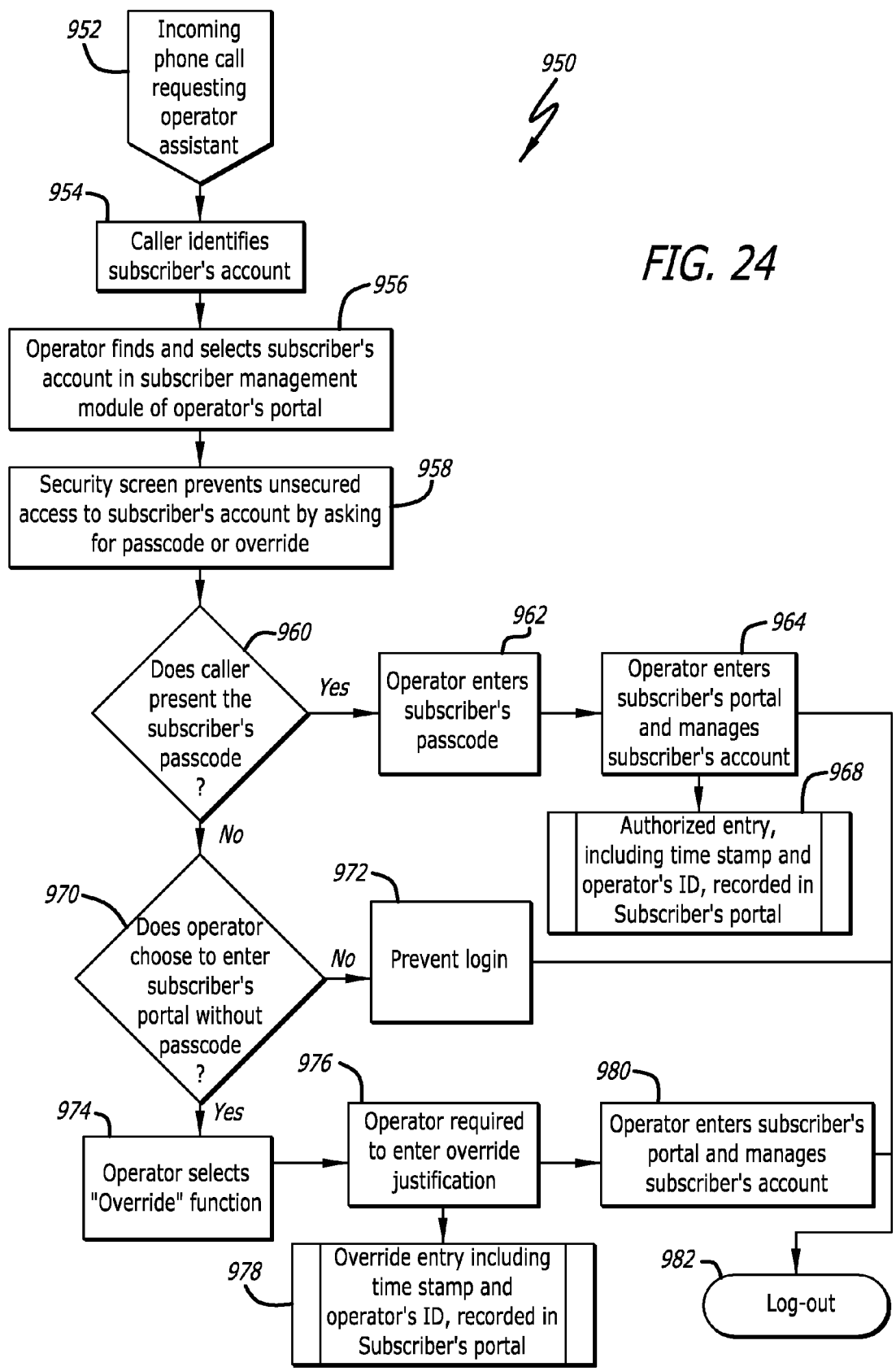
FIG. 24 is a schematic diagram showing how an operator at a monitoring station can access a subscriber's portal to provide services while still protecting the security and privacy of the subscriber.

FIG. 24 is a flow chart, generally indicated at 950, showing how an operator in a monitoring station would access the portal of a subscriber. An incoming phone call 952 would request operator assistance, requiring that the operator access a subscriber's portal. The phone call may be from the subscriber, a guardian assigned by the subscriber, or from anyone claiming to require access to the portal. The caller would identify the required portal at 954 by identifying the subscriber. The identity of the subscriber will allow the operator to find and select the corresponding portal at 954 using the subscriber management module of the operator's portal. When the operator selects the management link for the subscriber's portal a security screen appears, 958. The security screen 958 requires the operator to enter either the subscriber's passcode or override.

At 960 a decision is made as to which way to enter the subscriber's portal. If the caller gives the operator the correct subscriber's passcode it is entered into the security screen at 962. This allows the operator to have access to the subscriber's portal and perform any operation the subscriber could. Upon entering the subscriber's portal, a record of the operator's access to the portal is made at 968 in the GMMS database. The record includes the operator's identification and the time of logging in. This record is permanently accessible to the subscriber, via the subscriber's portal, and can not be deleted or altered by any user of the GMMS. When the operator has completed the required operations in the subscriber's portal the operator logs out, as shown at 982.

If the indication at 960 is that the caller does not have the subscriber's passcode, the operator must decide at 970 whether to enter the user's portal without the passcode. If the operator decides not to enter the portal without the passcode the security screen will prevent the login at 972 and the operator will be logged out at 982. If the operator decides at 970 to enter the subscriber's portal without a passcode the operator must select, at 974, the override function on the security screen. In addition to selecting the override function, the operator will be required at 976 to enter a justification for overriding. This justification area is a text box where the operator types the reason for justification or selects from a list of pre-defined reasons. If no text is entered in to the text box the security screen will prevent login to the subscriber's portal and will display an error message. When the override is selected and an override justification is entered, the operator is allowed, at 980, to have access to the subscriber's portal and perform any operation the subscriber could. Upon entering the subscriber's portal, a record of the operator's access to the portal is made at 978 in the GMMS database. The record includes the override justification as well as the operator's identification and the time of logging in. This record is permanently accessible to the subscriber, via the subscriber's portal, and can not be deleted or altered by any user of the GMMS. When the operator has completed the required operations in the subscriber's portal the operator logs out, as shown at 982.

A number of other functions are shown in FIG. 14. These include a block 424 in which an operator manages the Beacons, including a block 426 in which an operator views Beacon inventory, a block 428 in which an operator initializes the operation of a Beacon by originating a command for the Beacon, a block 430 in which an operator tests the Beacon and a block 432 in which an operator assigns an individual one of the Beacons to a subscriber, including the assignment of a service plan 433. At 434, an operator initiates an incident. The operator can access the incident through the Beacon Manager (see 424). In order for the Beacon to be initialized as at 428 and tested as at 430, the operator may request features 438 from the Beacon Controller Interface. For example, the operator may request the location of the Beacon from the Beacon Controller Interface. Another function of the wholesaler/retailer portal is to provide access to managing the customer relationships. This is done through an interface to a non-proprietary Customer Relationship Management system indicated at 442.

A fundamental operation of the wholesaler/retailer portal is its interface to manage incidents, indicated at 444. The incident queue 446 displays all incidents that are currently active. Incidents arrive in the queue by notification from the Beacon Controller Interface (BCI) indicated at 445, or can be manually initiated by an authorized operator 434. An authorized operator may view the incident queue 446 and the incident history 448. To handle an incident, the incident is assigned to, and accepted by, an authorized operator who will use the incident handling 440 functions depicted in FIG. 15.

The flow chart shown in FIG. 15 depicts the GMMS Incident Handling functionality, and is generally indicated at 450. As a first step 452, the Incident Handling system receives an automated incident alert from the Beacon Controller Interface (BCI). For example, this may occur when a vehicle travels outside of a zone in which the vehicle has been directed to stay or when a panic button is pressed. An incident is automatically initiated as at 452 This causes the incident to appear in an Incident Queue (454) with other incidents involving other Beacons. This allows the operator to enable a Recovery Interface (456). As will be described in detail subsequently, the Recovery Interface enables recovery or emergency personnel (e.g., police, ambulance, fire private patrol and school interface) to locate the vehicle.

All active incidents appear in the incident queue with an indication as to whether they are currently being managed by an operator. If an operator is assigned an incident a determination is made as to whether that incident is already being managed 458. If the answer is yes 460, access to the incident is prevented 462. If the answer is no, the operator accepts the incident. See 466. The operator has to accept the incident in order to make certain that the incident will be resolved. After the operator accepts the incident, the operator manages the incident. This is indicated at 468. The operator may transfer the incident to another operator who has experience in handling that particular type of incident, or at the end of a work shift, by transferring 478 the incident back to the queue. The incident then appears in the incident queue (454) and the new operator accepts the incident as at 466 and manages the incident as at 468.

Sometimes the incident is not automatically initiated. For example, the Subscriber may phone the monitoring station and ask for the location of a person or asset within the subscribers account. In this case the operator would manually initiate the incident, indicated at 453. First the operator will use the database search function to find the correct subscriber's account 455. Then the operator must be correctly given the Subscriber's passcode, or use the override function described previously, to initiate the incident. The operator must enter the Subscriber's passcode correctly as at 457. Using this process of initiating an incident, the operator is automatically assigned and accepts handling of the incident 459. The operator then manages the incident as at 468.

As indicated at 470, the operator may request that the Beacon should be tracked. This involves the determination of the movements of the Beacon by the Beacon Controller Interface. This request is made (474) to the Beacon Controller Interface. The Beacon controller interface obtains this information from the Beacon and transmits this information to the operator. This is indicated at 476. In addition to tracking, the operator may require other functions from the Beacon. As an example, the operator may want to disable the ignition of the vehicle where the Beacon in installed. These manual function requests are also directed to the Beacon via the BCI 472, and responses to manual function requests are received from the Beacon via the BCI (see 476).

When managing of an incident is no longer required, the operator resolves the incident as at 480. This action automatically requests the Beacon to stop tracking. See 482. The operator then chooses the incident resolution type as at 483 and makes a written report of the incident resolution as indicated at 484. With the resolution of the incident, all Beacon functions and comments are recorded in the database and the incident is closed as indicated at 485.

For some Beacon accounts, it is a requirement that the incident be displayed in the alarm queue of a monitoring station automation system. An automation system is the software that is normally used in an alarm monitoring station to manage the monitoring of alarm panels in buildings. When an incident alert is received from the BCI 452, a determination is made by the system 490 as to whether an external alarm queue is integrated for this Beacon. If the answer is no 491, notification of the incident to the automation system is disregarded 492. If the answer is yes 493, a determination is made 494 as to the type of automation system to be notified. This is done by matching the Beacon to an associated automation system from a list of available systems 495. The next step is to determine what network type 496 to use to interface with the automation system. This is done by selection from a list of networks types 497 that may include the public telephone network, a wireless telephony network, a TCP/IP network such as the Internet, or others. The next step is to configure the appropriate protocol 498 to send an incident notification to the appropriate automation system's alarm queue over the appropriate network. With the appropriate message configured in the appropriate protocol the incident notification is sent 499.

Figures 1, 16:
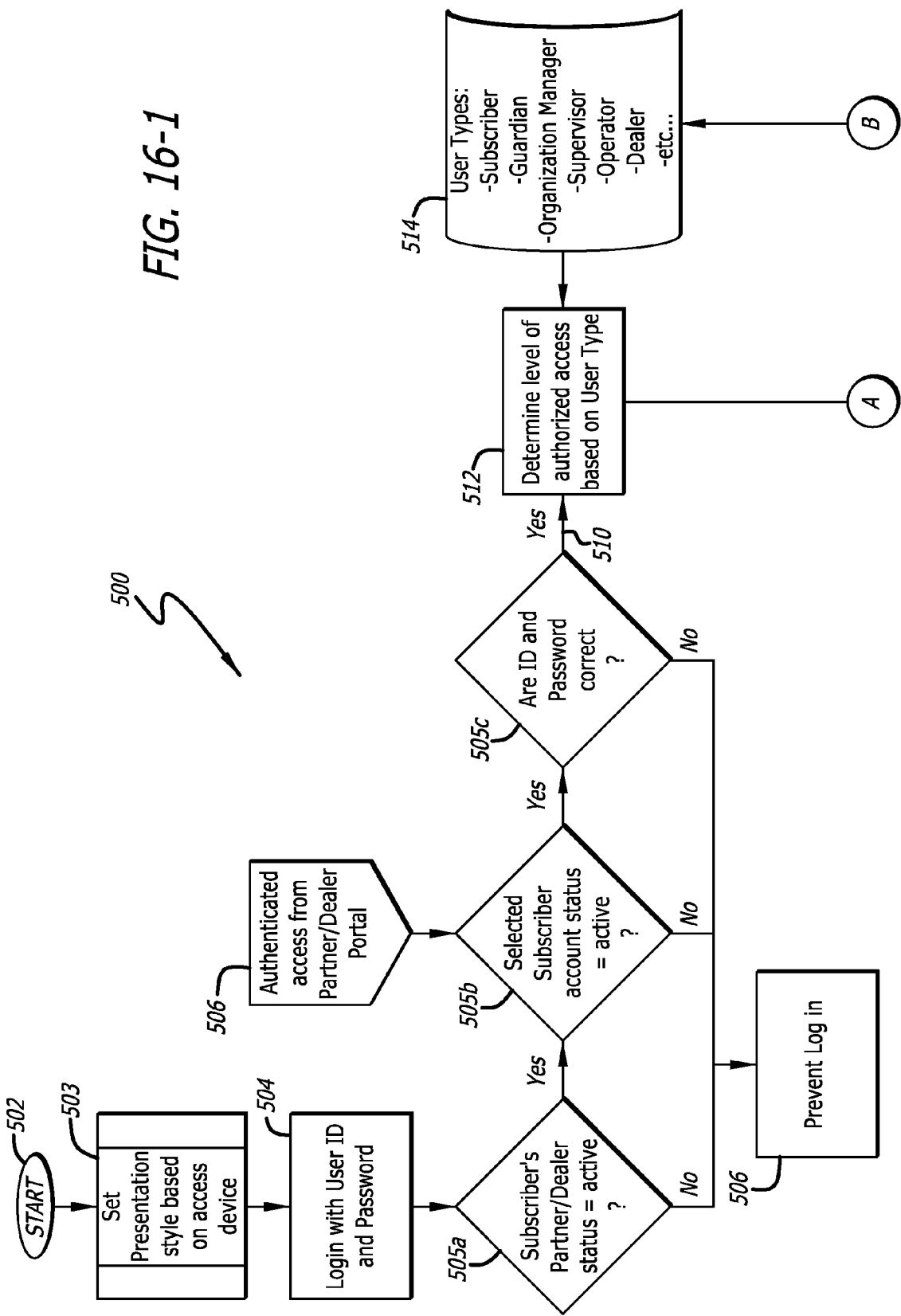
FIG. 16 is a logic flow chart showing the operation of an incident handling in the system.
Figures 2, 16:
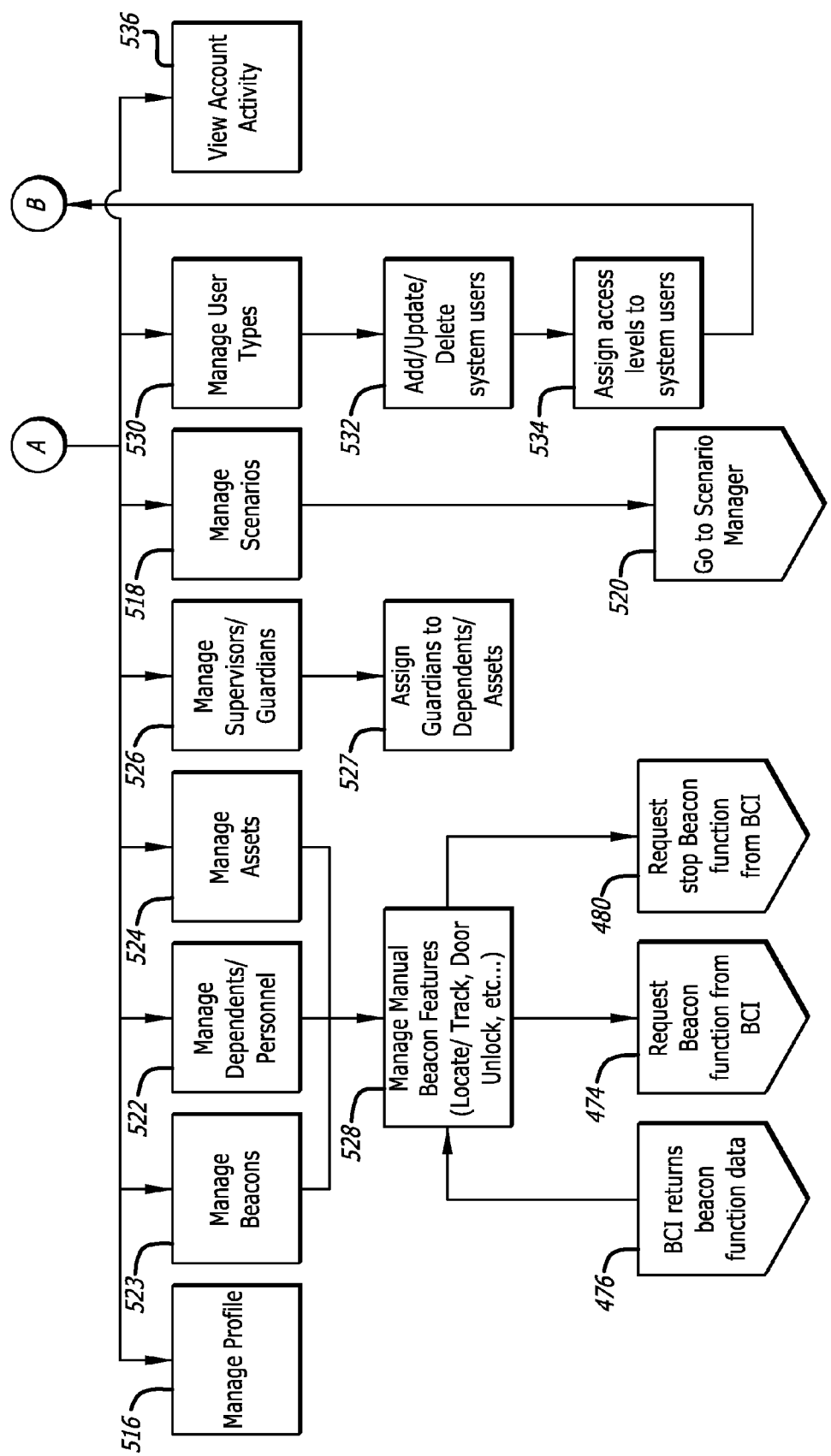

The flow chart in FIG. 16 represents the functionality of the residential and commercial subscriber's portal, and is generally indicated at 500. The start of the flow chart 500 is indicated at 502. As a first step 503 the system detects the type of device being used to access it and sets the appropriate presentation style. A login is then made as at 504 with the User's identification and the User's password. Determinations are then made of the following as (a) is the Subscriber's Monitoring Status active 505*a*; (b) is the selected Subscriber's Account status active 505*b*, and (c) are the User's identification (ID) and password correct 505*c*? If the answers to any of these are no, login in prevented as at 508.

If all of the answers to the determinations specified in the previous paragraph are yes (see 510), the level of access based on User type is determine. This is indicated at 512. Examples of User type are indicated at 514. These include Subscriber, Organization Manager, Guardian, Operator and a number of others. The subscriber may be considered to have the highest level of access and the subscriber may restrict access to some functions of the portal by any other Users.

Once access to the portal is granted, a number of different operations may be performed. These include managing the subscriber's profile (e.g., name, address, login information) 516 and managing scenarios 518. This includes the step (520) of going to the scenario manager to create scenarios and have them automatically monitored. The different operations also include reviewing account information and usage activity 536, and the operation of managing the different User types such as shown at 530. The operation of viewing account information 536 includes a determination from the records of the GMMS System of who logged in and why. The managing of User types 530 includes adding, deleting and updating system Users 532. For each User, the subscriber can assign an access level 534 indicating what functionality they will be restricted from using. A record of the access level of each User is kept in the list of User types 514.

Others of the different operations include managing dependents (family members) and personnel (organization members) 522 and managing assets (e.g., boats, vehicles, cargo containers) 524 and Beacons 523. These include operating all manually invoked Beacon functions 528 such as locating and tracking Beacons, locking and unlocking vehicle doors, disabling and enabling vehicle ignition, and others 528. As previously shown in FIG. 15, locating and tracking the Beacons include the blocks 474, 476 and 480. The block 474 relates to the step of requesting a Beacon function from the Beacon Control Interface 474. The block 476 relates to the step of returning Beacon function data, such as location information, to the operator. The block 480 relates to the step of stopping Beacon functions via the Beacon Control Interface.

Another function of the subscriber's portal is the ability to manage supervisors or guardians, indicated at 526. Supervisors and guardians are people assigned to be responsible for the various assets and/or personnel within the subscribers account. These individuals may be permanently or temporarily assigned to duties of responsibility. The guardian/supervisor manager allows an authorized User to assign responsibility 527 for an item (asset or personnel) with an associated Beacon. Contact information for each guardian or supervisor can be entered and/or modified through this module.

Recovery Interface

Figures 1, 17:
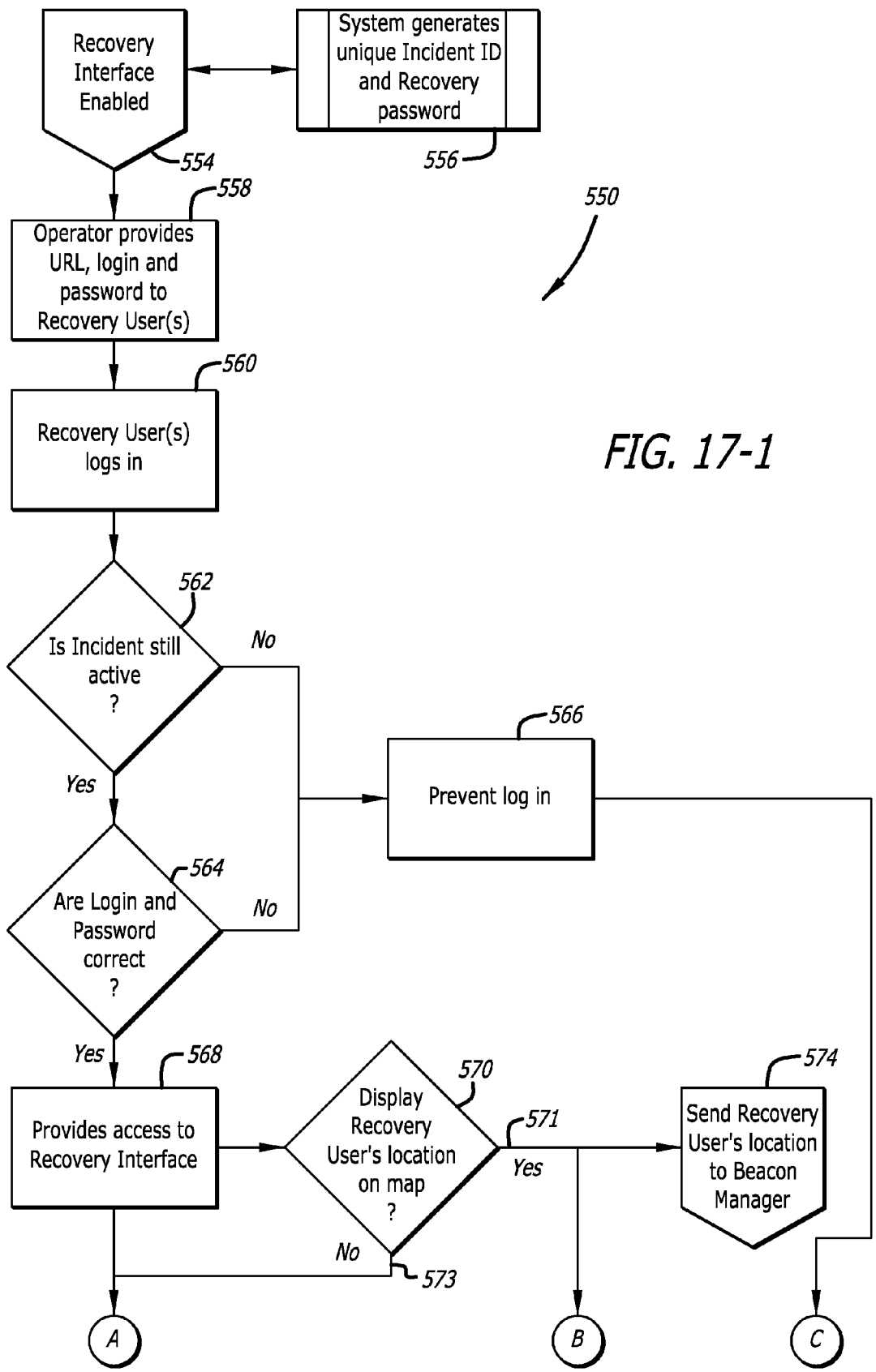
FIG. 17 is a flow chart showing the operation of a recovery interface in the system.
Figures 2, 17:
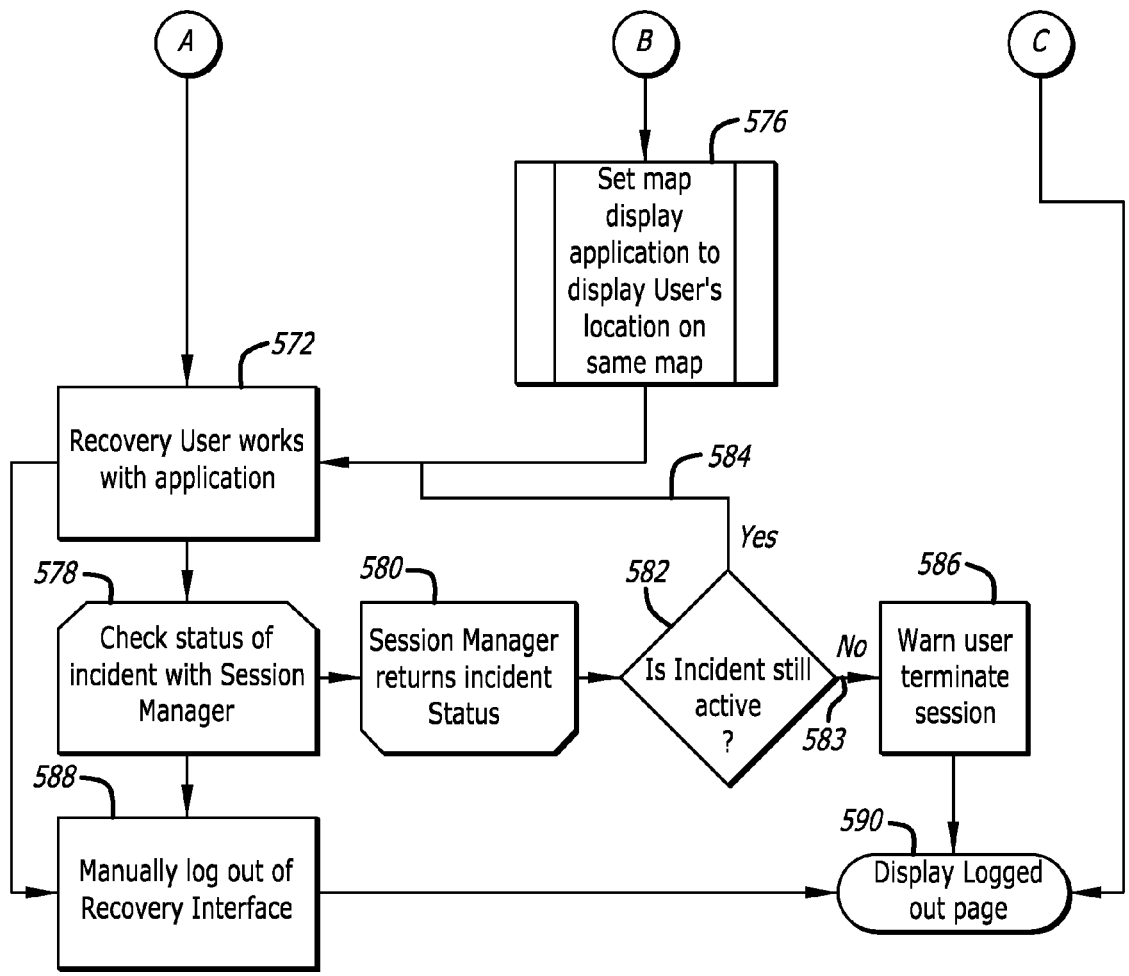

FIG. 17 is a flow chart, generally indicated at 550, of a recovery interface. The start of the flow chart 550 is indicated at 554 where the recovery interface is enabled by a monitoring station operator, indicated at 456 in FIG. 15. When the recovery interface is enabled, it automatically generates a unique incident identification and recovery password as indicated at 556. The operator then provides this recovery login, password and web page address (URL) to the recovery Users. These allow the recovery Users to log in as indicated at 560.

A determination is made as at 562 as to whether the incident is still active. A determination is also made at 564 as to whether the password used to log in is correct. If the answer is no to either or both of these determinations, login is prevented. See 566. If the login is yes to both of these determinations, access is provided as at 568 to the recovery interface, a view of which is generally indicated at 570 in FIG. 18. A determination is then made 570 as to whether the recovery User's position is to be displayed on a map, along with the Beacon's position. This determination is based on whether the recovery User has accessed the recovery interface with a locatable device, or is carrying a locatable device, that is compatible with the GMMS system. If the answer is yes 571, the recovery User's location is sent to the Beacon Manager 574, and the map display application is set 576 to simultaneously display both the Beacon's location and the recovery User's location. If the recovery User's location is not to be displayed 573, the recovery interface will display only the Beacon's location for the item or person being recovered.

The recovery User then works on the incident using the recovery interface. See 572. FIG. 18 shows the recovery interface including a map of the geographic area where the Beacon being monitored is located, the position on the map where the Beacon is located and the position on the map where the recovery User is located (if required).

While the recovery interface is enabled it continually checks with the session manager to determine the status of the incident (578). The session manager returns the status of the incident 580 and a determination is made as to whether the incident is still active 582. If the answer is yes 584, the recovery User is allowed to continue working with the recovery interface 572. If the answer is no (see 583), the session manager warns the User that the session is terminated and terminates the session (586). Login is then prevented as at 590 and the log out is displayed. The recovery User may also manually log out of the recovery interface at any time (588). After the recovery User logs out, he can log in again at any time using the same URL incident number, and password, if the same incident is still active. If the incident is not active, the recovery User will not be permitted to log in.

Figure 23:
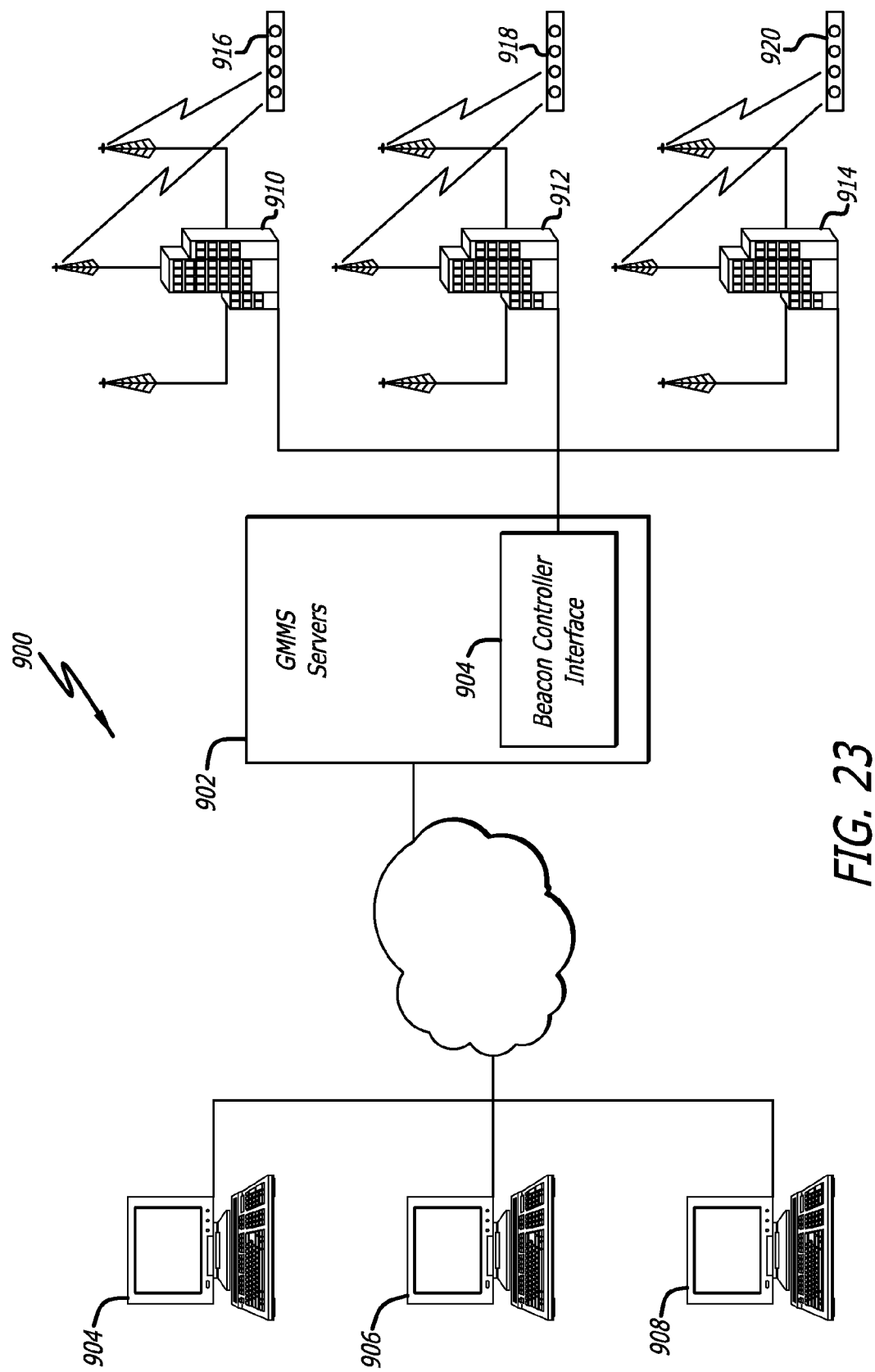
FIG. 23 is a schematic diagram showing how the beacon controller interface, a component of the Guardian Mobile Monitoring System (GMMS), provides the same user interface regardless of the wireless network, wireless location technology, or functionality of the beacon.

The network diagram in FIG. 23 depicts the functionality of the Beacon Controller Interface (BCI). The primary purpose of the BCI is to allow all users to access the GMMS via the same user interface regardless of the technologies used in the beacons. Users are therefore isolated from variances in the wireless communications technology, location technology, and beacon control technology.

The network diagram showing the various components associated with BCI operation is generally indicated at 900. The users' terminals are indicated at 904, 906, and 908. These user terminals may be various computing devices as long as they are capable of operating an Internet browser. The users' terminals may all be used to access the same portal type or different portal types. By way of example, terminal 904 may be used to access a wholesaler's portal, terminal 906 may be used to access a retailer's portal, and terminal 908 may be used to access a subscriber's portal.

All portals access the GMMS servers 902 via the Internet. Various operations are performed by the servers 902, as described in detail throughout this specification. This diagram applies specifically to any operations that request functions of the beacons, 916, 918, and 920. All communications between the GMMS servers and beacons is controlled by the BCI. Details of how the BCI interfaces with the GMMS servers and with the wireless networks are presented in FIG. 20 and its accompanying description.

910, 912, and 914 represent different wireless networks. Each of these networks may utilize the same wireless communications technology or may be different from each other. As an example, network 910 may be a control channel network, network 912 may be a GSM network, and network 914 may be a CDMA network.

916, 918, and 920 represent various beacon types. Each of these beacons may be the same or may have different features and comprise different technology and different control commands. For example, beacon 916 may communicate via a control channel network, use autonomous GPS location technology, and communicate using AT commands, beacon 918 may communicate via a GSM network, use assisted GPS location technology, and communicate via proprietary commands, and beacon 920 may communicate via a CDMA network, use Hybrid-Assisted GPS location technology, and use a proprietary command set.

Beacon Controller Interface

Figure 20:
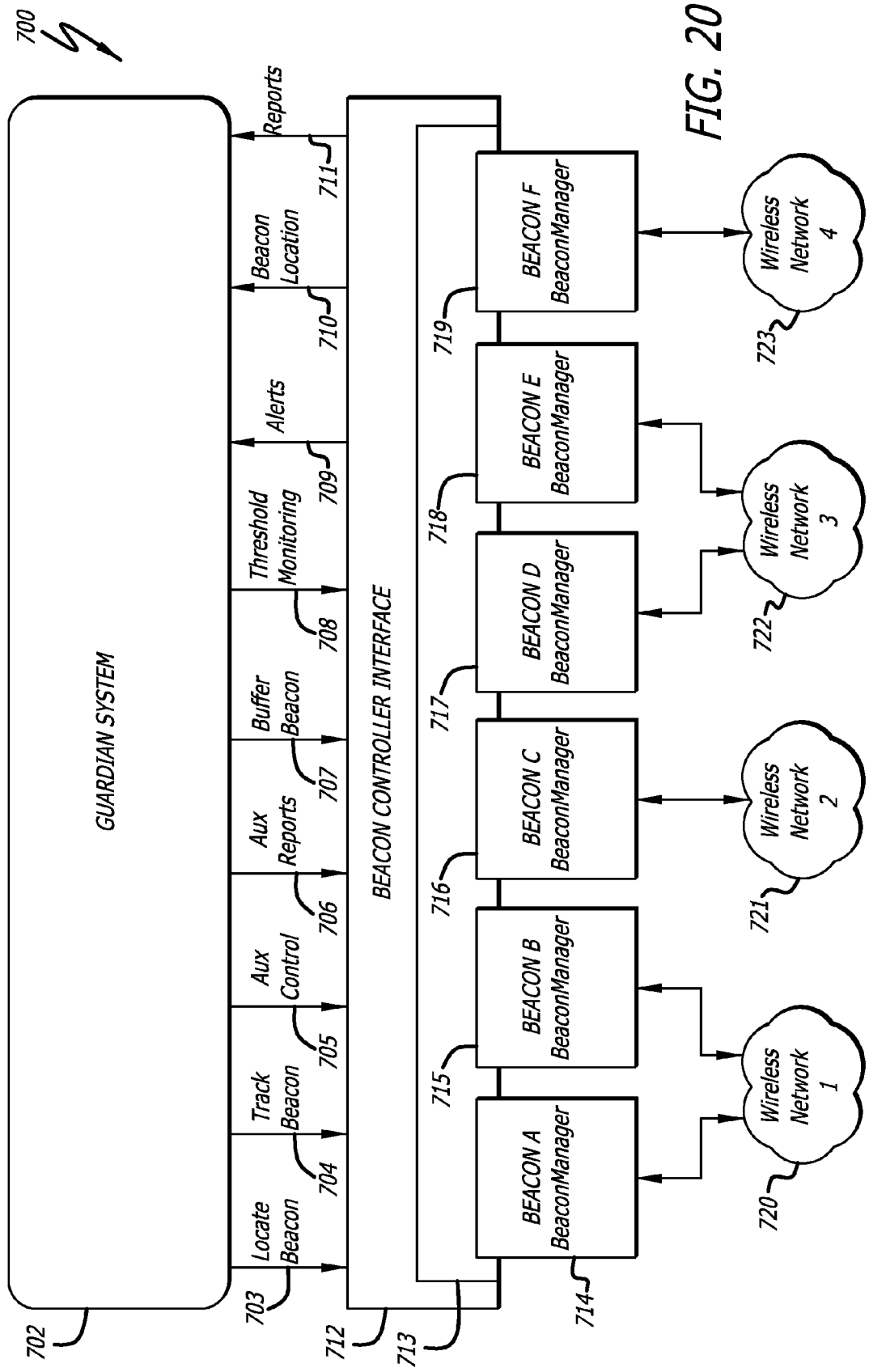
FIG. 20 is a schematic diagram showing the operation of the beacon controller interface under the control of the Guardian Monitoring System in controlling the operation of a number of different beacons.

FIG. 20 is a block diagram generally indicated at 700 of a Beacon Controller Interface (BCI). The BCI is a module of the GMMS. Flow charts describing the logic used in various functions of the BCI have been described previously in FIGS. 5, 6, 7, 8, 9, 10, and 10a. FIG. 20 provides an overview of the architecture of the various functions that make up the BCI, and is presented to demonstrate how the BCI makes the GMMS extensible. This means that when future Beacon types need to be integrated, the BCI makes it a relatively simple process and ensures that changes made to integrate new Beacon types will not adversely affect any other components of the GMMS. Future Beacon types may have new features and functions and may use different command sets and different communications protocols. Future Beacon types may use different location technologies and may communicate over different communications networks such as different wireless networks, including wireless networks that use technologies that are different from existing networks. The BCI provides for all of the above listed eventualities.

The whole of the GMMS except the BCI is represented at 702 in FIG. 20. Various modules of the GMMS communicate with Beacons, and all of them do so via the BCI. 703 to 711 indicate some of the different commands and responses the modules of the GMMS use in their communications with Beacons. 703 indicates that the GMMS may request that the Beacon provide its location. 704 indicates that the GMMS may request that the Beacon provide continuous location updates, possibly at specified time intervals, to facilitate tracking. 705 indicates that the GMMS may send control commands to the Beacon to cause an auxiliary device, connected to the Beacon, to perform its intended function. Examples would be to unlock a vehicle door or disable a vehicle's ignition. 706 indicate that the GMMS may request a report from an auxiliary device connected to a Beacon. Examples would be to check the status of a vehicle battery or the Beacon's back-up battery. 707 indicates that the GMMS may set the Beacon to buffer mode. This mode was described previously and is just one example of a mode that a Beacon may be set to operate in. 708 indicates that the GMMS may set a threshold in a Beacon and ask it to monitor for a breach of that threshold. Examples of this would be a speed which is not to be exceeded or a zone boundary that is not to be crossed. 709 indicates that the GMMS may receive alert messages from a Beacon. Alerts may be sent when someone pushes a panic button or when an active threshold is breached. 710 indicates that the GMMS may receive messages from a Beacon that indicate the Beacon's location. These locates may result from a request for a one-time locate or may be sent repeatedly during a tracking session. Many other messages, such as threshold breaches or alerts, will also include location information. 711 indicates that the GMMS may receive reports from the Beacon. Examples of reports include responses from auxiliary sensors connected to a Beacon.

The communication commands and responses represented in 703 to 711 go back and forth between the GMMS and the BCI, represented as 712. The BCI is extensible because changes can be made to the BCI, 712, to accommodate new commands and responses in future Beacon types. This can be done without adversely affecting other modules of the GMMS because the protocol to communicate between the BCI and the rest of the GMMS is an internal protocol. The actual protocol to control or receive data from the Beacon has no effect on the protocol used between the BCI and the rest of the GMMS.

A module of the BCI is the Plug-and Play Channel (PPC) represented at 713. The PPC is an interface between the BCI and the Beacon Manager for each Beacon Type. Basically the PPC is a structure by which new Beacon Managers (BMs) can be plugged into the BCI without modifying software code in the BCI. As such, the PPC can accept requests from web applications and send them to a Beacon Manager and the BM can return data to web applications via the PPC.

The PPC acts as an abstraction layer that shields the web applications from needing to know how to interact with each specific Beacon Manager and shields each Beacon Manager from needing to know how to interact with each web application. By doing this, it is possible to extend the system and add new Beacon Managers into the system without having to recode any web application.

The Beacon Managers (BMs) represented as 714 to 719 perform the role of representing a Beacon to the GMMS. The GMMS communicates with each BM in the same way for all functions that are common among all Beacon types. For functions that are not common among all Beacon types, but common among more than one, the Beacon Manager again communicates identically with the GMMS. Only for functions that are unique to one specific Beacon type does the Beacon Manager use a unique communications protocol with the GMMS. The Beacon Manager also performs a few additional tasks, primarily the determination of how to communicate with its associated Beacon type and performing of functions that emulate the Beacon when multiple Users request multiple Beacon functions. The latter of these tasks is described in detail in FIGS. 6, 7, 8, 9, 10, and 10a. The decisions about how to communicate with a Beacon Type involve the following: determining the wireless network to which the Beacon is assigned; determining the Wireless Gateway associated with that wireless network; determining the protocols the Beacon and the wireless network use to communicate; determining if the Beacon performs its location calculations internally or if a location server such as a Position Determining Equipment (PDE) is to be accessed instead of the Beacon itself.

Drawing objects 720 to 723 represent different wireless networks. Most Beacon types must communicate via a specific wireless communications technology but there may be several networks of the same wireless technology available. As an example, a Beacon type may be designed to communicate using Global System for Mobile communications (GSM) wireless technology. It would be unlikely to also be capable of communicating using Code Division Multiple Access (CDMA) wireless technology. Because of this limitation, the Beacon would be associated with a GSM wireless network. There is typically more than one wireless network available. As an example, in the USA there are several wireless carriers operating GSM networks, such as AT&T Wireless, T-Mobile, and Cingular Wireless. The BM would determine which network the Beacon type was associated with and would direct its communications via the appropriate wireless gateway and protocol to communicate with the Beacon via that network.

Figure 19:
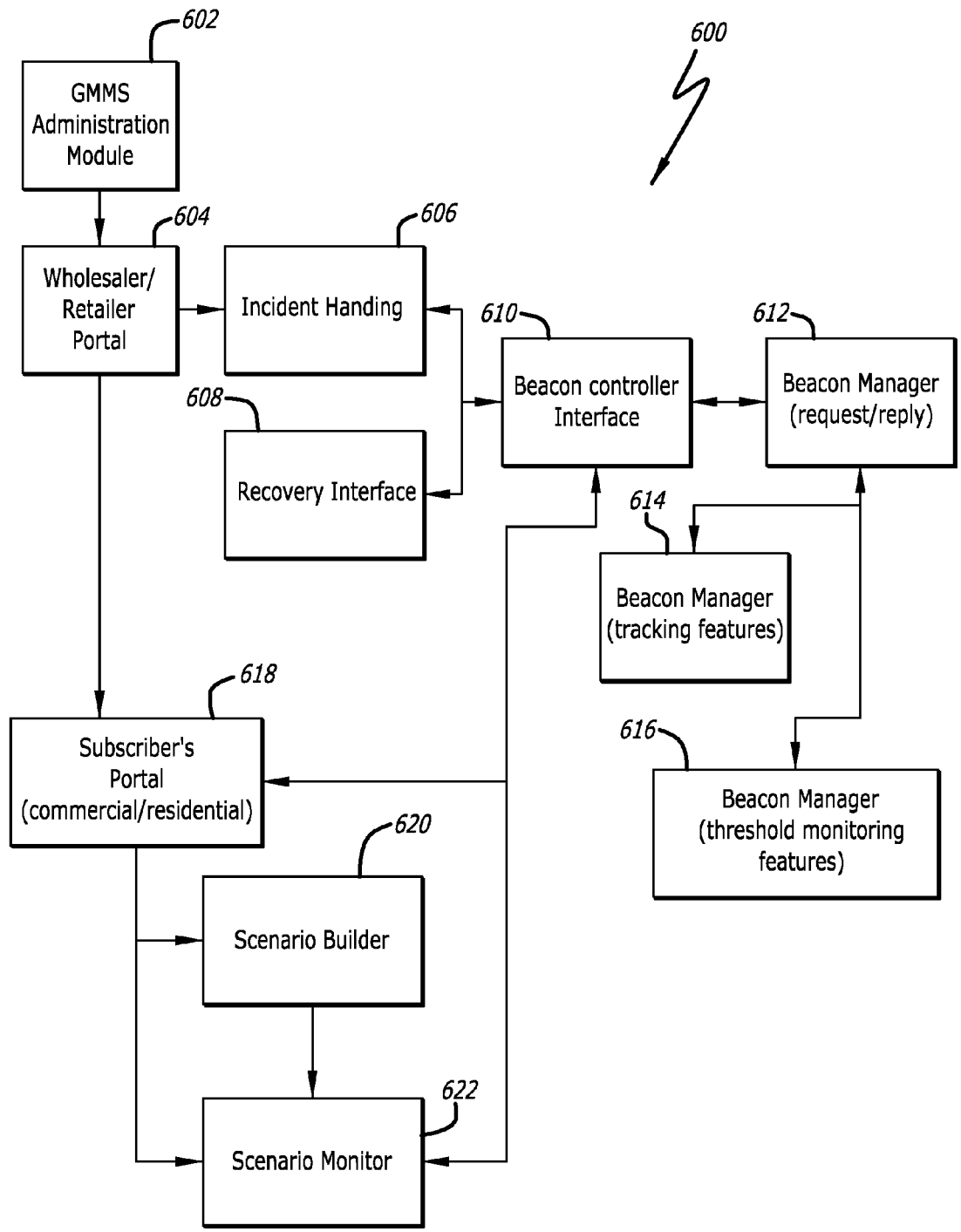
FIG. 19 is a flow chart showing the interrelationship between the various flow charts shown in the previous Figures.

FIG. 19 is a flow chart, generally indicated at 600, showing the interrelationship between the different flow charts of FIGS. 5-18. The flow chart 600 includes a block 602 designated as Guardian Administration Module. The expansion of this block is FIG. 13. The Guardian Administration Module 602 interfaces with the wholesaler/retailer portal 604, the details of which are shown as FIG. 14. The Wholesaler/Retailer Portal interfaces with an incident handling module, shown at block 606. The incident handling block 606 is shown in FIG. 15. The Incident Handling Block in turn interfaces with the Recovery Interface 608 which is shown in FIG. 17.

Signals pass in both directions between the Incident Handling Block 606 and a Beacon Controller Interface 610 and in both directions between the Recovery Interface 608 and the Beacon Controller Interface 610. The Beacon Controller Interface flow chart is shown in FIG. 5. Signals flow in the both directions between the Beacon Controller Interface 610 and a Beacon Manager Request/Reply Block 612. The Beacon Manager Request/Reply Block 612 is shown in FIG. 6.

Signals pass in both directions between the Beacon Manager Request/Reply Block 612 and a Beacon Manager Tracking Feature 614 and between the Beacon Manager Request/Reply Block 612 and a Beacon Manager Threshold Monitoring Block 616. The Beacon Manager Tracking Feature is shown in FIG. 7 and the Beacon Manager Threshold Managing Feature is shown in FIG. 8.

The Wholesaler/Retailer Portal 604 also interfaces with a Residential/Commercial Subscriber Software Portal. The Residential/Commercial Software Portal 618 is shown in FIG. 16. Signals flow in both directions between the Residential/Commercial Subscriber Software Portal 618 and the Beacon Controller Interface 610. Signals also flow from the Residential/Commercial Subscriber Software Portal 618 to a Scenario Builder 620 and a Scenario Monitor/Process 622. The Scenario Builder is shown in FIG. 11 and the Scenario Monitor is shown in FIG. 12. Signals flow in both directions between the Scenario Monitor and the Beacon Controller Interface 610.

Operator's Access to Subscriber's Portal

A monitoring station operator would access a subscriber's portal under various circumstances but generally it is required when either the subscriber or a guardian calls requesting operator assistance. The purpose of allowing access to a subscriber's portal by an operator is to provide customer service. The purpose of restricting access is to maintain the security and privacy of the subscriber. In the GMMS, operator access to subscriber's portal is generally allowed through use of a pass code. If the caller does not have the pass code, it may still be important for the operator to access the subscriber's portal in case of emergency. In this case, the operator would override the pass code access and indicate a reason for the override. In either case, the login by the operator will be recorded in the subscriber's portal for future review. Included in the record will be the identity of the operator, the time of the login, and the reason for overriding, if applicable. By policy, an operator would not divulge the location or status of any item to the caller if they do not present the correct pass code. Instead, the operator would handle the incident using public or private security forces if necessary.

FIG. 24 is a flow chart, generally indicated at 950, showing how an operator in a monitoring station would access the portal of a subscriber. An incoming phone call 952 would request operator assistance, requiring that he operator access a subscriber's portal. The phone call may be from the subscriber, a guardian assigned by the subscriber, or from anyone claiming to require access to the portal. The caller would identify the required portal at 954 by identifying the subscriber. The identity of the subscriber will allow the operator to find and select the corresponding portal at 954 using the subscriber management module of the operator's portal. When the operator selects the management link for the subscriber's portal a security screen appears, 958. The security screen 958 requires the operator to enter either the subscriber's pass code or override.

At 960 a decision is made as to which way to enter the subscriber's portal. If the caller gives the operator the correct subscriber's pass code it is entered into the security screen at 962. This allows the operator to have access to the subscriber's portal and perform any operation the subscriber could. Upon entering the subscriber's portal, a record of the operator's access to the portal is made at 968 in the GMMS database. The record includes the operator's identification and the time of logging in. This record is permanently accessible to the subscriber, via the subscriber's portal, and can not be deleted or altered by any user of the GMMS. When the operator has completed the required operations in the subscriber's portal the operator logs out, as shown at 982.

If the indication at 960 is that the caller does not have the subscriber's pass code, the operator must decide at 970 whether to enter the user's portal without the pass code. If the operator decides not to enter the portal without the pass code the security screen will prevent the login at 972 and the operator will be logged out at 982. If the operator decides at 970 to enter the subscriber's portal without a pass code the operator must select, at 974, the override function on the security screen. In addition to selecting the override function, the operator will be required at 976 to enter a justification for overriding. This justification area is a text box where the operator types the reason for justification or selects from a list of pre-defined reasons. If no text is entered in to the text box the security screen will prevent login to the subscriber's portal and will display an error message. When the override is selected and an override justification is entered, the operator is allowed, at 980, to have access to the subscriber's portal and perform any operation the subscriber could. Upon entering the subscriber's portal, a record of the operator's access to the portal is made at 978 in the GMMS database. The record includes the override justification as well as the operator's identification and the time of logging in. This record is permanently accessible to the subscriber, via the subscriber's portal, and can not be deleted or altered by any user of the GMMS. When the operator has completed the required operations in the subscriber's portal the operator logs out, as shown at 982.

When the term "portal" is used in the specification and in the claims, it can be considered to include at least one or more of the following:

Guardian Administration Module
Monitoring Station
Reseller Portal

Dealer Portal
Commercial Customer
Resident Customer

When the term "user" is used in specification or in the claims, in can be considered to include at least one or more of the following:
Monitoring Station Operator
Dispatcher
Supervisor
Recover Personnel When the term "threshold" is used in the specification or claims, it can be considered to include one or more of the following:
Time
Location
Speed
Panic Button
Battery Power Although this invention has been disclosed and illustrated with reference to particular embodiments, the principles involved are susceptible for use in numerous other embodiments which will be apparent to persons of ordinary skill in the art. The invention is, therefore, to be limited only as indicated by the scope of the appended claims.

We claim:

1. A system for monitoring the operations, including location indication, of a plurality of mobile items, comprising:
   a plurality of beacons each having individual location determining technologies distinguishing it from the location determining technologies of the other beacons, each of the beacons being coupled to an individual one of the items for movement with the items; and
   a plurality of handsets having capabilities for providing indication of the location of the items, in accordance with signals utilized in the location determining technologies of the beacons coupled to the items.

2. The system of claim 1, wherein at least one of the plurality of handsets is a mobile phone.

3. A system for monitoring the operations, including location indicators, of a plurality of mobile items, comprising:
   a plurality of beacons each movable with an individual one of the items, each of the beacons being responsive to signals in an individual ones of a plurality of wireless location technologies;
   at least one monitoring station in operable communication with the plurality of beacons;
   a receiver in each of the beacons for receiving signals in the individual ones of the wireless location technologies; and
   wherein the at least one monitoring station monitors the operations of the individual ones of the beacons in accordance with the signals in the individual ones of the wireless location technologies.

4. A system for monitoring the movements of a plurality of mobile items, comprising:
   a plurality of beacons each movable with an individual one of the items, each of the beacons being responsive to signals in an individual one of a plurality of wireless communication technologies;
   at least one monitoring station in operable communication with the plurality of beacons;
   a receiver in each of the plurality of beacons for receiving signals in an individual one of the wireless communication technologies; and
   wherein the monitoring station monitors the locations of the individual ones of the beacons in accordance with the signals delivered via the individual ones of the wireless communication technologies.

5. A system for monitoring the operations, including location indications, of a plurality of mobile items, comprising:
   an input for inputting an operation function request from a user interface selected from the group consisting of a system administration portal, a monitoring station portal, a dealer portal, a user portal, and a recovery interface;
   a beacon controller interface in operable communication with the input;
   a plug-and-play channel in operable communication with the beacon controller interface, the plug-and-play channel configured to identify in the operation request an individual one of a plurality of beacon types and to facilitate monitoring the operation of the specific beacon in accordance with the operation request.

6. The system of claim 5, further comprising a plurality of beacon managers, each designated for a specific beacon type, for monitoring the operation of the specific beacon in accordance the operation request.

7. The system of claim 6, further comprising a wireless network selected from a plurality of wireless networks for transmitting the operation request from the individual one of the beacon managers to the specific beacon.

8. A system for monitoring the status, including location indications, of a plurality of mobile items, comprising:
   a beacon operatively coupled to an item for movement with the item, the beacon having a tracking function and a threshold operation for the item;
   first and second user interfaces selected from the group consisting of a system administration portal, a monitoring station portal, a dealer portal, a user portal and a recovery interface;
   a beacon controller interface; and
   wherein the tracking function has priority over the threshold operation in controlling the operation of the beacon, and wherein the results obtained from the tracking function in the beacon are used to determine results of the threshold operation in the beacon controller interface.

9. The system of claim 8, wherein the threshold operation monitors the beacon when the tracking function has been terminated.

10. The system of claim 8, wherein a first tracking request is provided to the beacon, and a second tracking request is provided to the beacon different from the first, and
    wherein the beacon controller interface provides a priority to a particular one of the first and second tracking requests with the greater duration of tracking yet to be performed, and wherein the particular operation is selected in the beacon controller interface and sent to the beacon, and the beacon determines the operation of the item with the selected operation, and the beacon provides results of the selected tracking function to fulfill both the first and second tracking requests.

11. The system of claim 10, wherein the beacon controller interface provides a determination as to whether to instruct the beacon to perform an additional operation after the particular one of the tracking operations has been performed.

12. The system of claim 11, wherein a priority to a particular one of the first and second tracking function requests is provided in the beacon controller interface and only that particular function that has the highest priority is sent to the beacon, and wherein the beacon performs the request selected by the beacon controller interface, and wherein the beacon controller interface receives the operations provided by the beacon providing the particular function.

13. The system of claim 12, wherein the beacon receives a request from the beacon controller interface to carry out the lower priority function if it is still active after the higher priority function has been completed or terminated.

14. The system of claim 12, wherein the beacon controller interface is configured to provide a priority to a particular one of a plurality of function requests received in the beacon controller, and the beacon controller interface is also configured to allow for selecting that particular requests that has the highest priority and sending it to the beacon for the beacon to carry out the function in accordance with the selected request, and wherein the beacon controller interface receives the data representative of the functions provided by the beacon due to carrying out the selected request, and wherein the beacon controller interface is also configured to perform further operations using the data provided by the beacon to satisfy the requests having a lower priority.

15. The system of claim 14, wherein the requested function that is most capable of being used to perform operations that will satisfy the requests is selected in the beacon controller interface.

16. The system of claim 14, wherein the beacon user interface is configured to determine if there is any threshold monitoring operation requested, and when there is a threshold operation to be performed, the beacon user interface causes a request in the beacon controller interface to be generated and sent to the beacon to perform the threshold operation; and
wherein the beacon user interface is also configured to determine if there is any tracking operation requested, and when there is a tracking operation to be performed, the beacon user interface causes a tracking request to be generated in the beacon controller interface and sent to the beacon to perform the tracking operation; and
wherein the monitoring provided by the beacon in the tracking operation is received in the beacon controller interface, and the beacon user interface performs further operations to satisfy the requests, except threshold monitoring requests, and wherein upon the beacon detecting any breach of a threshold it is monitoring, the beacon sends a threshold breach report to the beacon controller interface.

17. A system for monitoring the operations, including location indication, of a plurality of mobile items, comprising:
a plurality of beacons each having individual location determining technologies distinguishing it from the location determining technologies of the other beacons, each of the beacons being coupled to an individual one of the items for movement with the items; and
a handset having capabilities for providing indication of the location of the items, in accordance with signals utilized in the location determining technologies of the beacons coupled to the items.

* * * * *